US012615350B2

(12) United States Patent (10) Patent No.: US 12,615,350 B2
Thiel et al. (45) Date of Patent: *Apr. 28, 2026

(54) PERSONAL TACTICAL SYSTEM INCLUDING GARMENT, CAMERA, AND POWER DISTRIBUTION AND DATA HUB

(71) Applicant: LAT Enterprises, Inc., Raleigh, NC (US)

(72) Inventors: Laura Thiel, Raleigh, NC (US); Giancarlo Urzi, Raleigh, NC (US); Carlos Cid, Raleigh, NC (US)

(73) Assignee: LAT Enterprises, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/313,146

(22) Filed: Aug. 28, 2025

(65) Prior Publication Data

US 2025/0392682 A1 Dec. 25, 2025

Related U.S. Application Data

(60) Continuation of application No. 19/198,648, filed on May 5, 2025, now Pat. No. 12,425,549, which is a
(Continued)

(51) Int. Cl.
| | |
|---|---|
| *H01M 2/14* | (2006.01) |
| *A41D 1/00* | (2018.01) |
| *A41D 1/04* | (2006.01) |
| *A41D 13/00* | (2006.01) |
| *A41D 27/20* | (2006.01) |
| *F41H 1/02* | (2006.01) |
| *G08B 25/01* | (2006.01) |
| *H01M 10/42* | (2006.01) |
| *H01M 50/103* | (2021.01) |
| *H01M 50/124* | (2021.01) |
(Continued)

(52) U.S. Cl.
CPC ............. *H04N 7/185* (2013.01); *A41D 1/002* (2013.01); *A41D 1/04* (2013.01); *A41D 13/0012* (2013.01); *A41D 27/201* (2013.01); *F41H 1/02* (2013.01); *G08B 25/016* (2013.01); *H01M 10/425* (2013.01); *H01M 50/103* (2021.01); *H01M 50/124* (2021.01); *H01M 50/14* (2021.01); *H01M 50/143* (2021.01); *H01M 50/211* (2021.01); *H01M 50/231* (2021.01); *H01M 50/238* (2021.01); *H01M 50/242* (2021.01); *H01M 50/247* (2021.01); *H01M 50/256* (2021.01); *H01M 50/298* (2021.01); *H04N 23/51* (2023.01); *H04N 23/54* (2023.01); *A41D 2300/32* (2013.01); *A41D 2300/322* (2013.01); *A41D 2300/324* (2013.01); *A41D 2300/326* (2013.01); *A41D 2300/33* (2013.01); *A41D 2400/48* (2013.01); *H01M 2010/4271*
(2013.01); *H01M 2010/4278* (2013.01); *H01M 10/48* (2013.01); *H01M 2220/30* (2013.01); *H02J 7/342* (2020.01); *H02J 7/70* (2026.01)

(58) Field of Classification Search
CPC ............. H01M 50/247; H01M 50/231; H01M 50/143; H01M 50/124; H01M 50/242; H01M 50/211; H01M 50/256; H01M 50/238; H01M 50/298; H01M 50/103; H01M 50/14; H01M 10/425; H01M 10/48; H01M 2010/4271; H01M 2010/4278; H01M 2220/30; H04N 7/185; H04N 23/51; H04N 23/54; H04N 5/2252; H04N 5/2253; A41D 1/002; A41D 1/04; A41D 13/0012; A41D 27/201; A41D 2300/32; A41D 2300/322; A41D 2300/324; A41D 2300/326; A41D 2300/33; A41D 2400/48; F41H 1/02; G08B 25/016; H02J 7/342; H02J 7/0026; H02J 7/0029; H02J 7/0042
See application file for complete search history.

(56) References Cited

U.S. PATENT DOCUMENTS

| | | |
|---|---|---|
| 1,901,232 A | 3/1933 | Glowacki |
| RE21,577 E | 9/1940 | Brownlee |
(Continued)

FOREIGN PATENT DOCUMENTS

| BR | 102012032925 A2 * | 8/2014 | ........... G03B 17/561 |
|---|---|---|---|
| CA | 2794979 A1 | 10/2011 | |
(Continued)

OTHER PUBLICATIONS (Computer-generated translation of BR-102012032925) Lago et al, "Personal Monitoring System", Aug. 26, 2014.*
(Continued)

*Primary Examiner* — Raymond Alejandro
(74) *Attorney, Agent, or Firm* — Neo IP

(57) ABSTRACT

A personal tactical system including a load-bearing garment, a pouch with one or more batteries enclosed in the pouch, at least one power distribution and data hub, and at least one camera. The camera is incorporated into or removably attachable to the load-bearing garment, the pouch is removably attachable to the load-bearing garment and the one or more batteries are operable to supply power to the at least one power distribution and data hub. The at least one power distribution and data hub is operable to supply power to at least one peripheral device. A plurality of personal tactical systems is operable to form an ad hoc network to share images and other information for determining object direction, location, and movement.

7 Claims, 43 Drawing Sheets

Related U.S. Application Data continuation of application No. 18/815,334, filed on Aug. 26, 2024, now Pat. No. 12,302,039, which is a division of application No. 18/490,407, filed on Oct. 19, 2023, now Pat. No. 12,081,914, which is a continuation of application No. 17/197,800, filed on Mar. 10, 2021, now Pat. No. 11,800,067, which is a continuation of application No. 16/838,615, filed on Apr. 2, 2020, now Pat. No. 10,951,865, which is a continuation of application No. 15/965,098, filed on Apr. 27, 2018, now Pat. No. 10,616,534, which is a continuation-in-part of application No. 15/886,351, filed on Feb. 1, 2018, now Pat. No. 10,531,590, which is a continuation-in-part of application No. 15/836,259, filed on Dec. 8, 2017, now Pat. No. 10,476,054, which is a continuation-in-part of application No. 15/720,270, filed on Sep. 29, 2017, now Pat. No. 10,461,289, which is a continuation-in-part of application No. 15/664,776, filed on Jul. 31, 2017, now Pat. No. 11,462,649, which is a continuation-in-part of application No. 15/470,382, filed on Mar. 27, 2017, now Pat. No. 11,302,987, which is a continuation-in-part of application No. 14/516,127, filed on Oct. 16, 2014, now abandoned, said application No. 15/720, 270 is a continuation-in-part of application No. 14/520,821, filed on Oct. 22, 2014, now Pat. No. 9,780,344.

(51) Int. Cl.

| | |
|---|---|
| H01M 50/14 | (2021.01) |
| H01M 50/143 | (2021.01) |
| H01M 50/211 | (2021.01) |
| H01M 50/231 | (2021.01) |
| H01M 50/238 | (2021.01) |
| H01M 50/242 | (2021.01) |
| H01M 50/247 | (2021.01) |
| H01M 50/256 | (2021.01) |
| H01M 50/298 | (2021.01) |
| H04N 7/18 | (2006.01) |
| H04N 23/51 | (2023.01) |
| H04N 23/54 | (2023.01) |
| H01M 10/48 | (2006.01) |
| H02J 7/34 | (2006.01) |
| H02J 7/70 | (2026.01) |

(56) References Cited

U.S. PATENT DOCUMENTS

| | | |
|---|---|---|
| 2,416,984 A | 3/1947 | Farr |
| 2,450,369 A | 9/1948 | Alexander |
| 2,501,725 A | 3/1950 | Knopp |
| 2,800,807 A | 7/1957 | Gomersall et al. |
| 3,926,499 A | 12/1975 | Bailey et al. |
| 3,952,694 A | 4/1976 | McDonald |
| 3,968,348 A | 7/1976 | Stanfield |
| 4,080,677 A | 3/1978 | Koehler |
| 4,081,061 A | 3/1978 | Tucker |
| 4,303,083 A | 12/1981 | Burruss, Jr. |
| 4,346,151 A | 8/1982 | Uba et al. |
| 4,656,770 A | 4/1987 | Nuttle |
| 4,872,414 A | 10/1989 | Asquith |
| 4,944,916 A | 7/1990 | Franey |
| 4,979,502 A | 12/1990 | Hunt |
| 5,185,042 A | 2/1993 | Ferguson |
| 5,245,943 A | 9/1993 | Hull et al. |
| 5,326,297 A | 7/1994 | Loughlin |
| 5,340,662 A | 8/1994 | Mccarter |
| 5,421,287 A | 6/1995 | Yonover |

| | | |
|---|---|---|
| 5,522,943 A | 6/1996 | Spencer et al. |
| 5,537,022 A | 7/1996 | Huang |
| 5,610,496 A | 3/1997 | Hofbauer et al. |
| 5,653,367 A | 8/1997 | Abramson |
| 5,680,026 A | 10/1997 | Lueschen |
| 5,701,067 A | 12/1997 | Kaji et al. |
| 5,724,707 A | 3/1998 | Kirk et al. |
| 5,736,954 A | 4/1998 | Veazey |
| 5,808,865 A | 9/1998 | Alves |
| 5,853,915 A | 12/1998 | Suto |
| 5,861,223 A | 1/1999 | Motlagh |
| 5,869,204 A | 2/1999 | Kottke et al. |
| 5,944,567 A | 8/1999 | Ratajczak et al. |
| 6,093,884 A | 7/2000 | Toyomura et al. |
| 6,115,277 A | 9/2000 | Plichta et al. |
| 6,172,892 B1 | 1/2001 | Plichta et al. |
| 6,193,678 B1 | 2/2001 | Brannon |
| 6,239,701 B1 | 5/2001 | Vasquez et al. |
| 6,259,228 B1 | 7/2001 | Becker et al. |
| 6,281,594 B1 | 8/2001 | Sarich |
| 6,303,248 B1 | 10/2001 | Peterson |
| 6,313,396 B1 | 11/2001 | Glenn |
| 6,351,908 B1 | 3/2002 | Thomas |
| 6,380,713 B2 | 4/2002 | Namura |
| 6,396,403 B1 | 5/2002 | Haner |
| 6,415,734 B1 | 7/2002 | LaPuzza |
| 6,477,035 B1 | 11/2002 | Cepas et al. |
| 6,546,873 B1 | 4/2003 | Andrejkovics et al. |
| 6,641,432 B1 | 11/2003 | Ouyoung |
| 6,659,320 B1 | 12/2003 | Alves et al. |
| 6,727,197 B1 | 4/2004 | Wilson et al. |
| 6,784,833 B1 | 8/2004 | Evans |
| 6,866,527 B2 | 3/2005 | Potega |
| 6,870,089 B1 | 3/2005 | Gray |
| 6,945,803 B2 | 9/2005 | Potega |
| 7,074,520 B2 | 7/2006 | Probst et al. |
| 7,124,593 B2 | 10/2006 | Feher |
| 7,141,330 B2 | 11/2006 | Aoyama |
| 7,221,552 B1 | 5/2007 | Brown |
| 7,356,934 B2 | 4/2008 | McCambridge et al. |
| 7,443,627 B1 | 10/2008 | Krishnamoorthy et al. |
| 7,489,105 B2 | 2/2009 | Weinstein et al. |
| 7,494,348 B1 | 2/2009 | Tyler et al. |
| 7,611,255 B1 | 11/2009 | Lagassey |
| 7,624,453 B2 | 12/2009 | Rene et al. |
| 7,695,334 B2 | 4/2010 | Yonover et al. |
| 7,697,269 B2 | 4/2010 | Yang et al. |
| 7,712,645 B2 | 5/2010 | Calkin |
| 7,769,465 B2 | 8/2010 | Matos |
| 7,798,090 B2 | 9/2010 | Hatfield |
| 7,805,114 B1 | 9/2010 | Quintana et al. |
| 7,878,678 B1 | 2/2011 | Stamatatos |
| 7,931,178 B2 | 4/2011 | Rome et al. |
| 8,258,394 B2 | 9/2012 | Baruh |
| 8,415,924 B2 | 4/2013 | Matthias et al. |
| 8,587,261 B2 | 11/2013 | Sassen et al. |
| 8,633,619 B2 | 1/2014 | Robinson et al. |
| 8,638,011 B2 | 1/2014 | Robinson et al. |
| 8,647,777 B2 | 2/2014 | Yasunaga et al. |
| 8,720,762 B2 | 5/2014 | Hilliard et al. |
| 8,736,108 B1 | 5/2014 | Nielson et al. |
| 8,775,846 B2 | 7/2014 | Robinson et al. |
| 8,832,981 B2 | 9/2014 | Desaulniers |
| 8,945,328 B2 | 2/2015 | Longinotti-Buitoni et al. |
| 8,984,666 B1 | 3/2015 | LoBue |
| 9,029,681 B1 | 5/2015 | Nielson et al. |
| 9,057,361 B2 | 6/2015 | Donelan et al. |
| 9,093,586 B2 | 7/2015 | Lentine et al. |
| 9,138,022 B2 | 9/2015 | Walker |
| 9,141,143 B2 | 9/2015 | Morita |
| 9,143,053 B1 | 9/2015 | Lentine et al. |
| 9,144,255 B1 | 9/2015 | Perciballi |
| 9,160,022 B2 | 10/2015 | Pruett et al. |
| 9,230,486 B2 | 1/2016 | Klement et al. |
| 9,335,811 B2 | 5/2016 | Long et al. |
| 9,496,448 B2 | 11/2016 | Cruz-Campa et al. |
| 9,508,881 B2 | 11/2016 | Tauke-Pedretti et al. |
| 9,531,322 B2 | 12/2016 | Okandan et al. |
| 9,548,411 B2 | 1/2017 | Nielson et al. |

(56)         References Cited

U.S. PATENT DOCUMENTS

| | | | |
|---|---|---|---|
| 9,559,219 B1 | 1/2017 | Okandan et al. |
| 9,634,485 B2 | 4/2017 | Long et al. |
| 9,634,491 B2 | 4/2017 | Robinson et al. |
| 9,640,965 B1 | 5/2017 | Long et al. |
| 9,653,632 B1 | 5/2017 | Beitman, Sr. |
| 9,680,318 B2 | 6/2017 | Carkner et al. |
| 9,709,362 B2 | 7/2017 | Shelley |
| 9,780,344 B2 | 10/2017 | Thiel et al. |
| 10,250,134 B2 | 4/2019 | Long et al. |
| 10,281,240 B2 | 5/2019 | Cole et al. |
| 10,326,284 B2 | 6/2019 | Long et al. |
| 10,333,315 B2 | 6/2019 | Robinson et al. |
| 10,361,629 B2 | 7/2019 | Long et al. |
| 10,531,590 B2 | 1/2020 | Thiel et al. |
| 10,587,116 B2 | 3/2020 | Long et al. |
| 10,594,142 B2 | 3/2020 | Long et al. |
| 10,616,534 B2 * | 4/2020 | Thiel .................... H01M 50/211 |
| 10,848,067 B2 | 11/2020 | Long et al. |
| 10,862,320 B2 | 12/2020 | Carkner et al. |
| 10,951,865 B2 * | 3/2021 | Thiel ...................... A41D 1/002 |
| 11,108,230 B2 | 8/2021 | Long et al. |
| 11,258,366 B2 | 2/2022 | Long et al. |
| 11,283,265 B2 | 3/2022 | Robinson et al. |
| 11,355,928 B2 | 6/2022 | Long et al. |
| 11,477,853 B2 | 10/2022 | Gray et al. |
| 11,569,667 B2 | 1/2023 | Robinson et al. |
| 11,800,067 B2 * | 10/2023 | Thiel .................... H01M 50/103 |
| 11,876,354 B2 | 1/2024 | Thiel et al. |
| 12,068,600 B2 | 8/2024 | Long et al. |
| 12,088,244 B2 | 9/2024 | Thiel et al. |
| 12,114,747 B2 | 10/2024 | Thiel et al. |
| 12,119,461 B2 | 10/2024 | Thiel et al. |
| 12,237,701 B2 | 2/2025 | Thiel et al. |
| 12,289,004 B2 | 4/2025 | Thiel et al. |
| 12,294,200 B2 | 5/2025 | Thiel et al. |
| 12,294,231 B2 | 5/2025 | Thiel et al. |
| 12,302,039 B2 * | 5/2025 | Thiel .................... H01M 50/103 |
| 12,425,549 B2 * | 9/2025 | Thiel .................... G08B 25/016 |
| 2002/0074370 A1 | 6/2002 | Quintana et al. |
| 2002/0148078 A1 | 10/2002 | Salentine et al. |
| 2002/0178558 A1 | 12/2002 | Doshi et al. |
| 2003/0029494 A1 | 2/2003 | Ohkubo |
| 2003/0038611 A1 | 2/2003 | Morgan |
| 2003/0098060 A1 | 5/2003 | Yoshimi |
| 2003/0165744 A1 | 9/2003 | Schubert et al. |
| 2004/0144580 A1 | 7/2004 | Wu |
| 2004/0154076 A1 | 8/2004 | Yoo |
| 2004/0237178 A1 | 12/2004 | Landeros |
| 2005/0140331 A1 | 6/2005 | McQuade |
| 2005/0151930 A1 | 7/2005 | Harris |
| 2005/0161079 A1 | 7/2005 | Gray |
| 2005/0210722 A1 | 9/2005 | Graef et al. |
| 2006/0028166 A1 | 2/2006 | Closset et al. |
| 2006/0147172 A1 | 7/2006 | Luther et al. |
| 2006/0225781 A1 | 10/2006 | Locher |
| 2006/0267547 A1 | 11/2006 | Godovich |
| 2007/0030146 A1 | 2/2007 | Shepherd |
| 2007/0061941 A1 | 3/2007 | Makabe et al. |
| 2007/0099488 A1 | 5/2007 | Huffman et al. |
| 2007/0125815 A1 | 6/2007 | Tong |
| 2007/0222410 A1 | 9/2007 | Lee |
| 2007/0245444 A1 | 10/2007 | Brink |
| 2007/0295772 A1 | 12/2007 | Woodmansee |
| 2007/0299473 A1 | 12/2007 | Matos |
| 2008/0052439 A1 | 2/2008 | Young et al. |
| 2008/0190476 A1 | 8/2008 | Baruh |
| 2008/0223428 A1 | 9/2008 | Zeira |
| 2008/0223431 A1 | 9/2008 | Chu |
| 2008/0231225 A1 | 9/2008 | Lin |
| 2009/0004909 A1 | 1/2009 | Puzio et al. |
| 2009/0039122 A1 | 2/2009 | Antonioni |
| 2009/0044852 A1 | 2/2009 | Shadbolt et al. |
| 2009/0114690 A1 | 5/2009 | Landay |
| 2009/0131165 A1 | 5/2009 | Buchner et al. |
| 2009/0164174 A1 | 6/2009 | Bears et al. |
| 2009/0229655 A1 | 9/2009 | Lee |
| 2009/0269943 A1 | 10/2009 | Palli et al. |
| 2009/0272773 A1 | 11/2009 | Andrade |
| 2009/0279810 A1 | 11/2009 | Nobles |
| 2010/0008028 A1 | 1/2010 | Richardson et al. |
| 2010/0115680 A1 | 5/2010 | Thomas et al. |
| 2010/0147604 A1 | 6/2010 | Sakita |
| 2010/0213309 A1 | 8/2010 | Parks |
| 2010/0253501 A1 | 10/2010 | Gibson |
| 2010/0287681 A1 | 11/2010 | Storms, Jr. et al. |
| 2010/0300744 A1 | 12/2010 | Romanko et al. |
| 2011/0049992 A1 | 3/2011 | Sant'Anselmo et al. |
| 2011/0059642 A1 | 3/2011 | Slippy et al. |
| 2011/0064983 A1 | 3/2011 | Yokoyama et al. |
| 2011/0070472 A1 | 3/2011 | Cui et al. |
| 2011/0097069 A1 | 4/2011 | Braithwaite |
| 2011/0100425 A1 | 5/2011 | Osamura et al. |
| 2011/0101794 A1 | 5/2011 | Schroeder et al. |
| 2011/0162690 A1 | 7/2011 | Workman et al. |
| 2011/0173731 A1 | 7/2011 | McElroy et al. |
| 2011/0183183 A1 | 7/2011 | Grady et al. |
| 2011/0204114 A1 | 8/2011 | Miller |
| 2011/0242134 A1 * | 10/2011 | Miller ...................... G06F 3/017 |
| | | | 345/633 |
| 2011/0277809 A1 | 11/2011 | Dalland et al. |
| 2011/0278338 A1 | 11/2011 | Darnell et al. |
| 2011/0290683 A1 | 12/2011 | High et al. |
| 2011/0291607 A1 | 12/2011 | Rossi et al. |
| 2012/0025766 A1 | 2/2012 | Reade et al. |
| 2012/0043937 A1 | 2/2012 | Williams |
| 2012/0045929 A1 | 2/2012 | Streeter et al. |
| 2012/0060261 A1 | 3/2012 | Raviv |
| 2012/0073623 A1 | 3/2012 | Jones et al. |
| 2012/0090659 A1 | 4/2012 | Muchow et al. |
| 2012/0094166 A1 | 4/2012 | Lee et al. |
| 2012/0100414 A1 | 4/2012 | Sonta |
| 2012/0114990 A1 | 5/2012 | Jeong et al. |
| 2012/0156911 A1 | 6/2012 | Smith |
| 2012/0186000 A1 | 7/2012 | Raviv |
| 2012/0214042 A1 | 8/2012 | Wiegert |
| 2012/0227792 A1 | 9/2012 | Chen et al. |
| 2012/0235477 A1 | 9/2012 | Korman |
| 2012/0240999 A1 | 9/2012 | Yoshida et al. |
| 2012/0289081 A1 | 11/2012 | Izzard |
| 2013/0034765 A1 | 2/2013 | Kowalski |
| 2013/0043827 A1 | 2/2013 | Weinstein et al. |
| 2013/0049991 A1 | 2/2013 | Mothaffar |
| 2013/0084473 A1 | 4/2013 | Wahlquist et al. |
| 2013/0089756 A1 | 4/2013 | Kwag |
| 2013/0164567 A1 | 6/2013 | Olsson et al. |
| 2013/0181666 A1 | 7/2013 | Matthias et al. |
| 2013/0183562 A1 | 7/2013 | Workman et al. |
| 2013/0263922 A1 | 10/2013 | Jung et al. |
| 2013/0294712 A1 | 11/2013 | Seuk |
| 2013/0298958 A1 | 11/2013 | Kopylov |
| 2013/0305528 A1 | 11/2013 | Anderson |
| 2014/0061273 A1 | 3/2014 | Bullivant et al. |
| 2014/0062381 A1 | 3/2014 | Teggatz et al. |
| 2014/0072864 A1 | 3/2014 | Suzuta et al. |
| 2014/0082814 A1 | 3/2014 | Rober et al. |
| 2014/0095915 A1 | 4/2014 | Hitchcock et al. |
| 2014/0101831 A1 | 4/2014 | Balzano |
| 2014/0142507 A1 | 5/2014 | Armes |
| 2014/0206976 A1 | 7/2014 | Thompson et al. |
| 2014/0210399 A1 | 7/2014 | Urschel et al. |
| 2014/0226920 A1 | 8/2014 | Passavia |
| 2014/0361726 A1 | 12/2014 | Carkner |
| 2015/0060430 A1 | 3/2015 | Tsuge et al. |
| 2015/0086868 A1 | 3/2015 | Inoue et al. |
| 2015/0114444 A1 | 4/2015 | Lentine et al. |
| 2015/0114451 A1 | 4/2015 | Anderson et al. |
| 2015/0118543 A1 | 4/2015 | Kim et al. |
| 2015/0128845 A1 | 5/2015 | Desaulniers |
| 2015/0132622 A1 | 5/2015 | Gohl et al. |
| 2015/0198670 A1 | 7/2015 | Thiel |
| 2015/0200318 A1 | 7/2015 | Thiel |
| 2015/0216245 A1 | 8/2015 | Kinsley |
| 2015/0216274 A1 | 8/2015 | Akin et al. |
| 2015/0263377 A1 | 9/2015 | Brooks et al. |

(56) References Cited

U.S. PATENT DOCUMENTS

| | | | |
|---|---|---|---|
| 2015/0295617 A1 | 10/2015 | Lai et al. |
| 2016/0026423 A1 | 1/2016 | Zenoff |
| 2016/0112004 A1 | 4/2016 | Thiel et al. |
| 2016/0118634 A1 | 4/2016 | Thiel et al. |
| 2016/0183394 A1 | 6/2016 | Raschilla et al. |
| 2016/0360146 A1 | 12/2016 | Smith |
| 2017/0045337 A1 | 2/2017 | Kim |
| 2017/0050259 A1 | 2/2017 | Schraff et al. |
| 2017/0110896 A1 | 4/2017 | Gissin et al. |
| 2017/0214103 A1 | 7/2017 | Onnerud et al. |
| 2017/0229692 A1 | 8/2017 | Thiel et al. |
| 2017/0245567 A1 | 8/2017 | Fathollahi et al. |
| 2017/0259956 A1 | 9/2017 | Hori et al. |
| 2017/0263902 A1 | 9/2017 | Hwang et al. |
| 2017/0264116 A1 | 9/2017 | Carkner et al. |
| 2017/0264237 A1 | 9/2017 | La Due |
| 2017/0280797 A1 | 10/2017 | Bayliss |
| 2018/0040910 A1 | 2/2018 | Chung et al. |
| 2018/0047994 A1 | 2/2018 | Perry et al. |
| 2018/0053919 A1 | 2/2018 | Thiel et al. |
| 2018/0062197 A1 | 3/2018 | Thiel et al. |
| 2018/0102518 A1 | 4/2018 | Thiel et al. |
| 2018/0102656 A1 | 4/2018 | Thiel et al. |
| 2018/0145445 A1 | 5/2018 | Louis et al. |
| 2018/0168065 A1 | 6/2018 | Thiel et al. |
| 2018/0249133 A1 | 8/2018 | Thiel et al. |
| 2018/0258882 A1 | 9/2018 | Thiel et al. |
| 2018/0309307 A1 | 10/2018 | Carkner |
| 2019/0081493 A1 | 3/2019 | Thiel et al. |
| 2019/0109349 A1 | 4/2019 | Thiel et al. |
| 2019/0133303 A1 | 5/2019 | Thiel et al. |
| 2020/0099023 A1 | 3/2020 | Thiel et al. |
| 2020/0112189 A1 | 4/2020 | McLean |
| 2020/0187379 A1 | 6/2020 | Thiel et al. |
| 2020/0288089 A1 | 9/2020 | Thiel et al. |
| 2020/0313610 A1 | 10/2020 | Thiel et al. |
| 2020/0343493 A1 | 10/2020 | Thiel et al. |
| 2021/0005850 A1 | 1/2021 | Thiel et al. |
| 2021/0032008 A1 | 2/2021 | Luo |
| 2021/0280933 A1 | 9/2021 | Thiel et al. |
| 2021/0289174 A1 | 9/2021 | Thiel et al. |
| 2021/0296925 A1 | 9/2021 | Long et al. |
| 2021/0313629 A1 | 10/2021 | Thiel et al. |
| 2022/0052536 A1 | 2/2022 | Thiel et al. |
| 2022/0231369 A1 | 7/2022 | Thiel et al. |
| 2022/0240654 A1 | 8/2022 | Thiel et al. |
| 2022/0285936 A1 | 9/2022 | Long et al. |
| 2023/0034714 A1 | 2/2023 | Thiel et al. |
| 2023/0208114 A1 | 6/2023 | Thiel et al. |
| 2023/0367284 A1 | 11/2023 | Moore et al. |
| 2023/0370414 A1 | 11/2023 | Moore et al. |
| 2023/0412119 A1 | 12/2023 | Thiel et al. |
| 2024/0113656 A1 | 4/2024 | Thiel et al. |
| 2024/0115020 A1 | 4/2024 | Thiel et al. |
| 2024/0128526 A1 | 4/2024 | Thiel et al. |
| 2024/0145836 A1 | 5/2024 | Thiel et al. |
| 2024/0145840 A1 | 5/2024 | Thiel et al. |
| 2024/0146037 A1 | 5/2024 | Thiel et al. |
| 2024/0250509 A1 | 7/2024 | Thiel et al. |
| 2024/0250541 A1 | 7/2024 | Thiel et al. |
| 2024/0266851 A1 | 8/2024 | Thiel et al. |
| 2024/0285062 A1 | 8/2024 | Thiel et al. |
| 2024/0297615 A1 | 9/2024 | Thiel et al. |
| 2024/0339708 A1 | 10/2024 | Thiel et al. |
| 2024/0422296 A1 | 12/2024 | Thiel et al. |
| 2024/0431065 A1 | 12/2024 | Thiel et al. |
| 2025/0015374 A1 | 1/2025 | Thiel et al. |
| 2025/0022968 A1 | 1/2025 | Thiel et al. |
| 2025/0023334 A1 | 1/2025 | Thiel et al. |
| 2025/0023512 A1 | 1/2025 | Thiel et al. |
| 2025/0105641 A1 | 3/2025 | Thiel et al. |
| 2025/0118976 A1 | 4/2025 | Thiel et al. |
| 2025/0167726 A1 | 5/2025 | Thiel et al. |
| 2025/0226677 A1 | 7/2025 | Thiel et al. |
| 2025/0267241 A1 | 8/2025 | Thiel et al. |

FOREIGN PATENT DOCUMENTS

| | | | |
|---|---|---|---|
| CN | 202474897 U | 10/2012 |
| CN | 202931205 U | 5/2013 |
| CN | 203434648 U | 2/2014 |
| CN | 203435168 U | 2/2014 |
| CN | 205452304 U | 8/2016 |
| DE | 102011054322 A1 | 4/2012 |
| DE | 202012104339 U1 | 2/2014 |
| GB | 2518669 A | 4/2015 |
| GB | 2553537 A | 3/2018 |
| JP | 2002325339 A | 11/2002 |
| JP | 2003174179 A | 6/2003 |
| JP | 2004103248 A | 4/2004 |
| JP | 2014003846 A | 1/2014 |
| KR | 101145898 B1 | 5/2012 |
| KR | 101159750 B1 | 6/2012 |
| KR | 101294972 B1 | 8/2013 |
| WO | 2013106474 A1 | 7/2013 |
| WO | 2015181673 A1 | 12/2015 |
| WO | 2016061508 A1 | 4/2016 |
| WO | 2017040724 A1 | 3/2017 |

OTHER PUBLICATIONS

CaSZLUTION Bag. Amazon. https://www.amazon.com/dp/B0DJ8TV2VX.%20Accessed%2021%20Nov.%202024. Accessed Nov. 21, 2024.
DE 202012104339 Machine English translation (Year: 2014).
EE-Dan; Repair Your Laptop Power Cord; Instructables.com; published Jun. 11, 2013; https://www.instructables.com/Repair-Your-Laptop-Power-Cord/ (Year: 2013).
Electropaedia; Battery and Energy Technologies; printout from Jul. 2, 2012; pp. 1-5 (Year: 2012).
Epsilor; ELI-0414 Rechargeable Li-ion Military Battery; accessed and printed Apr. 21, 2020 (Year: 2020).
Machine translation of CN202931205U, Liu et al., 2013 (Year: 2013).
Machine translation of JP 2002-325339A, Okada Tadao, 2002 (Year: 2002).
Machine translation of JP 2004-103248; accessed and printed Aug. 7, 2021 (Year: 2004).
Satgear. https://satgear.com/products/starlink-gen-3-4-bag-backpack. Accessed Nov. 21, 2024.
Simon Tay, "DIY Spring Cable Support—To prevent cable damage", Dec. 13, 2013, YouTube, (Year: 2013).
Starlink Mini Specifications https://www.starlink.com/specifications?spec=5 Accessed Nov. 22, 2024.
Starlink Roam. https://www.starlink.com/roam Accessed Nov. 21, 2024.
Translation of CN205452304 (Year: 2016).
Westover, Brian and Kan, Michael. SpaceX Selling $199 Backpack for Its Portable V4 Starlink Dish. PC Magazine, Nov. 12, 2024, https://www.pcmag.com/news/spacex-selling-199-backpack-for-its-portable-v4-starlink-dish. Accessed Nov. 21, 2024.
Yunhuan Group; 3 prong Australia AC power cord; archived Jul. 1, 2016; https://web.archive.org/web/20160701194647/http://www.yunhuanelectric.com/Australia-AC-Power-Cord-03.html (Year: 2016).

* cited by examiner

110

122

112

124

122

112

114

122

114

126

(PLAN-A)

(SIDE)

(PLAN-B)

(END-A)

122

116

(END-B)

156
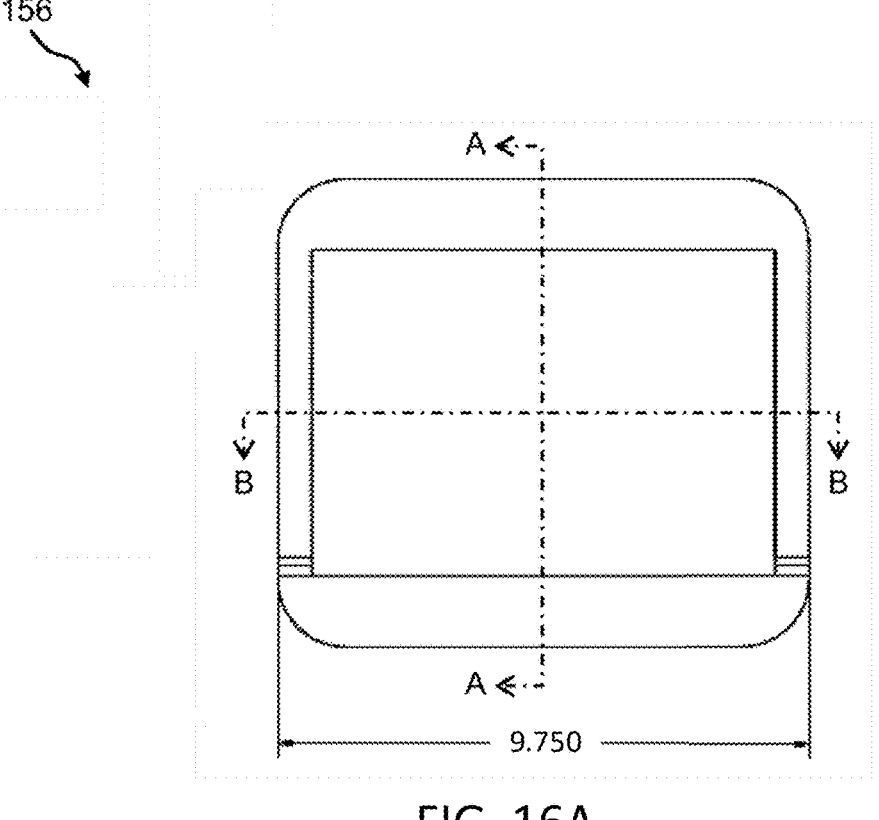
FIG. 16A
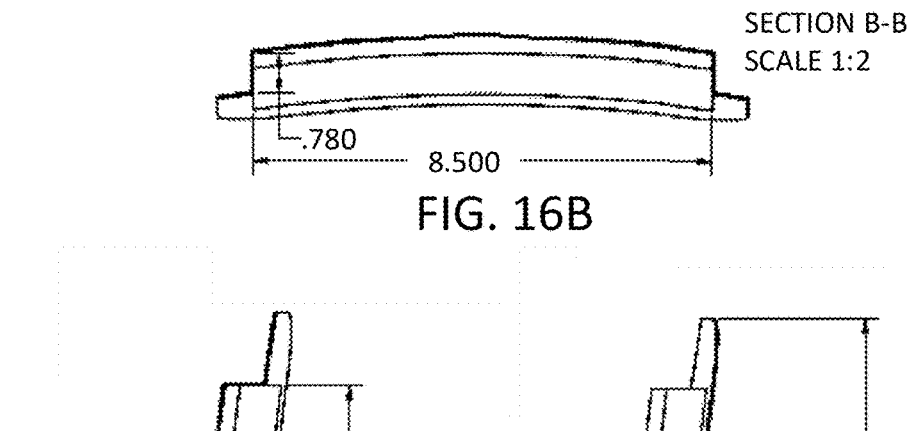
SECTION B-B
SCALE 1:2
.780
8.500
FIG. 16B
FIG. 16C
5.875
SECTION A-A
SCALE 1:2
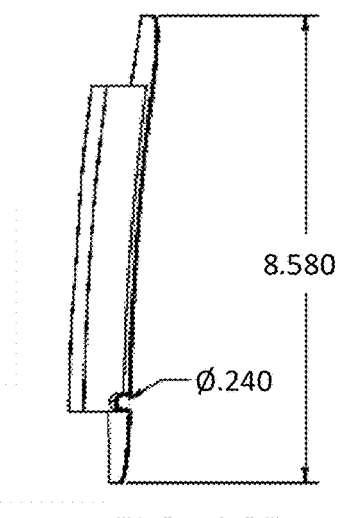
8.580
Ø.240
FIG. 16D

162

R (51.95)

R (51.54)

0.41 (MAT'L THIC.)

SECTION A-A
SCALE 1:2

A

R1.25 (4X)

8.58

9.75

2530

10

53 Optical Display

15 Load-bearing garment

51 Compass

35 Speaker

36 Audio Jack

45 Tactor

52 GPS

60 Frequency Scanner

40 Video Jack

25 Physiological Sensor

20 Forward-facing Camera

26 Rangefinder

30 Transceiver

50 Controllers

24 Processor + Memory

2440 SOC

55 Controller Flap

28 Environmental Sensors

32 Ambient Microphone

PERSONAL TACTICAL SYSTEM INCLUDING GARMENT, CAMERA, AND POWER DISTRIBUTION AND DATA HUB

CROSS REFERENCE TO RELATED APPLICATIONS

This application is related to and claims priority from the following U.S. patents and patent applications: this application is a continuation of U.S. application Ser. No. 19/198, 648, issued as U.S. Pat. No. 12,425,549, filed May 5, 2025, which is a continuation of U.S. application Ser. No. 18/815, 334, issued as U.S. Pat. No. 12,302,039, filed Aug. 26, 2024, which is a divisional of U.S. application Ser. No. 18/490, 407, issued as U.S. Pat. No. 12,081,914, filed Oct. 19, 2023, which is a continuation of U.S. application Ser. No. 17/197, 800, filed Mar. 10, 2021 and issued as U.S. Pat. No. 11,800,067, which a continuation of U.S. application Ser. No. 16/838,615, issued as U.S. Pat. No. 10,951,865, filed Apr. 2, 2020, which is a continuation of U.S. application Ser. No. 15/965,098, issued as U.S. Pat. No. 10,616,534, filed Apr. 27, 2018, which is a continuation-in-part of U.S. application Ser. No. 15/886,351, issued as U.S. Pat. No. 10,531,590, filed Feb. 1, 2018, which is a continuation-in-part of U.S. application Ser. No. 15/836,259, issued as U.S. Pat. No. 10,476,054, filed Dec. 8, 2017, which is a continuation-in-part of U.S. application Ser. No. 15/720,270, issued as U.S. Pat. No. 10,461,289, filed Sep. 29, 2017, which is a continuation-in-part of U.S. application Ser. No. 14/520, 821, issued as U.S. Pat. No. 9,780,344, filed Oct. 22, 2014. U.S. application Ser. No. 15/720,270, issued as U.S. Pat. No. 10,461,289, is also a continuation-in-part of U.S. application Ser. No. 15/664,776, issued as U.S. Pat. No. 11,462,649, filed Jul. 31, 2017, which is a continuation-in-part of U.S. application Ser. No. 15/470,382, issued as U.S. Pat. No. 11,302,987, filed Mar. 27, 2017, which is a continuation-in-part of U.S. application Ser. No. 14/516,127, filed Oct. 16, 2014, now abandoned. Each of the U.S. Applications mentioned above is incorporated herein by reference in its entirety.

BACKGROUND OF THE INVENTION

1. Field of the Invention

The present invention relates generally to portable equipment for military, law enforcement, aviation, personal survival, hiking, sporting, recreation, hunting, and camping applications and, more particularly, to a portable battery pack comprising a battery enclosed by a wearable and replaceable pouch or skin.

2. Description of the Prior Art

Portable power sources are used in, for example, military applications, law enforcement applications, aviation applications, wilderness and personal survival applications, hiking and camping applications, sporting and recreation applications, hunting applications, land surveying and expedition applications, and disaster relief efforts. For example, portable battery packs exist for carrying in a backpack or for wearing on the body. These battery packs, however, can be heavy and inconvenient to access and connect to devices requiring electrical power. Further, some applications require that the appearance of the battery pack blend with the environment in which they are used. Current battery packs, however, might not offer flexibility of appearance or the consumer is forced to buy one battery pack for one environment and a different battery pack for a different environment.

Additionally, portable battery packs are increasingly required to provide power to a plurality of peripheral electronic devices. The plurality of peripheral electronic devices is often connected to a power distribution and data hub, which supplies power to the plurality of peripheral electronic devices and transfers data between the peripheral electronic devices. Prior art patent documents include the following:

U.S. Pat. No. 6,784,833 for personal surveillance system with locating capabilities by inventor James P. Evans, filed Feb. 21, 2003 and issued Aug. 31, 2004, is directed to a personal surveillance system configured to be worn by an individual includes a communication system configured to record communication files, a locating system configured to determine a location of the personal surveillance system, and a transmitter configured to send the communication files and the location of the personal surveillance system to a remote monitoring station. The locating system includes a satellite system interface configured to determine the location of the personal surveillance system and an alternate positioning system configured to determine the location of the personal surveillance system in at least one situation where the satellite system interface cannot determine the location of the personal surveillance system.

U.S. Pat. No. 7,124,593 for temperature conditioning apparatus for the trunk of a human body by inventor Steve Feher, filed Sep. 2, 2003 and issued Oct. 24, 2006, is directed to a temperature conditioning apparatus for the human body includes a vest or other clothing unitary with a thermoelectric or Stirling cycle heat pump worn by the user. The unit is powered by a battery source worn on the user's belt or other part of his or her body, or by an externally-mounted electrical energy source, for example, in a vehicle. The vest has front and rear panels with an air flow layer and permeable inside layer that accept and release conditioned air to the user. In one example embodiment, the vest is used with body armor or other protective layers, that is, the vest is worn underneath body armor or body armor is built into the vest, or the vest is used without body armor to cool the user in an exceptionally hot environment such as a non-air conditioned space in hot weather.

U.S. Pat. No. 7,624,453 for modular garment by inventor Frederic Rene et al., filed Jun. 5, 2007 and issued Dec. 1, 2009, is directed to a modular garment having: a thick and relatively inflexible protective first garment, intended for optional wear; and an electronic garment having a flexible central part at the back and two side parts; the width of the central part is adjustable so that it can be made narrow or wide (depending on whether the electronic garment is worn on its own or over the first garment); several electrical and/or electronic devices are supported by the side parts; and at least one electrical cable runs across the inside face of the electronic garment between the electrical devices, the at least one electrical cable being attached to the side parts without being attached to the central part in front of which it runs freely along a curved path so as to be able to adapt to the modifications in the width of the central part.

U.S. Pat. No. 7,805,114 for in situ re-configurable wireless communications system (ircwcs) by inventor W. Vincent Quintana, et al., filed Nov. 26, 2002 and issued Sep. 28, 2010, is directed to an In Situ Re-Configurable Wireless Communications System (IRCWCS) in combination with a wearable computer provides an individual user at a public gathering place, fixed facility or non-stationary object with new and enhanced capabilities. In one embodiment of the invention, the re-configurable wireless communication system includes a portable wireless access unit and a Long Range Ethernet (LRE) network switch that connects to an existing LAN. A bridge device such as an LRE puck connects the portable wireless access unit to the LRE network switch through a communications infrastructure. A wearable computer in wireless communication with the portable wireless access unit using a radio frequency link allows communication of video, voice and data to and from the existing LAN through the LRE network switch. The LRE network switch couples to a central command station through the existing LAN.

U.S. Pat. No. 8,984,666 for protective outer garment apparatus with viewing window for handheld items by inventor Salvatore LoBue, filed Mar. 7, 2014 and issued Mar. 24, 2015, is directed to a protective outer garment apparatus is disclosed which incorporates an at least one viewing window therein. Thus, as user is able to keep a handheld item positioned underneath or otherwise within an interior of the garment while still being able to safely view the item through the viewing window from an optimal viewing angle.

U.S. Pat. No. 9,138,022 for wearable window pockets for wireless devices by inventor Susan J. Walker, filed Dec. 10, 2011 and issued Sep. 22, 2015, is directed to a scarf comprising: (1) a length of fabric having a first end, a second end, a front surface defining a first opening, and a rear surface defining a second opening; and (2) a pocket disposed on the length of fabric. In various embodiments, when a wireless device is disposed within the pocket in a particular position, (1) the first opening is sized to allow a user to view at least a portion of a screen of the wireless device through the first opening; (2) the second opening is adapted so that the second opening aligns with a camera lens of the wireless device; and (3) the first opening and the second opening are adapted so that the user may operate the wireless device to cause the wireless device to use the camera lens to take a photograph through the second opening.

U.S. Publication No. 20040154076 for garment and detachable garment liner having a secure and integrated pocket system by inventor Jeasung Jay Yoo, filed Feb. 5, 2004 and published Aug. 12, 2004, is directed to an outer garment that can be fashionably acceptable for either business and/or casual use is provided. The outer garment can, optionally, include inner pocket(s). The inner pocket(s) are generally accessible from inner surface of the outer garment.

U.S. Publication No. 20040237178 for self-contained on land on water in air protective apparatus for mass protection and mass continuation by inventor Gaspar Landeros, filed May 25, 2004 and published Dec. 2, 2004, is directed to inventions that aspire to improve the protection for human beings, against extreme conditions, where conventional safety and protective equipment are not practical for use in mass protection and mass continuation of human beings. My invention is designed to improve the chances of survival, because of the ability to collect, and recirculate the air through air-filters, for human consumption and for heating and cooling of the body. All of these is done by the air supplied by the air-compressors integrated to the protective suit, and with a minimal of stress to the lungs, because the person does not have to suck air through APR respirators once the air-tanks are filled with air. Also, improve the chances of survival in extreme conditions because of the diversity of tools and the toughness of the materials used. All done without the aid of electric motors or fans.

U.S. Publication No. 20070030146 for sensor-based communications device activator by inventor James Shepherd, filed Aug. 2, 2006 and published Feb. 8, 2007, is directed to a sensor-based communications device activator, including a first signal transmitting device having a sensor and a second signal transmitting device, which may be preprogrammed to automatically alert emergency rescue personnel to the location of an individual who, due to an emergency, is unable to alert the emergency personnel on his/her own behalf. When one or more stimuli are sensed by the sensor, the activator directs a communications device, optionally including a GPS-based location tracking technologies component, to contact an emergency service. Alternatively, a manual alert device of the activator may be activated by the user to achieve this same result. Whether the communications device is contacted automatically or manually, the emergency service not only will learn that the individual is in danger, but can also learn, via the GPS-based component, the location of the endangered individual.

U.S. Publication No. 20070245444 for specialty clothing designed to hold portable electronic devices by inventor William Brink, filed Apr. 14, 2006 and published Oct. 25, 2007, is directed to clothing and more specifically to garments designed and customized to securely restrain portable electronic devices. The clothing has at least one pocket that may be specifically sized to a known electronic device shape or may be adjustable to devices of various shapes to provide a snug, secure and, safe environment for the electronic device and any electronic device accessories. The pocket also may contain a channel leading from the pocket to one or more openings near the top of the garment to allow for access to headphones. Further, channels may lead from one pocket to one or more additional pockets to allow for interconnectivity between an electronic device and an electronic device accessory. The internal channels may also contain a strap to secure wires associated with a portable electronic device or accessory in place.

U.S. Publication No. 20090272773 for multi-function backpack-vest device by inventor Jose Andrade, filed May 1, 2009 and published Nov. 5, 2009, is directed to a multi-function backpack-vest that allows for size adjustment so that the backpack-vest may be worn by any user, regardless of size. The backpack-vest has various compartments in which users may place items. Some of these compartments are so designed that body-armor, personal floatation materials or insulation material may be placed within them. Also, the backpack-vest features a compartment in which a laptop may be placed and when housed in said compartment the laptop will be supported on a work platform, which is supported by straps on either side of said platform, connecting the platform to the backpack-vest.

U.S. Publication No. 20110097069 for camera device by inventor Sarah Louise Braithwaite, filed Jan. 23, 2009 and published Apr. 28, 2011, is directed to a camera head mount comprising: a strap for encircling the head and means for securing the strap around the head to prevent or hinder slippage of the camera head mount once secured in its mounted position; a camera holding pocket provided on the strap and situated such that when the camera head mount is secured in its mounted position the camera holding pocket is adapted to hold a camera in a forward-facing position against the forehead of the user, the lens of a mounted camera pointing forwards and through a lens aperture provided in the camera holding pocket at the front thereof, the camera holding pocket otherwise being adapted substantially to enclose a camera therein in a mounted and supported position on the forehead of the user.

U.S. Publication No. 20120060261 for garment pocket for touch screen mobile devices by inventor Ben Raviv, filed Dec. 31, 2010 and published Mar. 15, 2012, is directed to a garment-engaged pocket housing for portable electronic devices provides a body engaged mount for use of such devices. The pocket housing provides a pocket for the electronic device on the sleeve of a garment. A front wall of the pocket is formed of transparent material allowing finger input to the device within the pocket and a view of the device display. A remote antenna may be provided for reception as well as shielding in the rear of the pocket to protect the user against RF transmission. The pocket housing may be removably engaged. A fabric conduit along the sleeve provides a passageway for earphones and the like while also preventing stretching of the sleeve from the weight of the device.

U.S. Publication No. 20120186000 for t-shirt pocket for touch screen mobile devices by inventor Ben Raviv, filed Jan. 23, 2012 and published Jul. 26, 2012, is directed to a garment pocket for a shirt or T-shirt formed of textile fabric. The pocket is configured to house a touchscreen-operated electronic device such as a smartphone or pad computer or PDA when positioned therein through the employment of a front wall formed of transparent material formed of polymeric material adapted to communicate the touch of a user's fingers to the touchscreen through the transparent material. A closure is employed to retain the electronic device in the pocket. A channel formed in the textile shirt fabric provides a conduit for wires engaged to the electronic device in the pocket to communicate to the collar area of the shirt such as for headphones. Stitching in the textile fabric between the pocket engagement area of the shirt to the shoulder area of the shirt communicates and distributes the weight in the pocket to the shoulder area of the shirt.

U.S. Publication No. 20140082814 for apparel systems, wearable item systems, decor systems, and other systems and designs by inventor Mark B. Rober, et al., filed Oct. 18, 2013 and published Mar. 27, 2014, is directed to systems and methods for apparel, wearable items, decor items, and other apparatuses configured to support a handheld device configured to generate a display are presented. Some garments are presented that have a wearable pocket for at least partially supporting a handheld device configured to generate a display that is at least partially visible through one or more apertures in the garment. Some apparel systems are presented that are configured to display an animation through a wearable prop. Ornamental designs for surface indicia, including color surface indicia, are also presented.

U.S. Publication No. 20140101831 for vest assembly by inventor Alfiero F. Balzano, filed Jan. 11, 2013 and published Apr. 17, 2014, is directed to a vest assembly is provided for use by a wearer. The vest assembly comprises a vest body, a plurality of communication components disposed within the vest body, an antenna disposed within, or otherwise connected to the vest body, a rechargeable power supply, and a thermoelectric transducer assembly for converting body thermal energy into electrical energy to recharge the power supply and/or power the communication components. The antenna is in electrical communication with at least one of the plurality of communication components.

U.S. Publication No. 20150216245 for athletic apparel with a pocket located on or near the hip region for holding a mobile device or music player by inventor Mark Kinsley, filed Oct. 4, 2014 and published Aug. 6, 2015, is directed to athletic pants/shorts/skirts having a rectangular shaped pocket located on or near the hip region with the aperture located on or near the waistband area creating a space for snugly restraining a mobile device, while limiting anterior and posterior exposure to environmental factors, objects and equipment that could come into contact with the device(s) and preventing the device from being laid upon when the wearer is performing exercises that require the posterior or anterior region to come into contact with equipment or other environmental factors. The present invention also moves the location of the mobile device closer to an athlete's ears than a standard inset pocket providing a headphone cord more flexibility.

U.S. Publication No. 20150263377 for flexible batteries by inventor Louise Brooks, et al., filed Oct. 2, 2013 and published Sep. 17, 2015, is directed to flexible batteries, comprising at least two cells, wherein at least two cells are connected by flexible connectors, such that the battery can be bent. The batteries can be incorporated into clothing and gear.

U.S. Publication No. 20160360146 for user-worn recording system by inventor Patrick W. Smith, filed Jul. 29, 2015 and published Dec. 8, 2016, is directed to a body-worn system for capturing visual and audio information. The body-worn system includes a housing having a first end portion and a second end portion. The first end portion has a first opening and the second end portion has a second opening. The housing is formed of a flexible material that retains its shape after being manipulated. A camera is positioned in the housing so that the camera captures visual information through the first opening. A microphone is positioned in the housing so that the microphone captures audio information through the second opening. The housing fits at least partially around a user's neck. The first end portion and the second end portion are manipulated so that first opening and the second opening are oriented toward the field of view of the user while the housing is positioned around the neck of the user.

U.S. Publication No. 20170045337 for smart wearable mine detector by inventor Chiwook Kim, filed Apr. 17, 2015 and published Feb. 16, 2017, is directed to improving the problems of conventional mine detectors, the purpose of the present invention is to provide a smart wearable mine detector comprising a human body antenna unit, a main microprocessor unit, a smart eyeglasses unit, a body-mounted LCD monitor unit, a wireless data transmission and reception unit, a belt-type power supply unit, a black box-type camera unit, and a security communication headset, the smart wearable mine detector: can be detachably worn on the head, torso, arm, waist, leg and the like of a body while a combat uniform is worn, thereby having excellent compatibility with conventional combat uniforms; enables a human body antenna unit which is detachably attached to a body and detects a mine through a super high-frequency RF beam and a neutron technique to be applied so as to detect the mine by identifying metals, nonmetals, and initial explosives of the mine; enables mines buried on the ground and under the ground to be detected in all directions (360. degree.), and a distance, location, form, and materials of the mines to be exhibited on smart eyeglasses and a body-mounted LCD monitor unit in real time as 2D or 3D images such that a combatant can engage in battle avoiding mines, thereby improving combat efficiency by 90% when compared to existing combat efficiency; enables a battle to be carried out for three to seven days through a twin self-power supply system of a portable battery and a belt-type power supply unit even without need for charging power; and enables combat situations in a remote place to be monitored, in real time, in a remote combat command server, and allows each combatant to share combat information one to one such that it is possible to construct a smart combat command system capable of remotely commanding real combat situations as if one was on site of the battle.

U.S. Publication No. 20170245567 for articles of clothing with integrated portable mobile electronic device enhancements by inventor Andy Fathollahi, et al., filed Jan. 3, 2017 and published Aug. 31, 2017, is directed to articles of clothing having integrated portable electronic device enhancement features are disclosed. The articles of clothing include a plurality of pockets configured to securely store electronic devices and accessories therefore and cable routing to provide seamless integration and connectivity between those devices while allowing user accessibility. A flexible rechargeable battery is also provided and configured to integrate into one or more pockets and connect to other electronic devices through passages positioned within the article of clothing. A wireless Bluetooth media controller is uniquely integrated into the article of clothing to facilitate external wireless control of devices contained within the article of clothing. The articles of clothing are configured to allow liners to be fastened there-within yet maintain usability of cable routing features in the article of clothing and user accessibility to mobile device compartments.

U.S. Publication No. 20170280797 for pocket design for garments to allow mobile device users hands free recording of video, audio and other data by inventor Terrence Roy Bayliss, filed Apr. 3, 2016 and published Oct. 5, 2017, is directed to a pocket that is incorporated into a garment to hold a mobile device safely and securely on the wearer with its sensors exposed such that the mobile device functionality relative to data collection or utilization (audio, video, photographic and other data) is possible in a hands free nature. This will allow a user, without the need for special cases or harnesses, to do hands free POV (Point of View) video recording, photographs, audio recording, and other application driven data collection such as GPS trip mapping, environmental data collection, and two way voice activated communication. The intention is to have the pocket to be a part of many types of clothing consumers wear, so the mobile device is easily put to use for the described functions, is readily available when needed and is a convenient and inexpensive alternative to special harnesses, holders or carriers. The invention also carries out the functions of a standard mobile device holster or harness such that the user can access the device for playing music or other functions in a hands free manner.

U.S. Pat. No. 2,501,725 for instrument structure for portable testing voltmeters by inventor Knopp, filed Apr. 9, 1945 and issued Mar. 28, 1950, is directed to portable electric voltage testers and more particularly in the instruments used in such testers; for indicating the values of alternating and direct current voltages, and the polarity of unidirectional current circuits tested; the presence or absence of electrical energy on metallic parts in the vicinity of electrical energy sources; etc.

U.S. Pat. No. 5,537,022 for enclosed battery holder by inventor Huang, filed Aug. 22, 1995 and issued Jul. 16, 1996, is directed to an enclosed battery charger including a seat, a cover, and a conductive metal plate means. The seat is provided with a partition which has one end thereof extending upwardly to form a partition rib for preventing contact of two conductive metal plates. A front wall of the seat is provided with an inverted-L shaped hook piece, and a rear wall of the seat is provided with an engaging hole. The cover is provided with a rib having a rib section projected from an inner side thereof. The rib and rib section of the cover enclose a rib of the seat. The cover also has a hook piece which is retained by the engaging hole. The cover further has a slot corresponding to the hook piece of the front wall. A push-button switch and a metal piece are further provided to control connection of electricity. A post is disposed in the seat for preventing the wires and the conductive metal plates from slipping off. In addition, an insulated plate is passed through a slot in the cover to be disposed between the batteries and the conductive metal plates for preventing abnormal electricity discharge.

U.S. Pat. No. 5,653,367 for holster arrangement for a transportable communications device by inventor Abramson, filed Sep. 27, 1995 and issued Aug. 5, 1997, is directed to a holster arrangement for a transportable communications device that is worn by a user and is arranged to have a holder portion positioned on either side of the user's torso. Straps extending from a shoulder pad are utilized to support the holder portion and to secure the holster arrangement to the user. The holder portion is arranged to support a case in varied positions with the case being mountable on the holder portion at a substantially vertical position and at angular positions to the holder portion. Two angular mounting positions are provided to facilitate the use of the holster arrangement when fitted to either side of the user. The case for holding the communications device is readily detached from the holder of the holster arrangement.

U.S. Pat. No. 5,680,026 for tool belt with battery assembly by inventor Lueschen, filed Mar. 21, 1994 and issued Oct. 21, 1997, is directed to an apparatus comprising: a battery assembly including exactly five parallel rows of C cells, each row having exactly four C cells arranged end to end in series, all of the rows being electrically connected together in series, a casing which surrounds the rows, a cable having a first end inside the casing, the first end of the cable having a first lead electrically connected to one end of the series connection of the rows, and the first end of the cable having a second lead electrically connected to the other end of the series connection of the rows, the cable having a second end outside the casing, and a male connector electrically connected to the second end of the cable; a belt adapted to be worn around the waist of a user, the belt having an adjustable girth so as to fit users having different waist sizes; a pocket supported by the belt and slideably movable along the girth of the belt, the pocket closely housing the battery assembly; and a portable, hand held, electrically powered cable tie tensioning tool, the tool having a female connector connected to the male connector of the battery assembly.

U.S. Pat. No. 6,259,228 for battery pack and protective pouch therefor by inventors Becker, et al., filed Feb. 11, 2000 and issued Jul. 10, 2001, is directed to a protective housing for a jump-starting battery pack includes a flexible sheet of multi-layered, electrically insulating fabric material including inner and outer nylon layers and a foam padding layer sandwiched therebetween adapted to be folded around the case of a battery pack positioned in the middle of the sheet and held closed by Velcro-type closures. Retaining straps secure the battery pack in place, one of the straps having stacks of secured-together folds positioned on opposite sides of the case to provide supports on which the connector clamps of the battery pack jumper cables can be clamped, with the cables projecting from the open top of the housing to serve as handles.

U.S. Pat. No. 6,380,713 for battery pack by inventor Namura, filed Apr. 25, 2001 and issued Apr. 30, 2002, is directed to a battery pack holding a first block adjacent to a second block in a case. The first and second blocks are a plurality of circular cylindrical batteries arranged in the same horizontal plane. The first and second blocks are each made up of N batteries lined up side-by-side in parallel fashion to form a lateral battery array, and M perpendicular batteries in close proximity to an electrode end of the lateral battery array and oriented at right angles to the batteries of the lateral battery array. The circular cylindrical batteries of the first and second blocks are arranged with point-by-point symmetry about the center of the rectangular case. Further, the electrode ends of perpendicular batteries protrude beyond a side of the lateral battery array towards the neighboring block to provide center region space between the first and second blocks.

U.S. Pat. No. 6,727,197 for wearable transmission device by inventors Wilson, et al., filed Nov. 17, 2000 and issued Apr. 27, 2004, is directed to a knitted, woven, or braided textile ribbon including fibers and having a length and selvage edges and one or more transmission elements running the length of the ribbon in place of one or more of the fibers and integrated with the fibers to transmit data and/or power along the length of the ribbon.

U.S. Pat. No. 7,074,520 for contoured casing of mating clamshell portions for an electrochemical cell by inventors Probst, et al., filed Nov. 4, 2005 and issued Jul. 11, 2006, is directed to an electrochemical cell of either a primary or a secondary chemistry housed in a casing having opposed major side walls of a contoured shape.

U.S. Pat. No. 7,141,330 for secondary battery accommodation case by inventor Aoyama, filed Mar. 4, 2003 and issued Nov. 28, 2006, is directed to a secondary battery accommodation case with improved exterior surface having no parting line in two or more exterior faces out of four exterior faces encircling the battery accommodation portion. It comprises a substantially rectangular bottom case having a battery accommodation portion for accommodating secondary batteries and a top case to be assembled with the bottom case for closing the battery accommodation portion. In the assembled condition of the top case and the bottom case, the exterior face of the top case closing the secondary battery accommodation portion is made equal to or lower than two or more open edges out of four exterior faces encircling the battery accommodation portion in the bottom case.

U.S. Publication No. 20090279810 for battery bag by inventor Nobles, filed May 6, 2008 and published Nov. 12, 2009, is directed to a battery bag assembly including an elongated watertight bag (WTB), a sealable access port (SAP), a battery tray (BT), a power feed-through (PFT), and an electric power conduit (EPC). SAP has an elongated configuration extending along an elongated length of the WTB. BT is disposed within the WTB so that its elongated configuration is aligned with the elongated length of the WTB. BT has electrical connector sockets (EPSs) mounted thereon for mating with oppositely sexed connectors provided on batteries. PFT is disposed on a wall of the watertight bag. PFT is configured to provide a watertight seal for an electrical conductor passing from an interior of the watertight bag to an exterior of the watertight bag. EPC is electrically connected for coupling electric power from the EPSs on the BT to a remote device.

U.S. Publication No. 20120045929 for PALS compliant routing system by inventors Streeter, et al., filed Aug. 23, 2011 and published Feb. 23, 2012, is directed to a PALS compliant routing system including flexible fabric cabling routed through the webbing of a PALS grid. A first connector or device is coupled to the cabling. Other connectors coupled to the cabling subsystem include a retention mechanism configured to retain them in the channels of the PALS webbing.

U.S. Publication No. 20130294712 for ammunition magazine pouch by inventor Seuk, filed Oct. 30, 2012 and published Nov. 7, 2013, is directed to a hydration pouch including an elastic band that compresses the bottom portion of the hydration bladder inside the pouch to more evenly distribute the fluid contents of the bladder vertically within the pouch, thereby preventing the pooling of the fluid contents in the bottom of the bladder.

U.S. Publication No. 20140072864 for packaging material for lithium ion battery, lithium ion battery, and method for manufacturing lithium ion battery by inventors Suzuta, et al., filed Nov. 8, 2013 and published Mar. 13, 2014, is directed to a packaging material for a lithium ion battery including: a base material layer that is formed from a film obtained by biaxially stretching a multi-layered coextruded film including a first thermoplastic resin layer having rigidity and chemical resistance and being disposed at an outer side thereof, a second thermoplastic resin layer having a capability of propagating stress and adhesiveness, and a third thermoplastic resin layer having toughness; a metal foil layer that is laminated on one surface of the base material layer; an anti-corrosion-treated layer that is laminated on the metal foil layer; an inner adhesive layer that is laminated on the anti-corrosion-treated layer; and a sealant layer that is laminated on the inner adhesive layer.

U.S. Pat. No. 8,720,762 for load carrier systems and associated manufacturing methods by inventors Hilliard, et al., filed Jun. 17, 2011 and issued May 13, 2014, is directed to load carrier systems and associated manufacturing methods. In one embodiment, a load carrier system can include a unitary piece of material. The unitary piece of material can include a body portion comprising a first face side, an opposing face side, a first peripheral edge and an opposing second peripheral edge; and one or more straps comprising a respective extended end, wherein the straps are an integral part of the body portion; wherein the one or more straps are folded over onto the first face side adjacent to the first peripheral edge; and wherein at least one respective end of the one or more straps is fastened to the opposing second peripheral edge.

U.S. Pat. No. 9,144,255 for system for attaching accessories to tactical gear by inventor Perciballi, filed Feb. 1, 2013 and issued Sep. 29, 2015, is directed to designs and methods for a reversible, textile-based tactical article. In one embodiment the tactical article comprises a textile based panel perforated with an array of slots arranged in vertical and horizontal, spaced apart rows. The panel may be adapted for attaching accessories to either side by lacing a strap through a row of the slots and through webbing loops on the accessory positioned between the slots. One side of the panel may have a first appearance, and the other side a second appearance that is different from the first appearance.

U.S. Publication No. 20150295617 for waterproof case by inventors Lai, et al., filed Apr. 13, 2015 and published Oct. 15, 2015, is directed to a protective case for an electronic device may include a housing, a case cover and a gasket positioned between the housing and the case cover. The housing may include a case member, having a plurality of housing snap attachment structures formed therein. The case cover may likewise include case cover snap attachment structures formed thereon that couple with the housing snap fit structures. The gasket is positioned between planar surfaces of the case member and case cover so that it is axially compressed between the case member and the case cover to provide a water and air tight seal, with the compression of the gasket being maintained by the connection of the housing snap attachment structures and the case cover snap attachment structures.

SUMMARY OF THE INVENTION

The present invention relates generally to portable equipment for military, law enforcement, aviation, personal survival, hiking, and camping applications and, more particularly, to a camera, battery, and vest system.

In one embodiment, the present invention provides a tactical system including a load-bearing garment, at least one camera for capturing images, and a pouch with one or more batteries enclosed in the pouch, wherein the at least one camera is incorporated in and/or removably attachable to the load-bearing garment, wherein the pouch is removably attachable to the load-bearing garment, and wherein the one or more batteries are operable to supply power to the at least one camera.

In another embodiment, the present invention provides a tactical system including a load-bearing garment, at least one camera for capturing images, at least one processor, at least one memory, image recognition software operable to identify at least one object and/or at least one person in the images, and a pouch with one or more batteries enclosed in the pouch, wherein the at least one camera is incorporated in and/or removably attachable to the load-bearing garment, wherein the pouch is removably attachable to the load-bearing garment, wherein the one or more batteries are operable to supply power to the at least one camera, and wherein the at least one camera and the at least one processor have real-time or near-real-time two-way communication.

In yet another embodiment, the present invention provides a tactical system including a load-bearing garment, at least one camera for capturing images, at least one power distribution and data hub, a smartphone or a tablet, and a pouch with one or more batteries enclosed in the pouch, wherein the at least one camera is incorporated in and/or removably attachable to the load-bearing garment, wherein the pouch is removably attachable to the load-bearing garment, wherein the one or more batteries are operable to supply power to the at least one camera, wherein the one or more batteries are operable to supply power to the at least one power distribution and data hub, and wherein the at least one power distribution and data hub and/or the one or more batteries are operable to supply power to the smartphone or the tablet.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 16A illustrates a top perspective view of the battery cover of the portable battery pack.

FIG. 16B illustrates a cross-section view of the battery cover of the portable battery pack.

FIG. 16C illustrates another cross-section view of the battery cover of the portable battery pack.

FIG. 16D illustrates yet another cross-section view of the battery cover of the portable battery pack.

DETAILED DESCRIPTION

Figure 1:
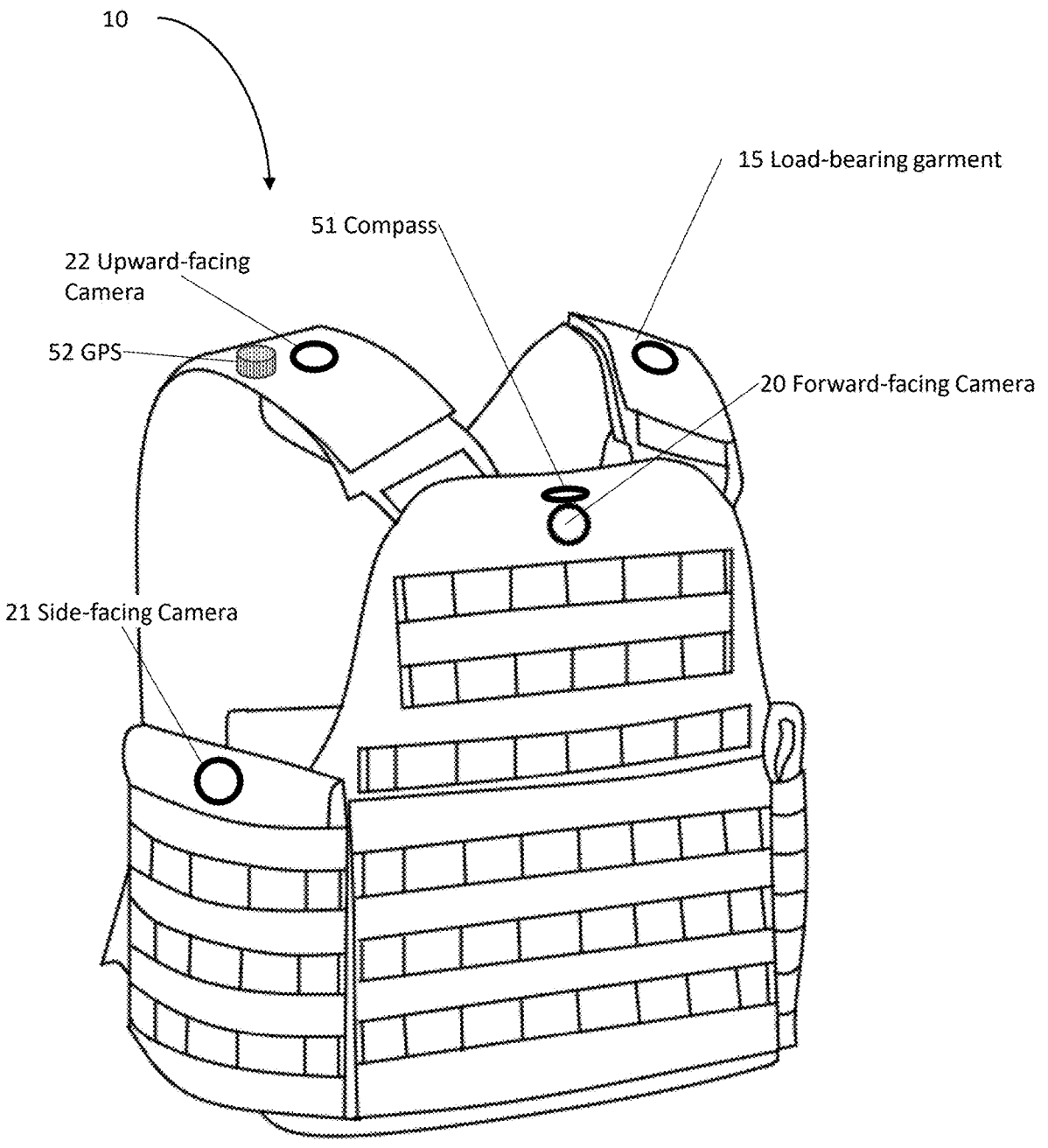
FIG. 1 illustrates a front perspective view of an example of the tactical system according to the present invention.

The present invention is generally directed to a personal tactical system for military, law enforcement, aviation, personal survival, hiking, sports, recreation, hunting, land surveying, expedition, and camping applications.

In one embodiment, the present invention provides a tactical system including a load-bearing garment, at least one camera for capturing images, and a pouch with one or more batteries enclosed in the pouch, wherein the at least one camera is incorporated in and/or removably attachable to the load-bearing garment, wherein the pouch is removably attachable to the load-bearing garment, and wherein the one or more batteries are operable to supply power to the at least one camera.

In another embodiment, the present invention provides a tactical system including a load-bearing garment, at least one camera for capturing images, at least one processor, at least one memory, image recognition software operable to identify at least one object and/or at least one person in the images, and a pouch with one or more batteries enclosed in the pouch, wherein the at least one camera is incorporated in and/or removably attachable to the load-bearing garment, wherein the pouch is removably attachable to the load-bearing garment, wherein the one or more batteries are operable to supply power to the at least one camera, and wherein the at least one camera and the at least one processor have real-time or near-real-time two-way communication.

In yet another embodiment, the present invention provides a tactical system including a load-bearing garment, at least one camera for capturing images, at least one power distribution and data hub, a smartphone or a tablet, and a pouch with one or more batteries enclosed in the pouch, wherein the at least one camera is incorporated in and/or removably attachable to the load-bearing garment, wherein the pouch is removably attachable to the load-bearing garment, wherein the one or more batteries are operable to supply power to the at least one camera, wherein the one or more batteries are operable to supply power to the at least one power distribution and data hub, and wherein the at least one power distribution and data hub and/or the one or more batteries are operable to supply power to the smartphone or the tablet.

None of the prior art discloses a ballistic load-bearing garment, with one or more batteries and at least one camera. Furthermore, none of the prior art discloses such a system with a processor running image recognition software operable to identify approaching objects and alert the user.

Referring now to the drawings in general, the illustrations are for the purpose of describing one or more preferred embodiments of the invention and are not intended to limit the invention thereto.

System

Figure 2:
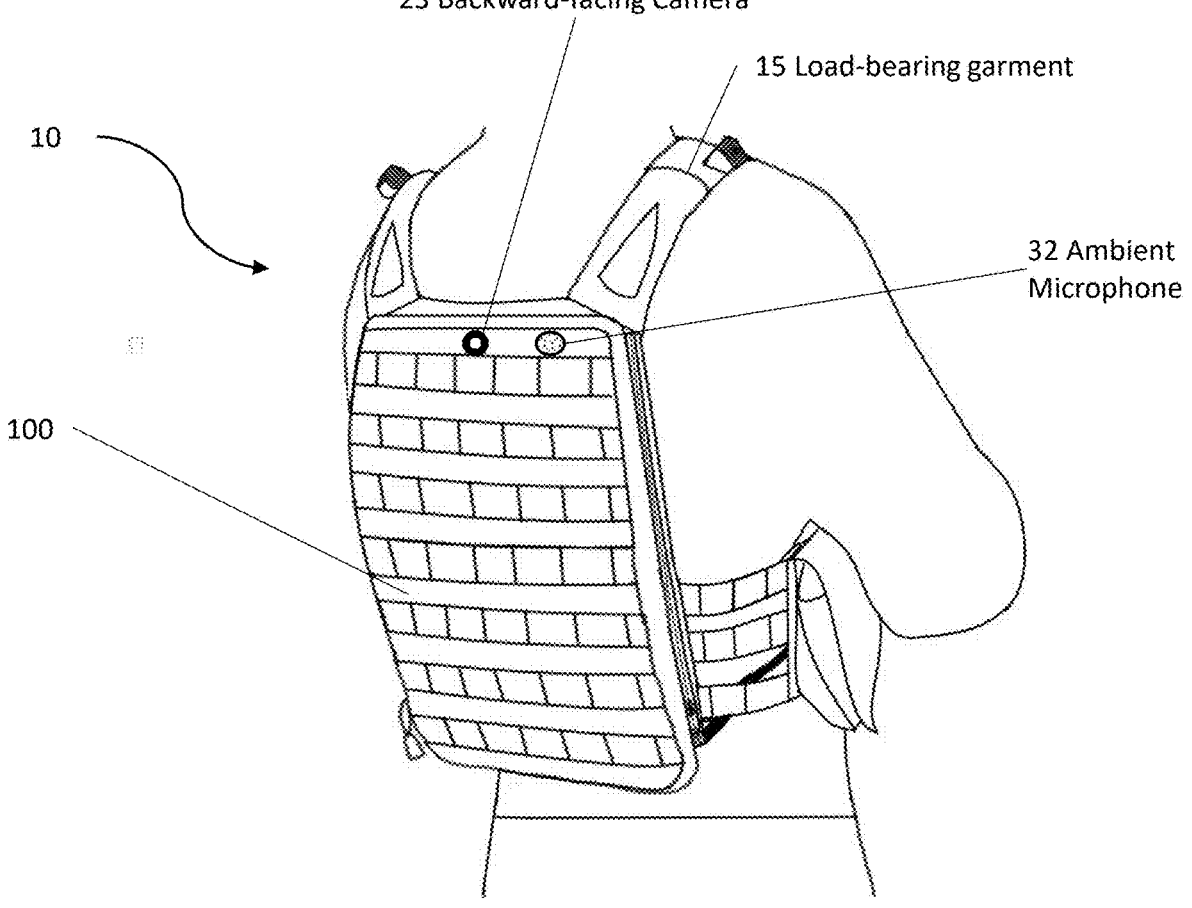
FIG. 2 illustrates a back perspective view of an example of the tactical system according to the present invention.

As shown in FIGS. 1 and 2, the present invention provides a personal tactical system 10 that includes a load-bearing garment 15 (e.g., a vest, body armor, a plate carrier) with at least one camera and a portable battery pack 100. The portable battery pack 100 includes a pouch with one or more batteries. In a preferred embodiment, the pouch removably attaches to the load-bearing garment 15. Alternatively, the load-bearing garment includes a pouch for housing the one or more batteries.

The one or more batteries of the portable battery pack 100 are in electrical connection with and supply power to the at least one camera and/or other devices. The at least one camera includes at least one forward-facing camera, at least one side-facing camera, at least one upward-facing camera, and/or at least one backward-facing camera. In the example shown in FIGS. 1 and 2, the at least one camera includes a forward-facing camera 20, a side-facing camera 21, an upward-facing camera 22, and a backward-facing camera 23. Other devices shown in FIGS. 1 and 2 include a compass 51, a global positioning system (GPS) 52, and an ambient microphone 32.

Load-Bearing Garment

The load-bearing garment 15 is preferably a Modular Lightweight Load-carrying Equipment (MOLLE) system, as described in https://en.wikipedia.org/wiki/MOLLE and http://www.natick.army.mil/about/pao/pubs/warrior/01/sep-oct/packitup.htm, each of which is incorporated herein by reference in its entirety. In one embodiment, the load-bearing garment incorporates a Pouch Attachment Ladder System (PALS), which is a grid of webbing used to attach smaller equipment onto load-bearing platforms. For example, the PALS grid consists of horizontal rows of 1-inch (2.5 cm) webbing, spaced about one inch apart, and reattached to the load-bearing garment (e.g., vest, plate carrier, body armor) at 1.5-inch (3.8 cm) intervals. In one embodiment, the webbing is formed of nylon (e.g., Cordura®) nylon webbing, MIL-W-43668 Type III nylon webbing). The PALS grid allows for the attachment of various compatible pouches and accessories onto the load-bearing garment. An alternative embodiment is the All-purpose Lightweight Individual Carrying Equipment (ALICE) system.

Preferably, the load-bearing garment is a ballistic vest that helps absorb the impact and reduces or stops penetration to the body from firearm-fired projectiles and shrapnel from explosions. The ballistic vest is formed of hard armor and/or soft armor. The ballistic vest is preferably formed of both hard armor and soft armor. In one embodiment, the soft armor is formed of multiple layers of ballistic fabric material (e.g., Kevlar®, Twaron®). In a preferred embodiment, the soft armor is formed of about 15 to about 30 layers of ballistic fabric. In another embodiment, the soft armor further includes a molded plastic layer. The soft armor protects the wearer from low velocity projectiles, such as handgun rounds and mortar or grenade projectiles.

In one embodiment, the hard armor is formed of ballistic plates (not shown) that are inserted into the vest. The hard armor protects the wearer from high velocity projectiles, such as rifle rounds. In a preferred embodiment, the ballistic plates are formed of a metal (e.g., titanium, steel, aluminum alloy), a polymer (e.g., Zylon®), and/or a ceramic (e.g., boron carbide ceramic, silicon carbide ceramic). The ballistic plates are preferably molded or formed to conform to a wearer's body. In one embodiment, the ballistic plates are custom formed to the wearer's body. Alternatively, the ballistic plates have a standardized sizing and curvature (e.g., small, medium, large, extra-large).

In one embodiment, the ballistic vest is formed of a plurality of layers. Examples of a ballistic vest formed of a plurality of layers are disclosed in U.S. Pat. No. 9,726,459 and U.S. Publication Nos. 20170299345 and 20180010890, each of which is incorporated herein by reference in its entirety. In one example, the plurality of layers includes a first layer of a single layer of front covering material, a second layer of a ballistic plate (e.g., formed of ceramic), a third layer of at least one aramid layer (e.g., Kevlar®), a fourth layer of a rigid backing plate (e.g., formed of an ultra-high molecular weight polyethylene (UHMWPE), such as Spectra Shield®), and a fifth layer of a single layer of rear covering material. The front covering material and/or the rear covering material are preferably waterproof or water-resistant.

Additionally, or alternatively, the ballistic vest includes a shear thickening fluid. Examples of a shear thickening fluid are disclosed in U.S. Pat. Nos. 5,854,143, 7,226,878, 7,498, 276, 7,825,045, 9,238,332, 9,464,782, and 9,816,788 and U.S. Publication Nos. 20040094026 and 20060040576, each of which is incorporated herein by reference in its entirety.

In another embodiment, the ballistic vest includes a magnetorheological fluid. Examples of a magnetorheological fluid are disclosed in U.S. Pat. Nos. 7,332,101 and 8,646,371, each of which is incorporated herein by reference in its entirety.

In a preferred embodiment, the ballistic vest is classified as Type III or Type IV as defined in Ballistic Resistance of Body Armor National Institute of Justice (NIJ) Standard-0101.06 (published July 2008), which is incorporated herein by reference in its entirety. Alternatively, the ballistic vest is classified as Type IIA, Type II, or Type IIIA. Additionally, or alternatively, the ballistic vest is buoyant.

The ballistic vest preferably protects the wearer against spike and/or blade threats. In a preferred embodiment, the ballistic vest is classified as protection Level 2 (i.e., medium energy threats) or Level 3 (i.e., high energy threats) as defined in Stab Resistance of Personal Body Armor NIJ Standard-0115.0 (published September 2000), which is incorporated herein by reference in its entirety. Alternatively, the ballistic vest is classified as protection Level 1 (i.e., low energy threats).

Portable Battery Pack

The present invention provides a portable battery pack including a battery enclosed by, e.g., inside of, a wearable and replaceable pouch or skin or hard enclosure, wherein the pouch or skin or hard enclosure can be provided in different colors and/or patterns. Namely, a set of multiple interchangeable pouches or skins can be provided with one battery unit. This feature is particularly beneficial when it is required that the portable battery pack blend into different environments, such as in military applications. In one example, if the portable battery pack is used in a jungle or wilderness environment, the battery can be placed inside a camouflage pouch or skin. In another example, if the portable battery pack is used in an arctic environment, the battery can be placed inside a white-colored pouch or skin. In yet another example, if the portable battery pack is used in a desert environment, the battery can be placed inside a sand-colored pouch or skin. In still another example, if the portable battery pack is used for law enforcement, the battery is placed inside a black-colored, a navy blue-colored, a gray-colored, or an olive-colored pouch or skin.

Representative camouflages include, but are not limited to, Universal Camouflage Pattern (UCP), also known as ACUPAT or ARPAT or Army Combat Uniform; Multi-Cam®, also known as Operation Enduring Freedom Camouflage Pattern (OCP); Universal Camouflage Pattern-Delta (UCP-Delta); Airman Battle Uniform (ABU); Navy Working Uniform (NWU), including variants, such as, blue-grey, desert (Type II), and woodland (Type III); MARPAT, also known as Marine Corps Combat Utility Uniform, including woodland, desert, and winter/snow variants; Disruptive Overwhite Snow Digital Camouflage, Urban Digital Camouflage, and Tactical Assault Camouflage (TACAM).

Therefore, an aspect of the portable battery pack is that it provides a battery in combination with one or more wearable and replaceable pouches or skins, wherein the one or more pouches or skins can be different colors and/or patterns.

Another aspect of the portable battery pack is that the battery has one or more leads that can be flexed repeatedly in any direction without breaking or failing. This means the portable battery pack is operable to deliver energy from the battery to power consuming devices located in different areas of the load bearing equipment. Similarly, the portable battery pack is operable to receive energy from charging devices located in different areas of the load bearing equipment to the battery.

Yet another aspect of the portable battery pack is that the battery and pouch or skin are lightweight and contoured for comfortable wearing or ease of fastening to other equipment, such as a backpack or body armor, while still maintaining the lowest possible profile. Advantageously, this low profile prevents the portable battery pack from interfering with the wearer while in motion or seated.

Still another aspect of the portable battery pack is that the pouch or skin can be MOLLE-compatible. "MOLLE" means Modular Lightweight Load-carrying Equipment, which is the current generation of load-bearing equipment and backpacks utilized by a number of NATO armed forces. The portable battery pack can also be made to affix to other equipment (e.g., chair or seat, boat or kayak, helmet) or a user's body (e.g., back region, chest region, abdominal region, arm, leg) using straps, snaps, hook and loop tape, snaps, ties, buckles, and/or clips for other applications.

Figure 3:
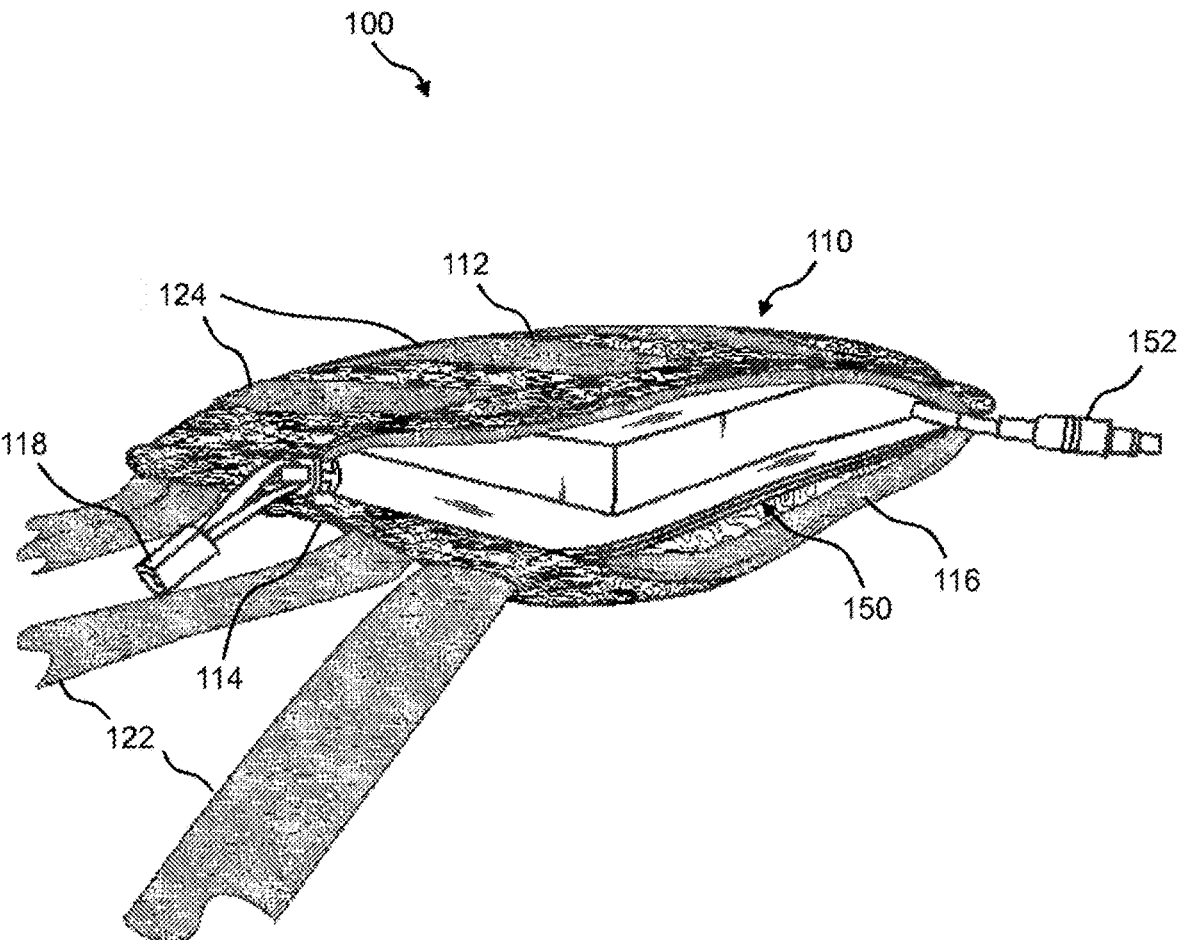
FIG. 3 illustrates a perspective view of an example of the portable battery pack that comprises a battery enclosed by a wearable pouch or skin.
Figure 4:
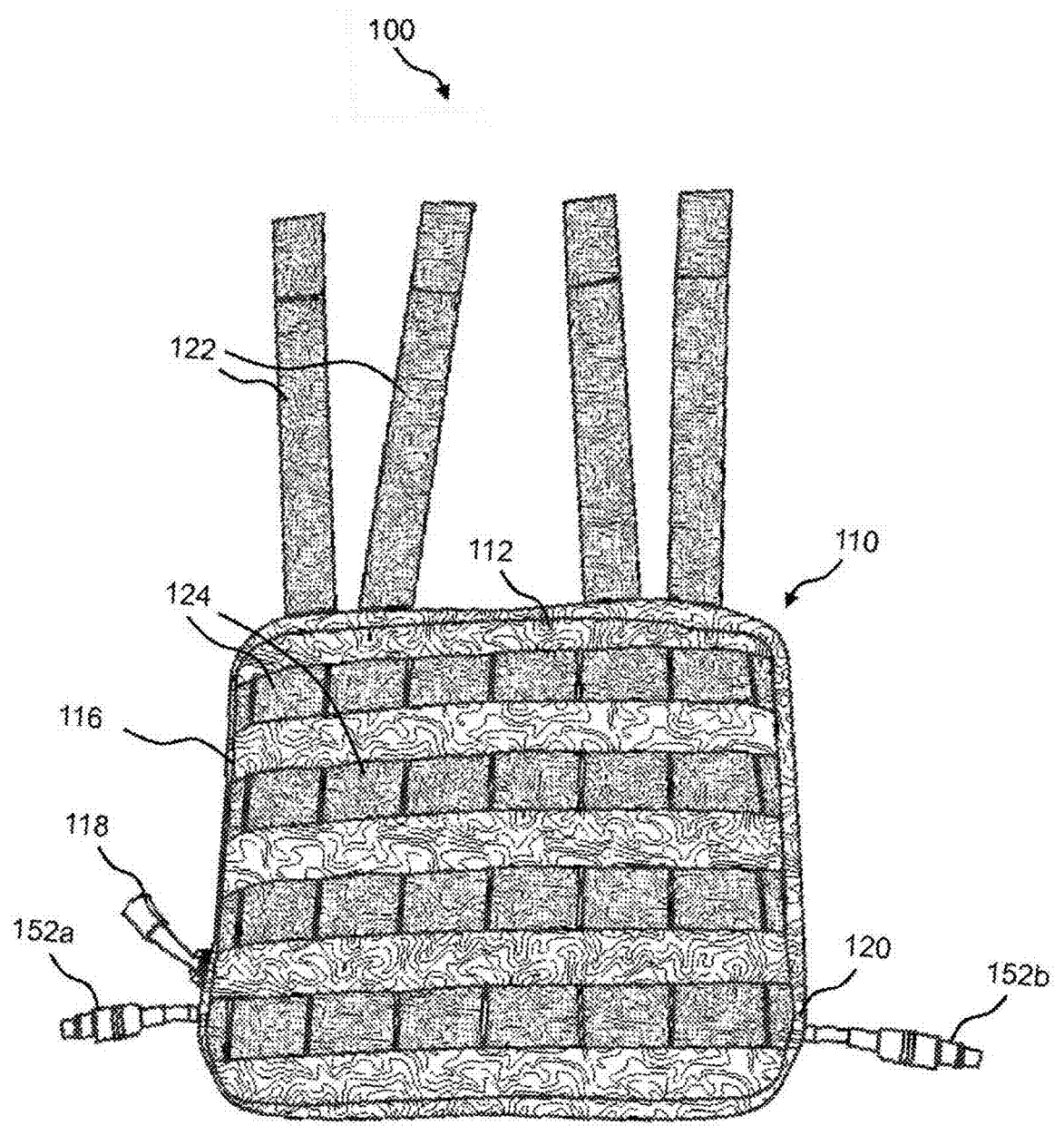
FIG. 4 illustrates a front perspective view of an example of the portable battery pack that comprises a battery enclosed by a wearable pouch or skin.
Figure 5:
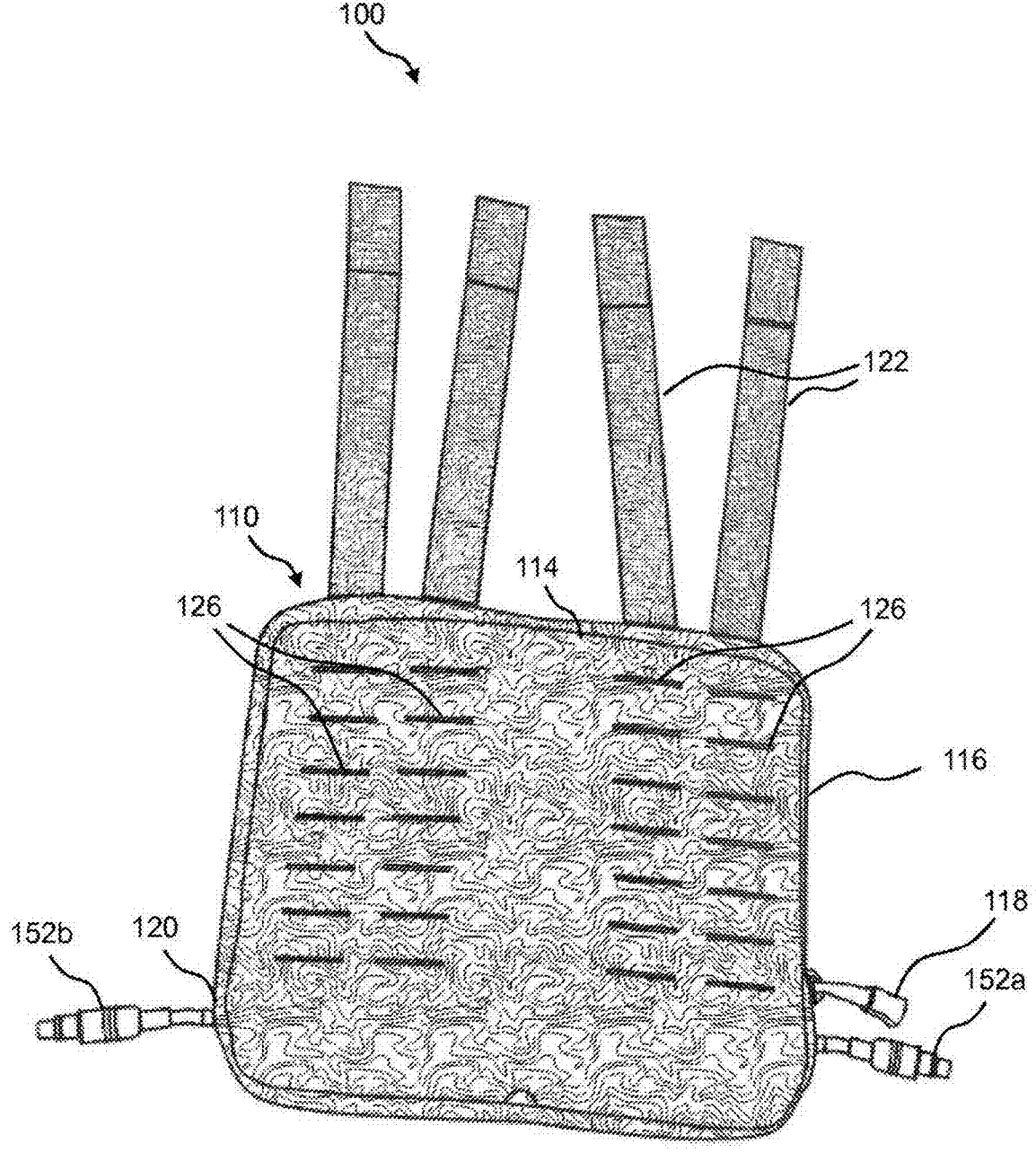
FIG. 5 illustrates a back perspective view of an example of the portable battery pack that comprises a battery enclosed by a wearable pouch or skin.

FIGS. 3-5 are perspective views of an example of the portable battery pack 100 that includes a battery enclosed by a wearable pouch or skin. For example, portable battery pack 100 includes a pouch 110 for holding a battery 150. The pouch 110 is a wearable pouch or skin that can be sized in any manner that substantially corresponds to a size of the battery 150. In one example, the pouch 110 is sized to hold a battery 150 that is about 9.75 inches long, about 8.6 inches wide, and about 1 inch thick.

In a preferred embodiment, the pouch 110 is formed of a flexible, durable, and waterproof or at least water-resistant material. For example, the pouch 110 is formed of polyester, polyvinyl chloride (PVC)-coated polyester, vinyl-coated polyester, nylon, canvas, PVC-coated canvas, or polycotton canvas. In one embodiment, the pouch 110 is formed of a material that is laminated to or treated with a waterproofing or water repellant material (e.g., rubber, PVC, polyurethane, silicone elastomer, fluoropolymers, wax, thermoplastic elastomer). Additionally, or alternatively, the pouch 110 is treated with a UV coating to increase UV resistance. The exterior finish of the pouch 110 can be any color, such as white, brown, green, orange (e.g., international orange), yellow, black, or blue, or any pattern, such as camouflage, as provided herein, or any other camouflage in use by the military, law enforcement, or hunters. For example, in FIGS. 3-5, the pouch 110 is shown to have a camouflage pattern. In one embodiment, the exterior of the pouch 110 includes a reflective tape (e.g., infrared reflective tape), fabric, or material. Advantageously, the reflective tape, fabric, or material improves visibility of the user in low-light conditions.

The pouch 110 has a first side 112 and a second side 114. The pouch 110 also includes a pouch opening 116, which is the opening through which the battery 150 is fitted into the pouch 110. In the example shown in FIGS. 3-5, the pouch opening 116 is opened and closed using a zipper, as the pouch 110 includes a zipper tab 118. Other mechanisms, however, can be used for holding the pouch opening 116 of the pouch 110 open or closed, such as, a hook and loop system (e.g., Velcro®), buttons, snaps, hooks, ties, clips, buckles, and the like. Further, a lead opening 120 (see FIG. 4, FIG. 5, FIG. 7) is provided on the end of the pouch 110 that is opposite the pouch opening 116. For example, the lead opening 120 can be a 0.5-inch long slit or a 0.75-inch long slit in the edge of the pouch 110. In one embodiment, the lead opening 120 is finished or reinforced with stitching. In another embodiment, the lead opening 120 is laser cut.

The battery 150 includes at least one lead. In one example, the battery 150 is a rechargeable battery with two leads 152 (e.g., a first lead 152a and a second lead 152b) as shown in FIGS. 4-5. Each lead 152 can be used for both the charging function and the power supply function. In other words, the leads 152a, 152b are not dedicated to the charging function only or the power supply function only, both leads 152a, 152b can be used for either function at any time or both at the same time. In one example, the first lead 152a can be used for charging the battery 150 while the second lead 152b can be used simultaneously for powering equipment, or both leads 152 can be used for powering equipment, or both leads 152 can be used for charging the battery 150.

Each lead is preferably operable to charge and discharge at the same time. In one example, a Y-splitter with a first connector and a second connector is attached to a lead. The Y-splitter allows the lead to supply power to equipment via the first connector and charge the battery via the second connector at the same time. Thus, the leads are operable to allow power to flow in and out of the battery simultaneously.

In another embodiment, each lead is operable to charge or discharge, but not operable to charge and discharge simultaneously. In one embodiment, the battery includes at least one sensor operable to determine if a lead is connected to a load or a power supply. If the at least one sensor determines that a lead is connected to a load, the discharging function is enabled and the charging function is disabled. If the at least one sensor determines that a lead is connected to a power supply, the charging function is enabled and the discharging function is disabled.

In a preferred embodiment, a dust cap is used to cover a corresponding lead. Advantageously, the dust cap protects the connector from dust and other environmental contaminants that may cause battery failure in the field. The dust cap is preferably permanently attached to the corresponding lead. Alternatively, the dust cap is removably attachable to the corresponding lead.

The battery is operable to be charged using at least one charging device. In a preferred embodiment, the at least one charging device is an alternating current (AC) adapter, a solar panel, a generator, a wind turbine, a portable power case, a fuel cell, a vehicle battery, a rechargeable battery, and/or a non-rechargeable battery. Examples of a portable power case are disclosed in U.S. Publication No. 20170229692 and U.S. application Ser. Nos. 15/664,776 and 15/836,299, each of which is incorporated herein by reference in its entirety. In one embodiment, the battery is connected to the at least one charging device through a direct current-direct current (DC-DC) converter cable.

In another embodiment, the battery is operable to be charged via inductive charging. In one embodiment, the battery is operable to be charged using an inductive charging mat. In an alternative embodiment, the battery is operable to be charged using an inductive puck worn in a pocket, on the back of a helmet, or in a rucksack. In one embodiment, the inductive puck is powered using a DC power source. Advantageously, this reduces the number of cables required for a user, which prevents users from accidentally disconnecting cables (e.g., when getting in and out of spaces like vehicles). Additionally, this allows a user to use proximity charging, which allows the user to focus on the task at hand instead of spending a few seconds connecting the battery to a charging device, which may be located behind the user in a rucksack. Further, this embodiment eliminates the possibility of reverse polarity and arcing between connectors caused by the electrical potential. The inductive puck is operable to charge additional power consuming devices carried by a user (e.g., a smartphone, a tablet).

In one embodiment, the battery is operable to be charged by harvesting ambient radiofrequency (RF) waves. Alternatively, the battery is operable to be charged by capturing exothermic body reactions (e.g., heat, sweat). In one embodiment, the battery is operable to be charged using thermoelectric generators, which use temperature differences between the body and the external environment to generate energy. In another embodiment, the battery is operable to be charged using sweat (e.g., using lactate). In an alternative embodiment, the battery is operable to be charged using friction (e.g., triboelectric effect) or kinetic energy. In yet another example, the battery is operable to be charged by a pedal power generator. In one embodiment, the battery is connected to the pedal power generator through a direct current-direct current (DC-DC) converter cable.

The battery is also operable to be charged using energy generated from running water and wind energy. In one embodiment, the wind energy is generated using an unmanned aerial system or drone on a tether. In an alternative embodiment, the wind energy is generated using a drive along turbine. In yet another embodiment, the wind energy is generated using a statically mounted turbine (e.g., ground mounted, tower mounted).

With respect to using the battery 150 with pouch 110, first the user unzips the pouch opening 116, then the user inserts one end of the battery 150 that has, for example, the second lead 152b through the pouch opening 116 and into the compartment inside the pouch 110. At the same time, the user guides the end of the second lead 152b through the lead opening 120, which allows the housing of the battery 150 to fit entirely inside of the pouch 110, as shown in FIG. 3. The first lead 152a is left protruding out of the unzipped portion of the pouch opening 116. Then the user zips the pouch opening 116 closed, leaving the zipper tab 118 snugged up against the first lead 152a, as shown in FIG. 4 and FIG. 5. FIG. 4 shows the portable battery pack 100 with the first side 112 of the pouch 110 up, whereas FIG. 5 shows the portable battery pack 100 with the second side 114 of the pouch 110 up.

As previously described, the battery has at least one lead. In one embodiment, the pouch has an opening for each corresponding lead. In one example, the battery has four leads and the pouch has four openings corresponding to the four leads. Alternatively, the pouch utilizes the zippered pouch opening to secure one lead and has an opening for each remaining lead. In one example, the battery has four leads and the pouch has three openings for three of the four leads. The remaining lead is secured by the zipper.

In another embodiment, the pouch has a seal around an opening for a corresponding lead. The seal is tight around the lead, which prevents water from entering the pouch through the opening. In one embodiment, the seal is formed of a rubber (e.g., neoprene).

In a preferred embodiment, the pouch of the portable battery pack is MOLLE-compatible. In one embodiment, the pouch incorporates a pouch attachment ladder system (PALS), which is a grid of webbing used to attach smaller equipment onto load-bearing platforms, such as vests and backpacks. For example, the PALS grid consists of horizontal rows of 1-inch (2.5 cm) webbing, spaced about one inch apart, and reattached to the backing at 1.5-inch (3.8 cm) intervals. In one embodiment, the webbing is formed of nylon (e.g., cordura nylon webbing, MIL-W-43668 Type III nylon webbing). Accordingly, a set of straps 122 (e.g., four straps 122) are provided on one edge of the pouch 110 as shown in FIGS. 4-5. Further, rows of webbing 124 (e.g., four rows 124) are provided on the first side 112 of the pouch 110, as shown in FIG. 4. Additionally, rows of slots or slits 126 (e.g., seven rows of slots or slits 126) are provided on the second side 114 of the pouch 110, as shown in FIG. 5. In a preferred embodiment, the set of straps 122, the rows of webbing 124, and the rows of slots or slits 126 replicate and duplicate the MOLLE underneath the portable battery pack on the load bearing equipment. Advantageously, this allows for minimal disruption to the user because the user can place additional gear pouches or gear (e.g., water bottle, antenna pouch) on the MOLLE of the portable battery pack in an equivalent location.

In other embodiments, the portable battery pack is made to affix to other equipment (e.g., chair or seat, boat or kayak, helmet) or a user's body (e.g., back region, chest region, abdominal region, arm, leg) using straps, snaps, hook and loop tape, snaps, buckles, ties, and/or clips. In one example, the portable battery pack is made to affix to a seat of a kayak using at least one strap and at least one side-release buckle. In another example, the portable battery pack is made to affix to a user's body using two shoulder straps. In yet another example, the portable battery pack includes two shoulder straps, a chest strap, and a side-release buckle for the chest strap.

Figure 6:
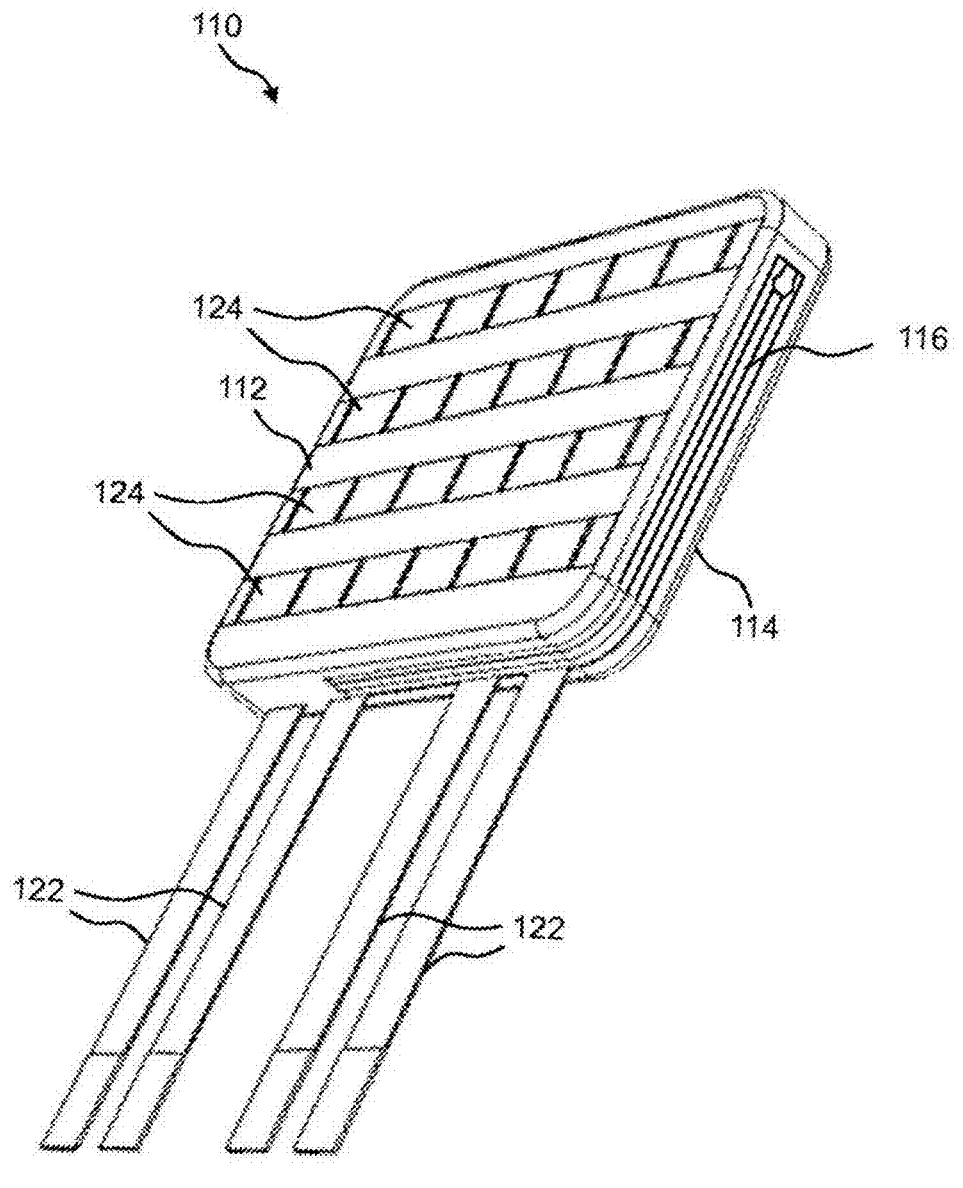
FIG. 6 illustrates an angled perspective view of the front of the wearable pouch or skin of the portable battery pack.
Figure 7:
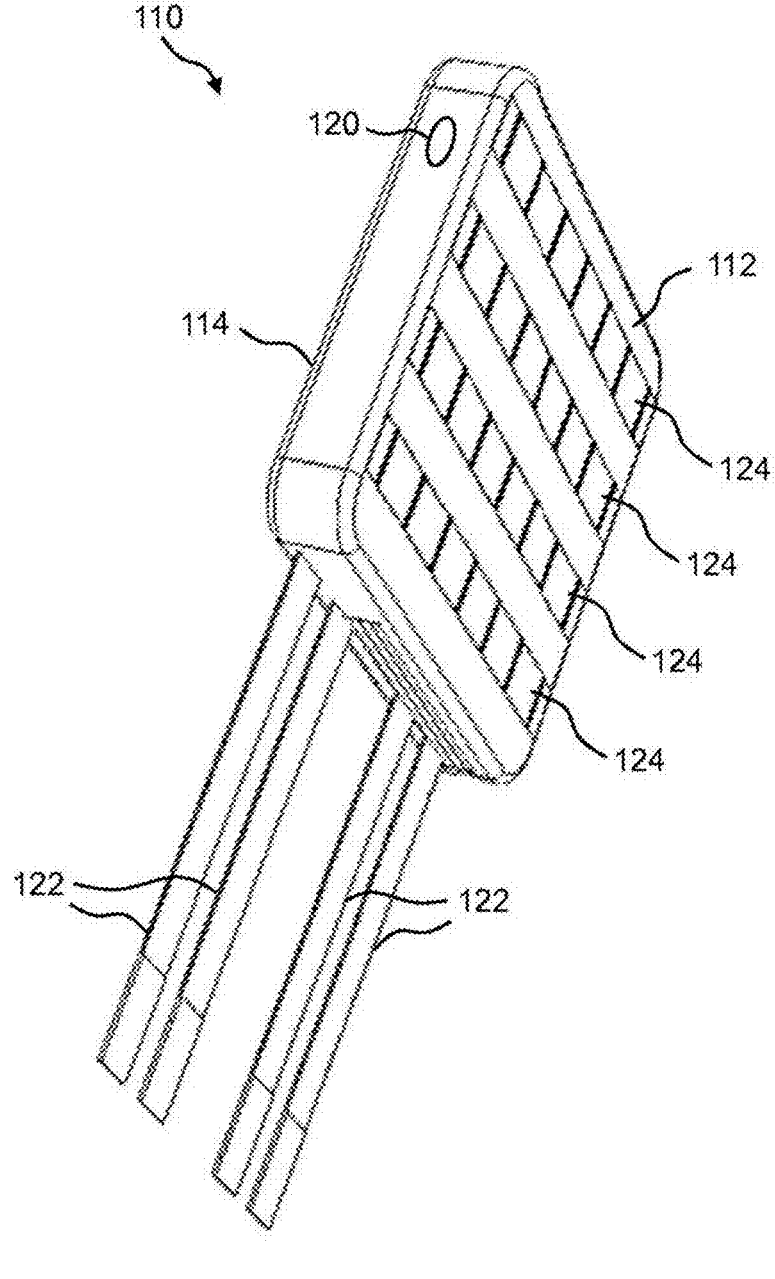
FIG. 7 illustrates another angled perspective view of the front of the wearable pouch or skin of the portable battery pack.
Figure 8:
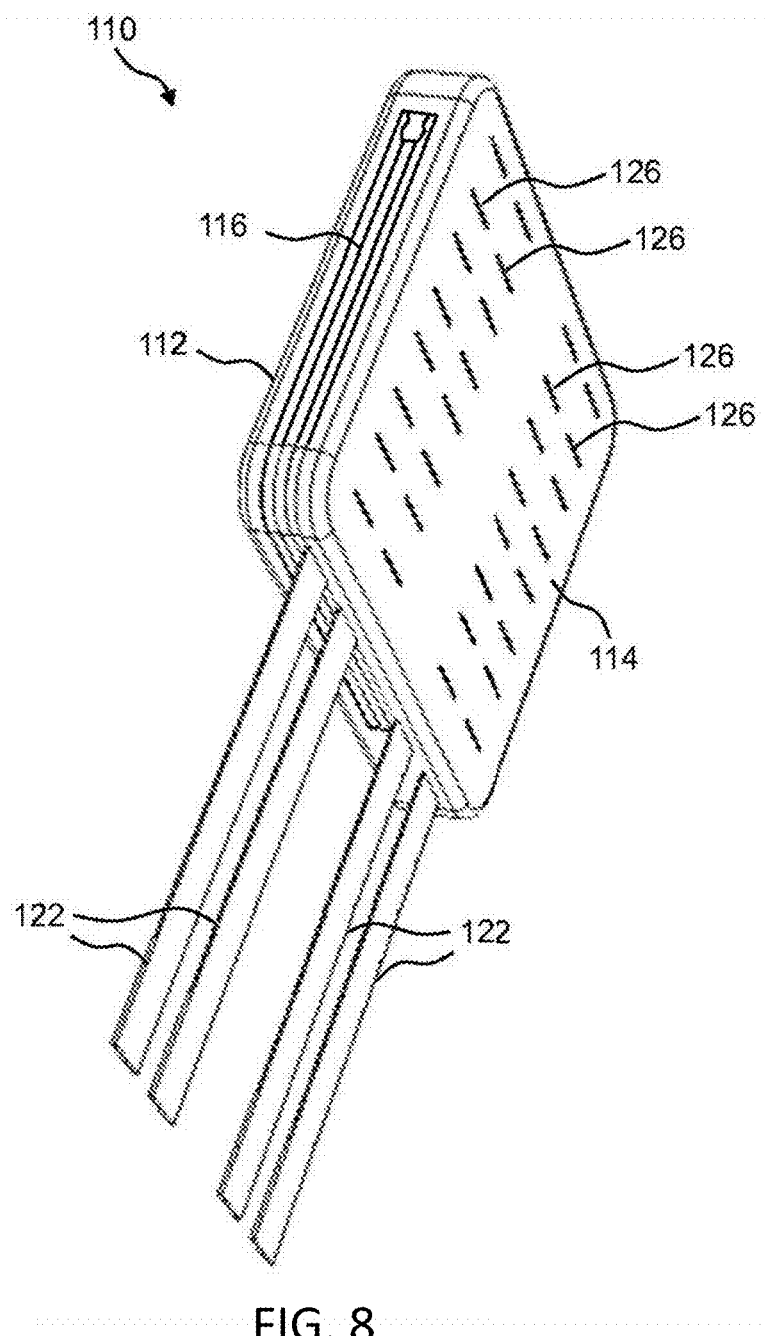
FIG. 8 illustrates an angled perspective view of the back of the wearable pouch or skin of the portable battery pack.

FIGS. 6-8 are perspective views of an example of the pouch 110 of the portable battery pack 100. FIG. 6 shows details of the first side 112 of the pouch 110 and of the edge of the pouch 110 that includes the pouch opening 116. FIG. 6 shows the pouch opening 116 in the zipper closed state. Again, four rows of webbing 124 are provided on the first side 112 of the pouch 110. FIG. 7 also shows details of the first side 112 of the pouch 110 and shows the edge of the pouch 110 that includes the lead opening 120. FIG. 8 shows details of the second side 114 of the pouch 110 and shows the edge of the pouch 110 that includes the pouch opening 116. FIG. 8 shows the pouch opening 116 in the zipped closed state. Again, seven rows of slots or slits 126 are provided on the second side 114 of the pouch 110.

Figure 9A:
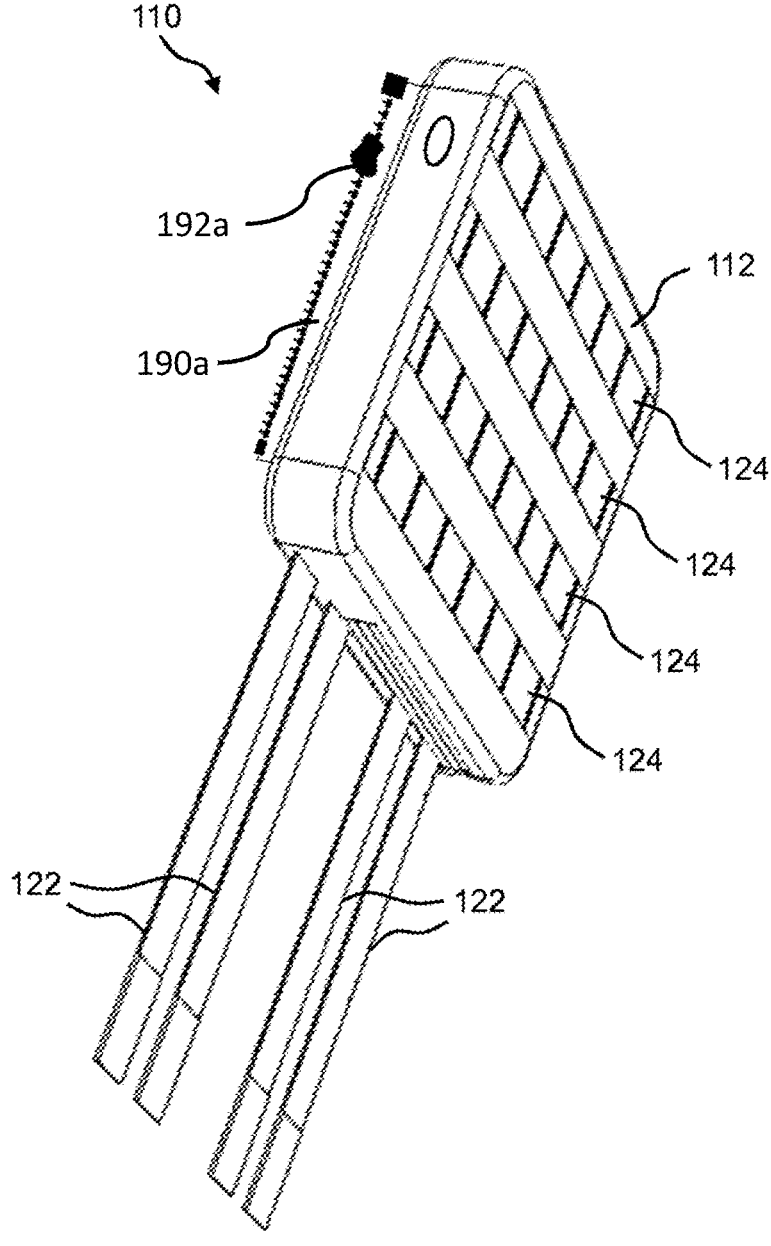
FIG. 9A illustrates another angled perspective view of another embodiment of the front of the wearable pouch or skin of the portable battery pack.
Figure 9B:
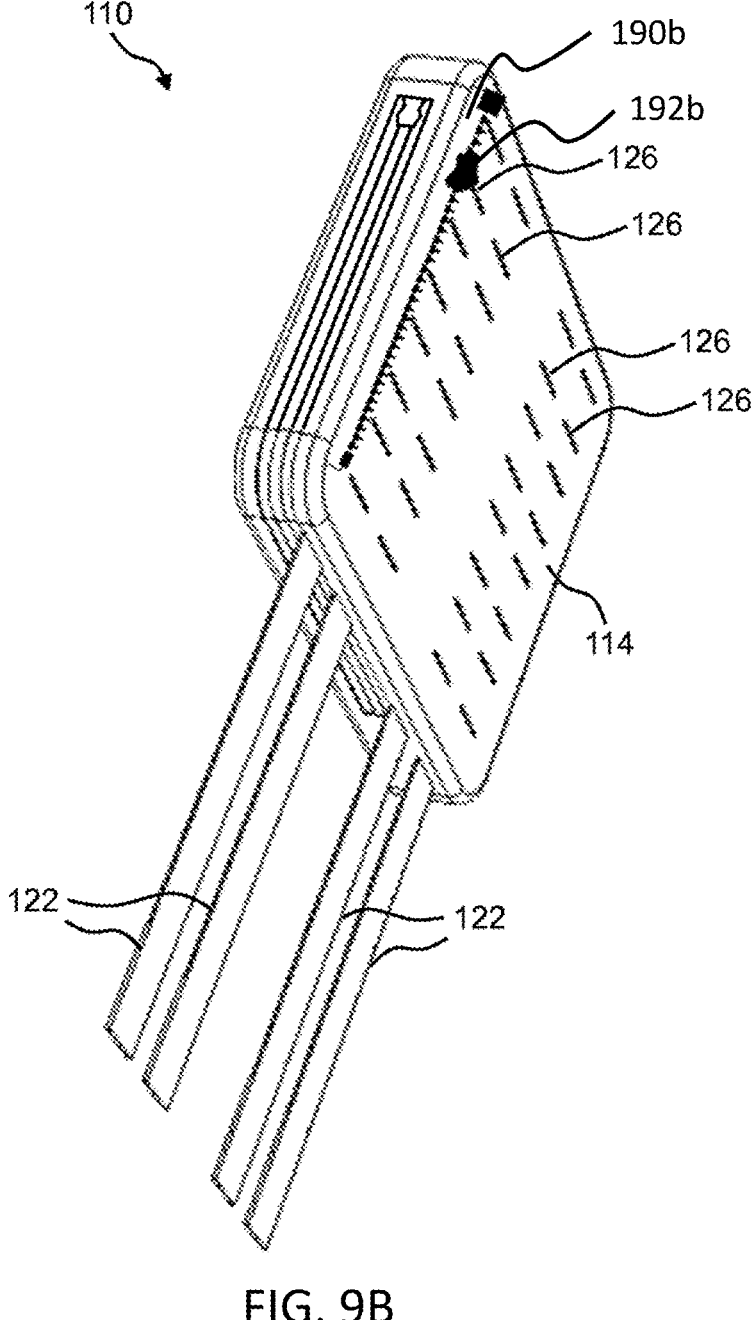
FIG. 9B illustrates an angled perspective view of another embodiment of the back of the wearable pouch or skin of the portable battery pack.

In another embodiment, the portable battery pack is made to affix to a plate carrier, body armor, or a vest with at least one single width of zipper tape sewn on the front panel or the back panel (e.g., JPC 2.0™ by Crye Precision) as shown in FIGS. 9A-9B. FIG. 9A shows details of the first side 112 of the pouch 110 including a single width of zipper tape 190a and a zipper slider 192a. The single width of zipper tape 190a mates with a corresponding single width of zipper tape on the plate carrier, the body armor, or the vest. FIG. 9B shows details of the second side 114 of the pouch 110 including a single width of zipper tape 190b and a zipper slider 192b. The single width of zipper tape 190b mates with a corresponding single width of zipper tape on the plate carrier, the body armor, or the vest.

Figure 10:
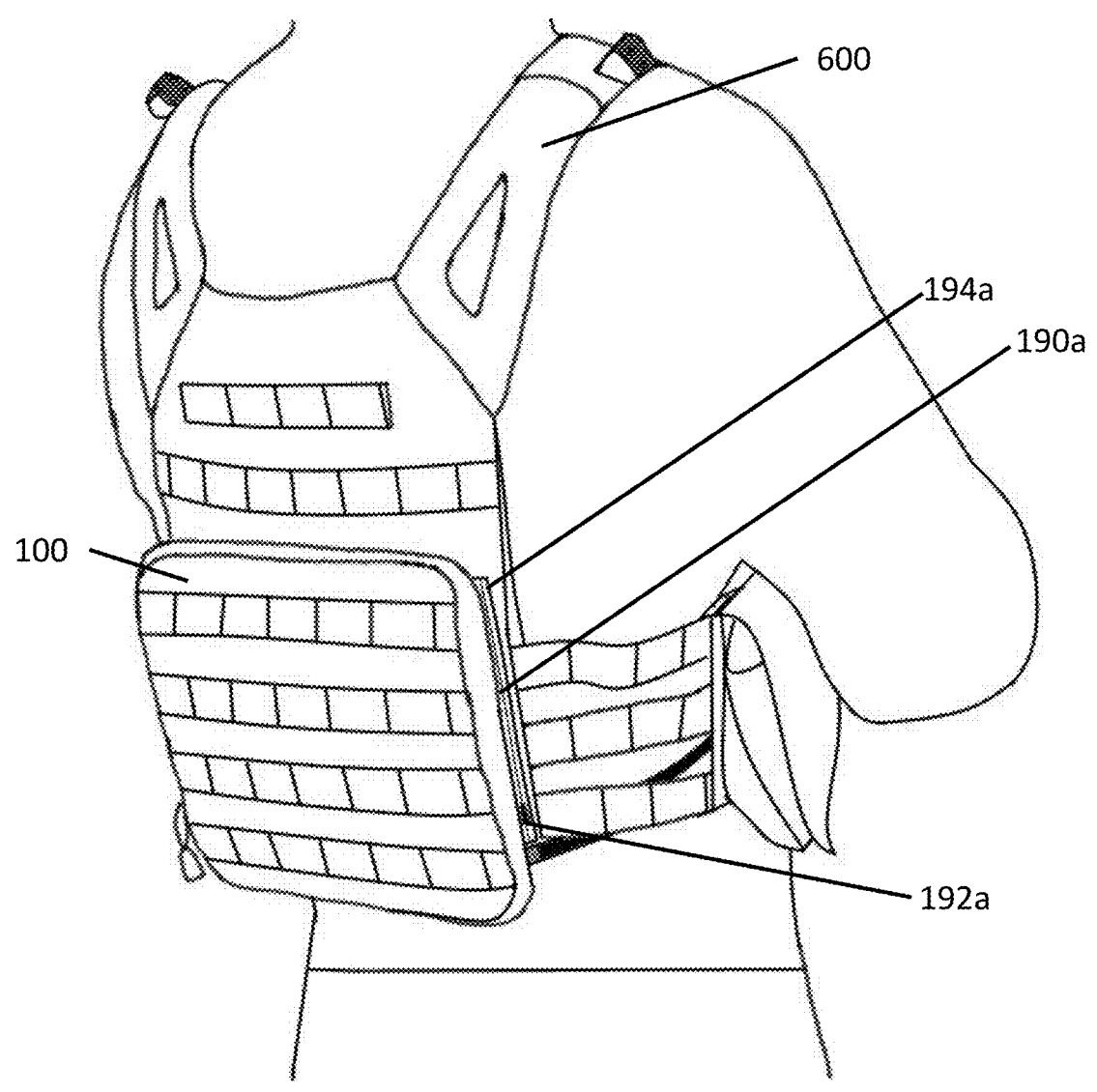
FIG. 10 shows a side perspective view of the portable battery pack affixed to a vest using zippers.

FIG. 10 shows a side perspective view of the portable battery pack 100 affixed to a vest 600 using zippers. A first single width of zipper tape 190*a* is shown mated with a corresponding first single width of zipper tape 194*a* on a right side of the vest 600 using a first zipper slider 192*a*, thereby attaching the portable battery pack 100 to the vest 600. Similarly, a second single width of zipper tape (not shown) is mated with a second corresponding single width of zipper tape (not shown) on a left side of the vest 600 using a second zipper slider (not shown). Advantageously, this allows cables to extend out of the pouch through an opening in the second side of the pouch because the rows of slots or slits are not required to the secure the pouch to the vest.

Figures 11A, 11B, 11C, 11D, 11E:
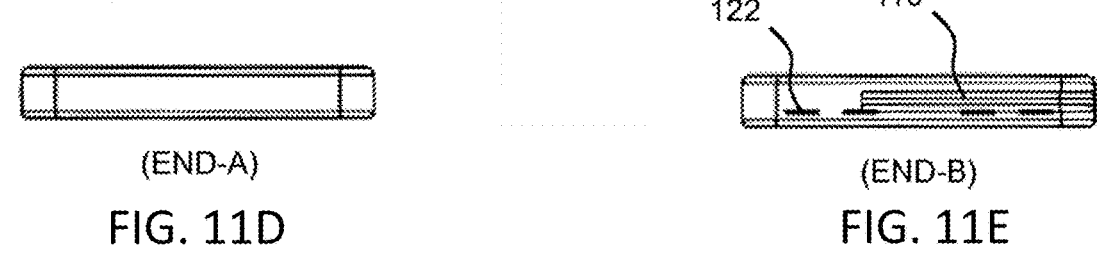
FIG. 11A illustrates a front perspective view of the wearable pouch or skin of the portable battery pack.
FIG. 11B illustrates a side perspective view of the wearable pouch or skin of the portable battery pack.
FIG. 11C illustrates a back perspective view of the wearable pouch or skin of the portable battery pack.
FIG. 11D illustrates a perspective view of an end of the wearable pouch or skin of the portable battery pack.
FIG. 11E illustrates a perspective view of another end of the wearable pouch or skin of the portable battery pack.

FIGS. 11A-11E illustrate various other views of the pouch 110 of the portable battery pack 100. FIG. 11A shows a view (i.e., "PLAN-A") of the first side 112 of the pouch 110. FIG. 11B shows a side view of the pouch 110. FIG. 11C shows a view (i.e., "PLAN-B") of the second side 114 of the pouch 110. FIG. 11D shows an end view (i.e., "END-A") of the non-strap end of the pouch 110. FIG. 11E shows an end view (i.e., "END-B") of the strap 122-end of the pouch 110.

Figure 12:
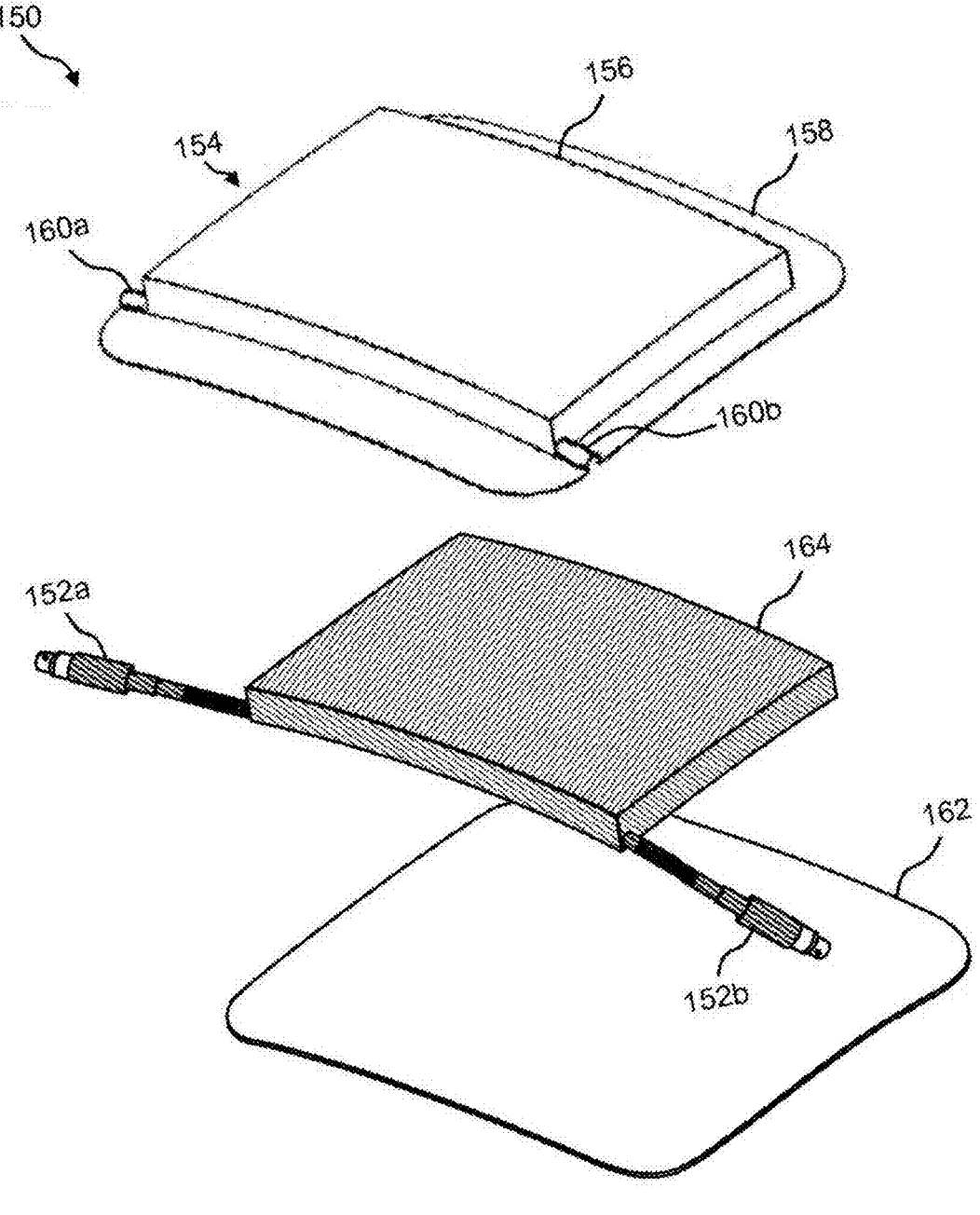
FIG. 12 illustrates an exploded view of an example of the battery of the portable battery pack.

FIG. 12 is an exploded view of an example of the battery 150 of the portable battery pack 100. The battery 150 includes a battery element 164 that is housed between a battery cover 154 and a back plate 162. The battery element 164 supplies the first lead 152*a* and the second lead 152*b*. The battery element 164 is formed of a plurality of sealed battery cells or individually contained battery cells, i.e. batteries with their own cases, removably disposed therein. In a preferred embodiment, the battery cells are electrochemical battery cells, and more preferably, include lithium ion rechargeable batteries. In one embodiment, the battery cells are lithium metal or lithium ferrous phosphate cells. In an alternative embodiment, the battery cells are all-solid-state cells (e.g., using glass electrolytes and alkaline metal anodes), such as those disclosed in U.S. Publication Nos. 20160368777 and 20160365602, each of which is incorporated by reference in its entirety. In another embodiment, the battery is formed using at least one metal-organic framework. In one embodiment, the battery cells are 18350, 14430, 14500, 18500, 16650, 18650, 21700, or 26650 cylindrical cells. The plurality of battery cells may be constructed and configured in parallel, series, or a combination. The plurality of battery cells may be in one group or more than one group. Advantageously, subdividing the plurality of battery cells into more than one group allows a larger quantity of lithium ion batteries to arrive by air that otherwise could not be transported due to regulations. In one example, the output of the battery element 164 can be from about 5 volts DC to about 90 volts DC at from about 0.25 amps to about 10 amps.

The plurality of battery cells is preferably connected to the leads via a battery management system. The battery management system protects the battery from operating outside of a safe operating area by including at least one safety cutoff. The at least one safety cutoff relates to voltage, temperature, state of charge, state of health, and/or current. In another embodiment, the battery management system calculates a charge current limit, a discharge current limit, an energy delivered since last charge, a charge delivered, a charge stored, a total energy delivered since first use, a total operating time since first use, and/or a total number of cycles.

In one embodiment, the plurality of battery cells is removably disposed within the battery cover and the back plate. For example, the plurality of battery cells can be replaced if they no longer hold a sufficient charge. In one embodiment, the plurality of battery cells is removably disposed within the battery cover and the back plate as a battery cartridge. In a preferred embodiment, the battery cartridge slides into an opening in the battery cover or the back plate through a battery access panel. In one embodiment, the battery cartridge is a spring-loaded cartridge. Additionally, or alternatively, the battery cartridge has flat contacts and pins. The battery cartridge preferably has features that allow the battery cartridge to matingly fit with features in the opening. In another embodiment, the plurality of battery cells is removably disposed within the battery cover and the back plate using a battery holder or a snap connector. In one embodiment, the battery holder or the snap connector is electrically connected to the battery management system via a mating connector (e.g., a rectangular connector), such as those available from Molex® or Powerpole® by Anderson Power.

The battery access panel is preferably accessed within the battery cover or the back plate via a door on hinges, which allows the door to stay anchored to the device. Alternatively, the door is secured to the battery cover or the back plate by screws. The battery access panel preferably contains a gasket that provides a water tight seal when the door is secured to the battery cover or the back plate.

Alternatively, the plurality of battery cells is sealed within the battery cover and the back plate. In one embodiment, the plurality of battery cells is sealed using an adhesive and/or at least one mechanical fastener (e.g., screws, rivets, pins). In another embodiment, the plurality of battery cells is sealed within the battery cover and the back plate via bonding (e.g., solvent bonding, fusion bonding) and/or welding (e.g., vibration welding, ultrasonic welding).

The battery cover 154 includes a compartment 156 that is sized to receive at least one battery element 164. In a preferred embodiment, the compartment 156 is substantially rectangular in shape with a top hat style rim 158 provided around the perimeter of the compartment 156. The battery cover 154 incudes at least one channel formed in the battery cover 154 to accommodate a wire of a corresponding lead. The example in FIG. 12 shows two channels 160 (e.g., channels 160*a*, 160*b*) formed in the battery cover 154 (one on each side) to accommodate the wires of the first lead 152*a* and the second lead 152*b* passing therethrough. More details of the leads 152 and the battery cover 154 are shown and described herein below with reference to FIG. 18.

The battery cover 154 and the back plate 162 is formed of plastic using, for example, a thermoform process or an injection molding. The back plate 162 can be mechanically attached to the rim 158 of the battery cover 154 via, for example, an ultrasonic spot welding process or an adhesive. Advantageously, the top hat style rim 158 provides a footprint for the ultrasonic spot welding process and provides structural integrity for the battery. In one embodiment, a water barrier material (e.g., silicone) is applied to the mating surfaces of the rim 158 and the back plate 162. In another embodiment, the battery cover 154, the back plate 162, and/or the battery element 164 has a slight curvature or contour for conforming to, for example, the user's vest, backpack, or body armor. In one example, the curvature of the portable battery pack is engineered to match the outward curve of body armor. Advantageously, this means that the portable battery pack does not jostle as the operator moves, which results in less caloric energy expenditure when the operator moves. Alternatively, the battery cover 154, the back plate 162, and/or the battery element 164 can have a slight outward curvature or contour for conforming to a user's body (e.g., back region, chest region, abdominal region, arm, leg). In yet another embodiment, the battery cover 154, the back plate 162, and/or the battery element 164 can have a slight outward curvature or contour for conforming to a user's helmet or hat. More details of the battery cover 154 are shown and described herein below with reference to FIG. 15 and FIGS. 16A-16D. More details of the back plate 162 are shown and described herein below with reference to FIGS. 17A-17C.

As previously described, the housing of the at least one battery includes a battery cover and a back plate. In one embodiment, the battery includes more than one battery element encased in the housing. The output voltages of the more than one battery element may be the same or different. In one example, a first battery element has an output voltage of 16.8V and a second battery element has an output voltage of 16.8V. In another example, a first battery element has an output voltage of 16.8V and a second battery element has an output voltage of 5V. Advantageously, including more than one battery element encased in the housing allows a larger quantity of lithium ion batteries to arrive by air that otherwise could not be transported due to regulations.

Figure 13:
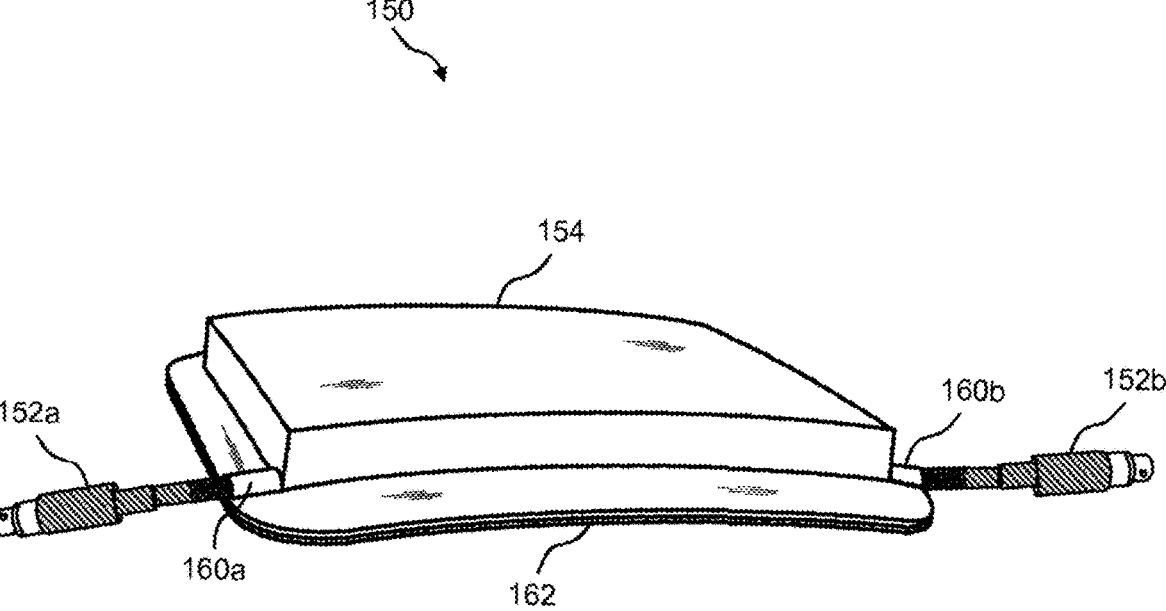
FIG. 13 illustrates a top perspective view of the battery of the portable battery pack when assembled.
Figure 14:
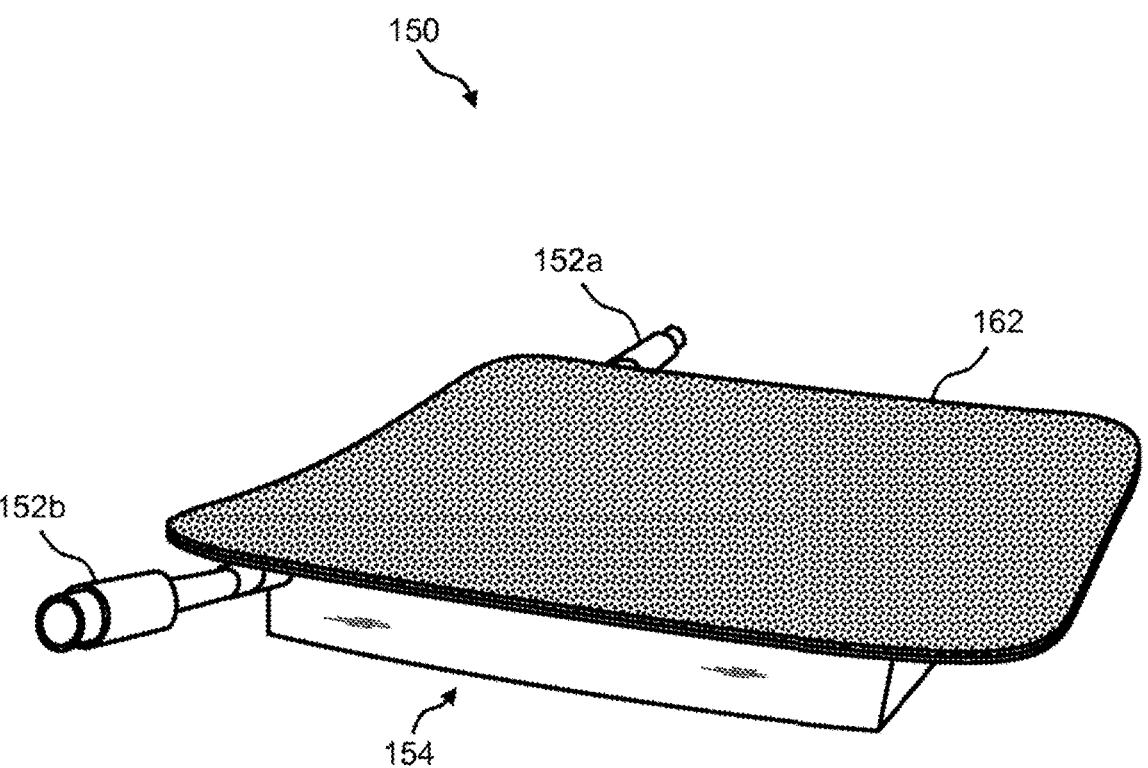
FIG. 14 illustrates a bottom perspective view of the battery of the portable battery pack when assembled.

FIGS. 13-14 are perspective views of the battery 150 of the portable battery pack 100 when fully assembled. FIG. 13 shows a view of the battery cover 154-side of the battery 150, while FIG. 14 shows a view of the back plate 162-side of the battery 150.

Figure 15:
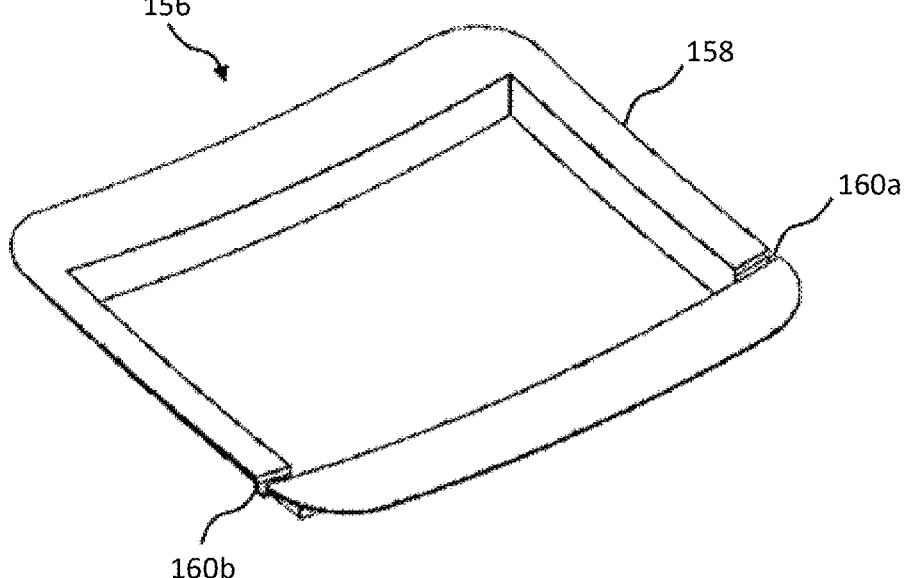
FIG. 15 illustrates a perspective view of the battery cover of the portable battery pack.

FIG. 15 is a perspective view of the side of the battery cover 154 that faces the battery element 164. FIGS. 16A-16D show various other views of the battery cover 154 of the battery 150 of the portable battery pack 100, including example dimensions of the battery cover 154. FIG. 16A illustrates a top perspective view of the battery cover of the portable battery pack. FIG. 16B illustrates a cross-section view of the battery cover of the portable battery pack. FIG. 16C illustrates another cross-section view of the battery cover of the portable battery pack. FIG. 16D illustrates yet another cross-section view of the battery cover of the portable battery pack.

Figures 17A, 17B, 17C:
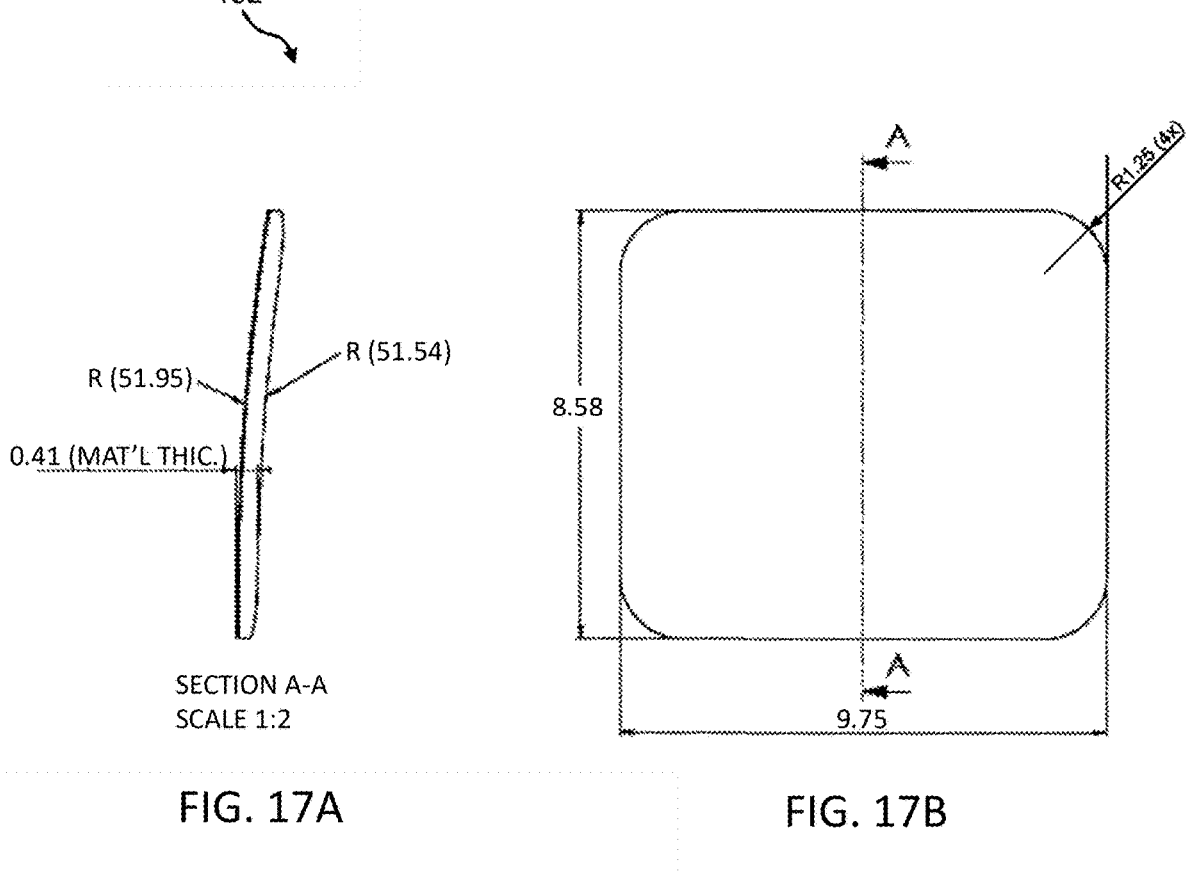
FIG. 17A illustrates a cross-section view of the back plate of the battery of the portable battery pack.
FIG. 17B illustrates a view of the back plate of the battery of the portable battery pack.
FIG. 17C illustrates another view of the back plate of the battery of the portable battery pack.

FIGS. 17A-17C illustrate various views of the back plate 162 of the battery 150 and show the contour and example dimensions of the back plate 162. FIG. 17A illustrates a cross-section view of the back plate of the battery of the portable battery pack. FIG. 17B illustrates a view of the back plate of the battery of the portable battery pack. FIG. 17C illustrates another view of the back plate of the battery of the portable battery pack. In one example, the back plate 162 is about 9.75 inches long, about 8.6 inches wide, and about 0.4 inches thick.

Figure 18:
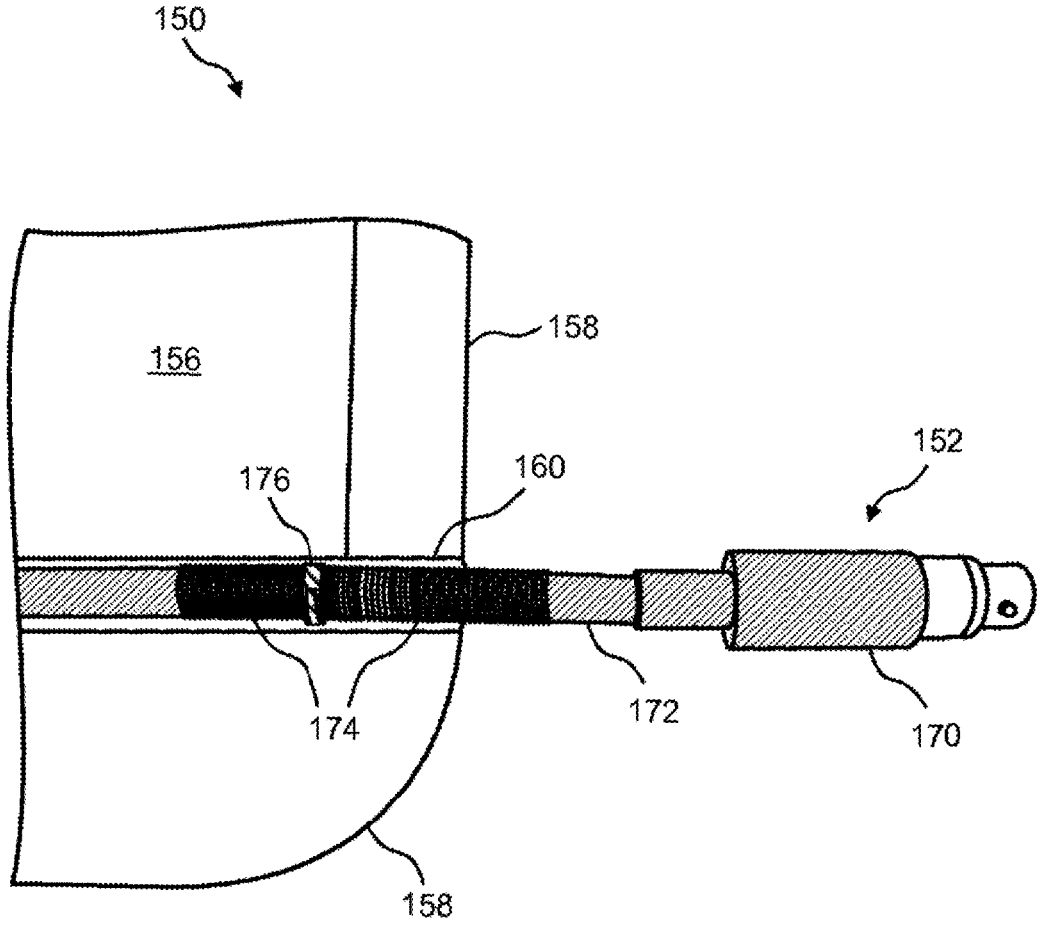
FIG. 18 illustrates a cutaway view of a portion of the battery, which shows more details of the flexible omnidirectional battery leads.

FIG. 18 is a cutaway view of a portion of the battery 150, which shows more details of the flexible omnidirectional battery leads 152. Each lead 152 has a connector portion 170 and a wiring portion 172. The wiring portion 172 is electrically connected to the battery element 164. In one embodiment, the wiring portion 172 is formed of a saltwater resistant cable. The connector portion 170 can be any type or style of connector needed to mate to the equipment to be used with the battery 150 of the portable battery pack 100. In a preferred embodiment, the connector portion 170 is a female circular type of connector (e.g., Tajimi™ part number R04-P5f). In an alternative embodiment, at least one connector portion 170 is a male universal serial bus (USB), micro USB, lightning, and/or Firewire connector. In yet another embodiment, the connector portion 170 has an Ingress Protection (IP) rating of IP2X, IP3X, IP4X, IP5X, IP6X, IPX1, IPX2, IPX3, IPX4, IPX5, IPX6, IPX7, or IPX8. More preferably, the connector portion 170 has an IP rating of IPX6, IPX7, or IPX8. IP ratings are described in IEC standard 60529, ed. 2.2 (05/2015), published by the International Electrotechnical Commission, which is incorporated herein by reference in its entirety. In one embodiment, the connector portion meets standards described in Department of Defense documents MIL-STD-202E, MIL-STD-202F published February 1998, MIL-STD-202G published 18 Jul. 2003, and/or MIL-STD-202H published 18 Apr. 2015, each of which is incorporated herein by reference in its entirety.

The wiring portion 172 is fitted into a channel 160 formed in the battery cover 154 such that the connector portion 170 extends away from the battery cover 154. A spring 174 is provided around the wiring portion 172, such that a portion of the spring 174 is inside the battery cover 154 and a portion of the spring 174 is outside the battery cover 154. In one example, the spring 174 is a steel spring that is from about 0.25 inches to about 1.5 inches long. The wiring portion 172 of the lead 152 and the spring 174 are held securely in the channel 160 of the battery cover 154 via a clamping mechanism 176. Alternatively, the wiring portion of the lead and the spring are held securely in the channel of the battery cover using an adhesive, a retention pin, a hex nut, a hook anchor, and/or a zip tie.

The presence of the spring 174 around the wiring portion 172 of the lead 152 allows the lead 152 to be flexed in any direction for convenient connection to equipment from any angle. The presence of the spring 174 around the wiring portion 172 of the lead 152 also allows the lead 152 to be flexed repeatedly without breaking or failing. The design of the leads 152 provides benefit over conventional leads and/or connectors of portable battery packs that are rigid, wherein conventional rigid leads allow connection from one angle only and are prone to breakage if bumped.

In one embodiment, a layer of heat shrink tubing is placed around the wiring portion before the spring is placed around the wiring portion. The heat shrink tubing is preferably flexible. Advantageously, the heat shrink tubing provides additional waterproofing for the battery.

In one embodiment, the battery includes at least one step up voltage converter and/or at least one step down voltage converter. In one example, the battery includes a step up voltage converter from 16.8V to 29.4V. In another example, the battery includes a step down voltage converter from 16.8V to 5V. Advantageously, this allows the portable battery pack to power devices (e.g., smartphones) with a charging voltage of 5V. This also reduces the bulk outside the portable battery pack because the step down voltage converter is housed within the battery element and a separate external voltage converter is not required.

In one embodiment, the wearable pouch includes a material for dissipating heat. Additionally, or alternatively, the battery of the wearable battery pack includes at least one layer of a material for dissipating heat. Examples of a material for dissipating heat are disclosed in U.S. Publication Nos. 20170229692 and 20160112004 and U.S. application Ser. No. 15/664,776, each of which is incorporated herein by reference in its entirety.

Figures 19A, 19B, 19C, 19D:
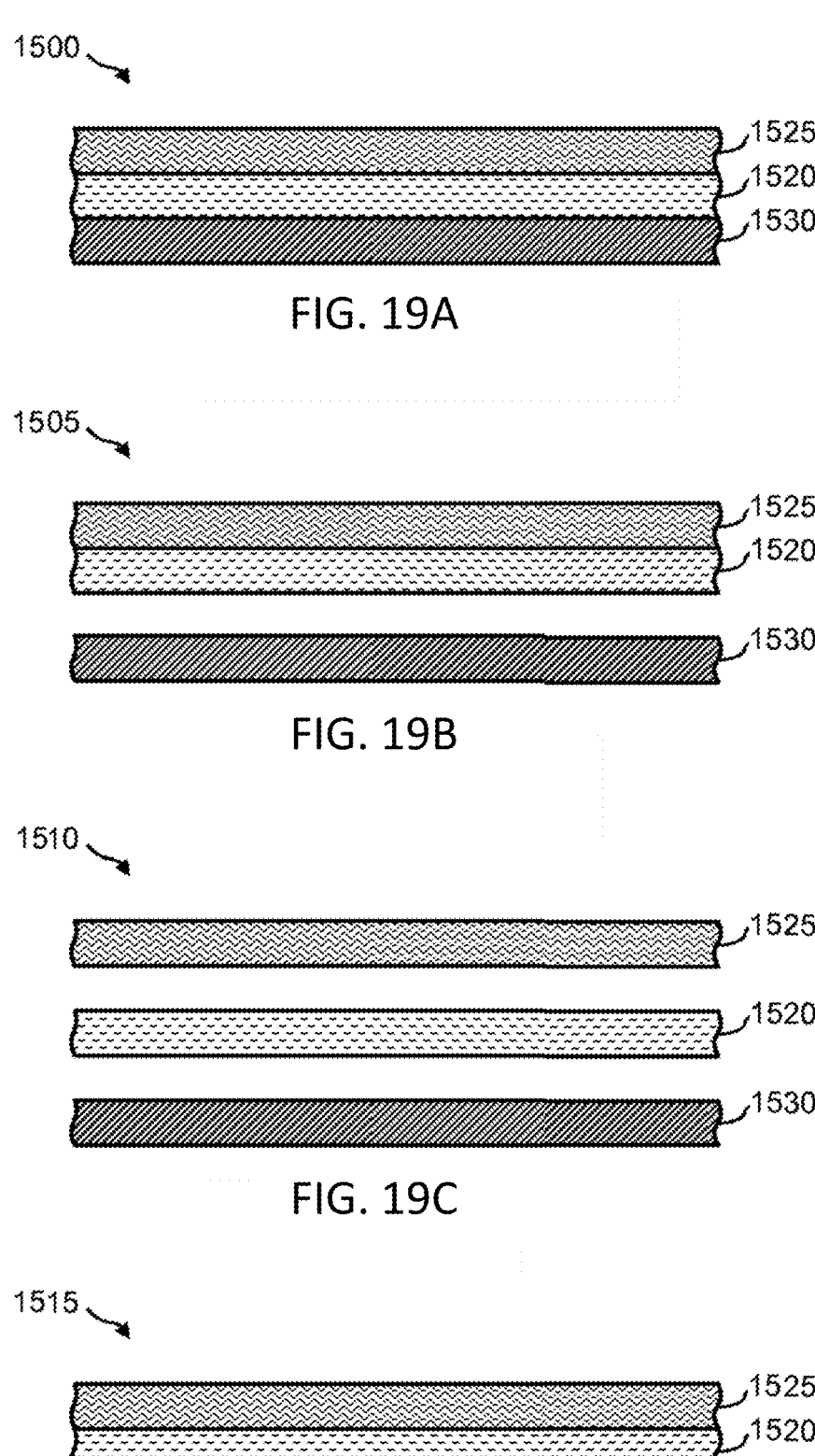
FIG. 19A illustrates a cross-sectional view of one embodiment of a structure that includes a material for dissipating heat.
FIG. 19B illustrates a cross-sectional view of one embodiment of another structure that includes a material for dissipating heat.
FIG. 19C illustrates a cross-sectional view of one embodiment of yet another structure that includes a material for dissipating heat.
FIG. 19D illustrates a cross-sectional view of one embodiment of yet another structure that includes a material for dissipating heat.

FIGS. 19A-19D are cross-sectional views of examples of structures that include a material for dissipating heat from electronic devices and/or clothing. The heat-dissipating material can be used in combination with, for example, one or two substrates. For example, FIG. 19A shows a structure 1500 that includes a heat-dissipating layer 1520. The heat-dissipating layer 1520 can be sandwiched between a first substrate 1525 and a second substrate 1530.

The heat-dissipating layer 1520 can be any material that is suitable for dissipating heat from electronic devices and/or clothing. The heat-dissipating layer 1520 can be from about 20 μm thick to about 350 μm thick in one example. In particular embodiments, the heat-dissipating layer 1520 can have a thickness ranging from about 1 mil to about 6 mil, including, but not limited to, 1, 2, 3, 4, 5, and 6 mil, or about 25 μm to about 150 μm, including, but not limited to, 25, 50, 75, 100, 125, and 150 μm. Examples of the heat-dissipating layer 1520 include anti-static, anti-radio frequency (RF), and/or anti-electromagnetic interference (EMI) materials, such as copper shielding plastic or copper particles bonded in a polymer matrix, as well as anti-tarnish and anti-corrosion materials. A specific example of the heat-dissipating layer 1520 is the anti-corrosive material used in Corrosion Intercept Pouches, catalog number 034-2024-10, available from University Products Inc. (Holyoke, Mass.). The anti-corrosive material is described in U.S. Pat. No. 4,944,916 to Franey, which is incorporated by reference herein in its entirety. Such materials can be formed of copper shielded or copper impregnated polymers including, but not limited to, polyethylene, low-density polyethylene, high-density polyethylene, polypropylene, and polystyrene. In another embodiment, the heat shielding or blocking and/or heat-dissipating layer is a polymer with aluminum and/or copper particles incorporated therein. In particular, the surface area of the polymer with aluminum and/or copper particles incorporated therein preferably includes a large percent by area of copper and/or aluminum. By way of example and not limitation, the surface area of the heat-dissipating layer includes about 25% by area copper and/or aluminum, 50% by area copper and/or aluminum, 75% by area copper and/or aluminum, or 90% by area copper and/or aluminum. In one embodiment, the heat shielding or blocking and/or heat-dissipating layer is substantially smooth and not bumpy. In another embodiment, the heat shielding or blocking and/or heat-dissipating layer is not flat but includes folds and/or bumps to increase the surface area of the layer. Alternatively, the heat-shielding or blocking and/or heat-dissipating layer 1520 includes a fabric having at least one metal incorporated therein or thereon. The fabric further includes a synthetic component, such as by way of example and not limitation, a nylon, a polyester, or an acetate component. Preferably, the at least one metal is selected from the group consisting of copper, nickel, aluminum, gold, silver, tin, zinc, and tungsten.

The first substrate 1525 and the second substrate 1530 can be any flexible or rigid substrate material. An example of a flexible substrate is any type of fabric. Examples of rigid substrates include, but are not limited to, glass, plastic, and metal. A rigid substrate may be, for example, the housing of any device. In one example, both the first substrate 1525 and the second substrate 1530 are flexible substrates. In another example, both the first substrate 1525 and the second substrate 1530 are rigid substrates. In yet another example, the first substrate 1525 is a flexible substrate and the second substrate 1530 is a rigid substrate. In still another example, the first substrate 1525 is a rigid substrate and the second substrate 1530 is a flexible substrate. Further, the first substrate 1525 and the second substrate 1530 can be single-layer or multi-layer structures.

In structure 1500 of FIG. 19A, the heat-shielding or blocking and/or heat-dissipating layer 1520, the first substrate 1525, and the second substrate 1530 are bonded or otherwise attached together, by way of example and not limitation, by adhesive, laminating, stitching, or hook-and-loop fastener system. In another example and referring now to FIG. 19B, in a structure 1505, the first substrate 1525 is bonded to one side of the heat shielding or blocking and/or heat-dissipating layer 1520, whereas the second substrate 1530 is not bonded or otherwise attached to the other side of the heat shielding or blocking and/or heat-dissipating layer 1520. In yet another example and referring now to FIG. 19C, in a structure 1510, the first substrate 1525 is provided loosely against one side of the heat shielding or blocking and/or heat-dissipating layer 1520 and the second substrate 1530 is provided loosely against the other side of the heat-dissipating layer 1520. The first substrate 1525 and the second substrate 1530 are not bonded or otherwise attached to the heat shielding or blocking and/or heat-dissipating layer 1520. In still another example and referring now to FIG. 19D, in a structure 1515, the heat shielding or blocking and/or heat-dissipating layer 1520 is provided in combination with the first substrate 1525 only, either bonded or loosely arranged. In FIG. 19D, if the two layers are loosely arranged, the heat-dissipating layer 1520 is not bonded or otherwise attached to the first substrate 1525. The material for dissipating heat is not limited to the structures 1500, 1505, 1510, 1515. These structures are exemplary only.

In one embodiment, the pouch includes at least one layer of a material to dissipate heat on the first side and/or the second side. In one embodiment, the first substrate is an interior layer of the pouch and the second substrate is an exterior layer of the pouch. In an alternative embodiment, a structure (e.g., the structure 1515 of FIG. 19D) is formed separately and then inserted into the pouch. Advantageously, this provides for retrofitting the pouch with heat protection from the heat-shielding or blocking and/or heat-dissipating material layer or coating.

Figure 20:
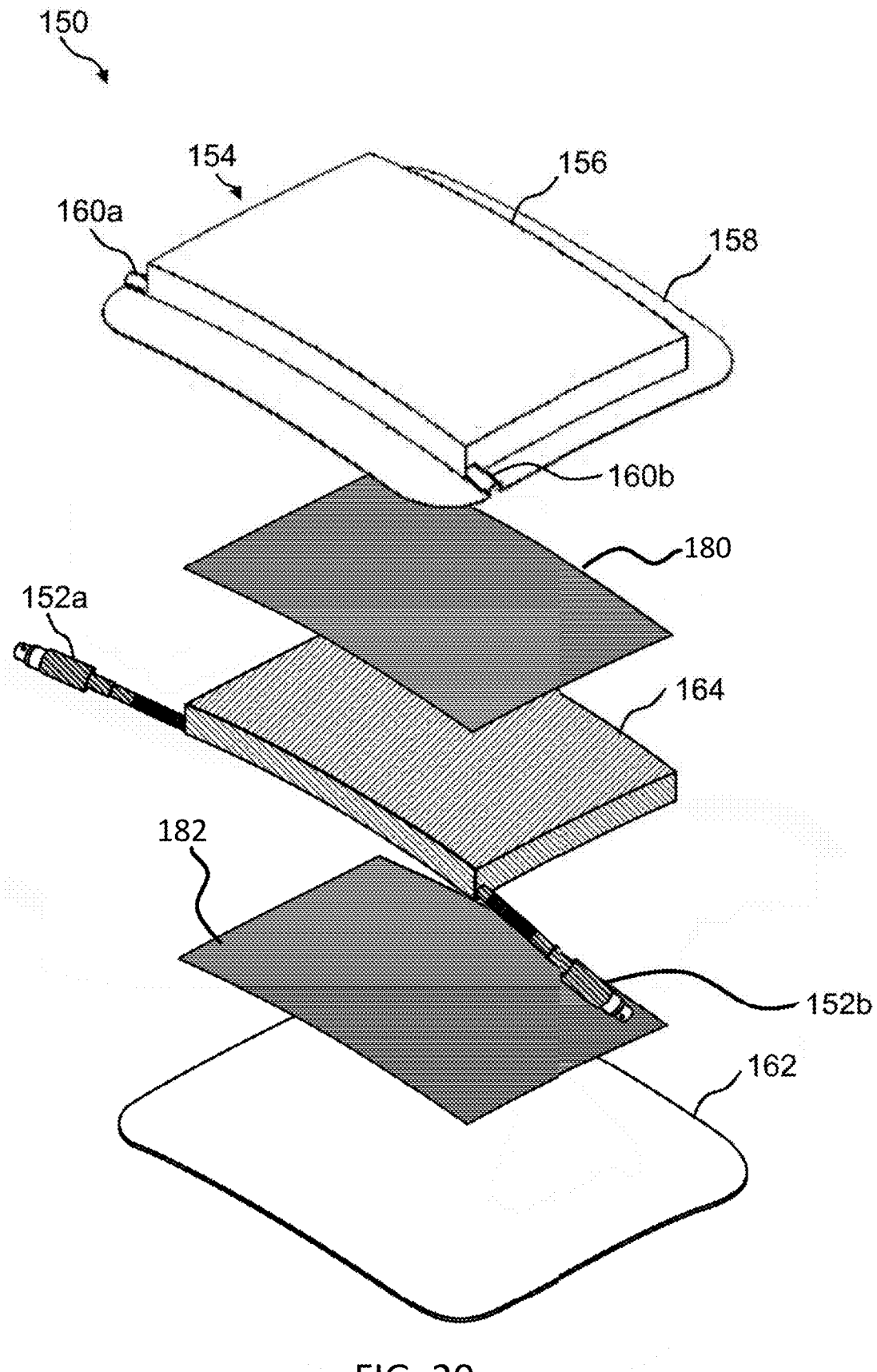
FIG. 20 illustrates an exploded view of an example of a battery of a portable battery pack into which a heat dissipating material is installed.

In a preferred embodiment, the battery includes at least one layer of a material to dissipate heat. FIG. 20 illustrates an exploded view of an example of a battery 150 of the portable battery pack 100 into which the heat dissipating material is installed. The battery 150 includes a battery element 164 that is housed between a battery cover 154 and a back plate 162. A first heat-dissipating layer 180 is between the battery cover 154 and the battery element 164. The first heat-dissipating layer 180 protects the battery from external heat sources (e.g., a hot vehicle). A second heat-dissipating layer 182 is between the battery element 164 and the back plate 162. The second heat-dissipating layer 182 protects the user from heat given off by the battery element 164. In another embodiment, the battery 150 includes only the first heat-dissipating layer 180. In yet another embodiment, the battery 150 includes only the second heat-dissipating layer 182.

In another embodiment, the pouch includes at least one layer of a material to provide resistance to bullets, knives, shrapnel, and/or other projectiles. In one embodiment, the at least one layer of a material to provide resistance to bullets, knives, shrapnel, and/or other projectiles is formed from an aramid (e.g., Kevlar®, Twaron®), an ultra-high-molecular-weight polyethylene fiber (UHMWPE) (e.g., Spectra®, Dyneema®), a polycarbonate (e.g., Lexan®), a carbon fiber composite material, ceramic, steel, boron nitride, a boron nitride composite material, and/or a metal (e.g., titanium). In one embodiment, the pouch is sized to fit the battery and the at least one layer of a material to provide resistance to bullets, knives, shrapnel, and/or other projectiles. In another embodiment, the at least one layer of a material to provide resistance to bullets, knives, shrapnel, and/or other projectiles is incorporated into the pouch itself. In yet another embodiment, the at least one layer of a material to provide resistance to bullets, knives, shrapnel, and/or other projectiles is housed in a built-in pocket inside of the pouch or permanently affixed (e.g., laminated, stitched, adhered) to the pouch.

In a preferred embodiment, the at least one layer of a material to provide resistance to bullets, knives, shrapnel, and/or other projectiles is on the first side (i.e., the exterior facing side) of the pouch. Advantageously, this layer protects the battery as well as the user. In one embodiment, the at least one layer of a material to provide resistance to bullets, knives, shrapnel, and/or other projectiles has a slight curvature or contour for conforming to the battery cover. Additionally, or alternatively, the at least one layer of a material to provide resistance to bullets, knives, shrapnel, and/or other projectiles is on the second side (i.e., the user facing side) of the pouch. In one embodiment, the at least one layer of a material to provide resistance to bullets, knives, shrapnel, and/or other projectiles has a slight curvature or contour for conforming to the back plate. Advantageously, this layer provides additional protection to the user.

In another embodiment, the battery includes a material to provide resistance to bullets, knives, shrapnel, and/or other projectiles. In one embodiment, the material to provide resistance to bullets, knives, shrapnel, and/or other projectiles is incorporated into the battery cover and/or back plate. In an alternative embodiment, the material to provide resistance to bullets, knives, shrapnel, and/or other projectiles is between the battery cover and the battery element. Advantageously, this layer protects the plurality of battery cells housed in the battery as well as the user. Additionally, or alternatively, the material to provide resistance to bullets, knives, shrapnel, and/or other projectiles is between the battery element and the back plate. Advantageously, this layer provides additional protection to the user.

As previously described, the pouch is preferably formed of a flexible, durable, and waterproof and/or water-resistant material. In one embodiment, seams of the pouch are sewn with an anti-wick or non-wicking thread. In one example, the anti-wick or non-wicking polyester thread is a bonded polyester thread with wax coating (e.g., Dabond®). The wax coating on the thread plugs stitch holes to waterproof seams. Alternatively, seams are joined together using ultrasonic welding.

In one embodiment, the pouch includes drainage holes to remove water from the pouch. The drainage holes are formed of a mesh fabric. Alternatively, the drainage holes are formed using holes with grommets in the waterproof and/or water-resistant material.

In another embodiment, the pouch incudes at least one desiccant to remove moisture from the pouch. In one embodiment, the at least one desiccant includes silica. Alternatively, the at least one desiccant includes activated charcoal, calcium sulfate, calcium chloride, and/or molecular sieves (e.g., zeolites).

The portable battery pack includes leads having a connector portion. As previously described, the connector portion can be any type or style of connector needed to mate to equipment to be used with the battery of the portable battery pack. In one embodiment, a cord connector is used to protect a mated connection between the connector portion and the equipment. Examples of a cord connector include U.S. Pat. Nos. 5,336,106, 5,505,634, and 5,772,462, each of which is incorporated herein by reference in its entirety. Alternatively, a piece of heat shrink tubing is positioned to cover a mated connection between the connector portion and the equipment. In a preferred embodiment, the heat shrink tubing is sized to cover at least 0.25 inch of cabling on either side of the mated connection. Heat is then applied using a heat gun or hair dryer to shrink the tubing and seal the mated connection.

In one embodiment, the portable battery pack includes at least one processor. The at least one processor is preferably housed in the battery. In another embodiment, the at least one processor is incorporated into control electronics used to determine the state of charge (SOC) of the portable battery pack. Examples of state of charge indicators are disclosed in U.S. Publication Nos. 20170269162 and 20150198670, each of which is incorporated herein by reference in its entirety.

Figure 21:
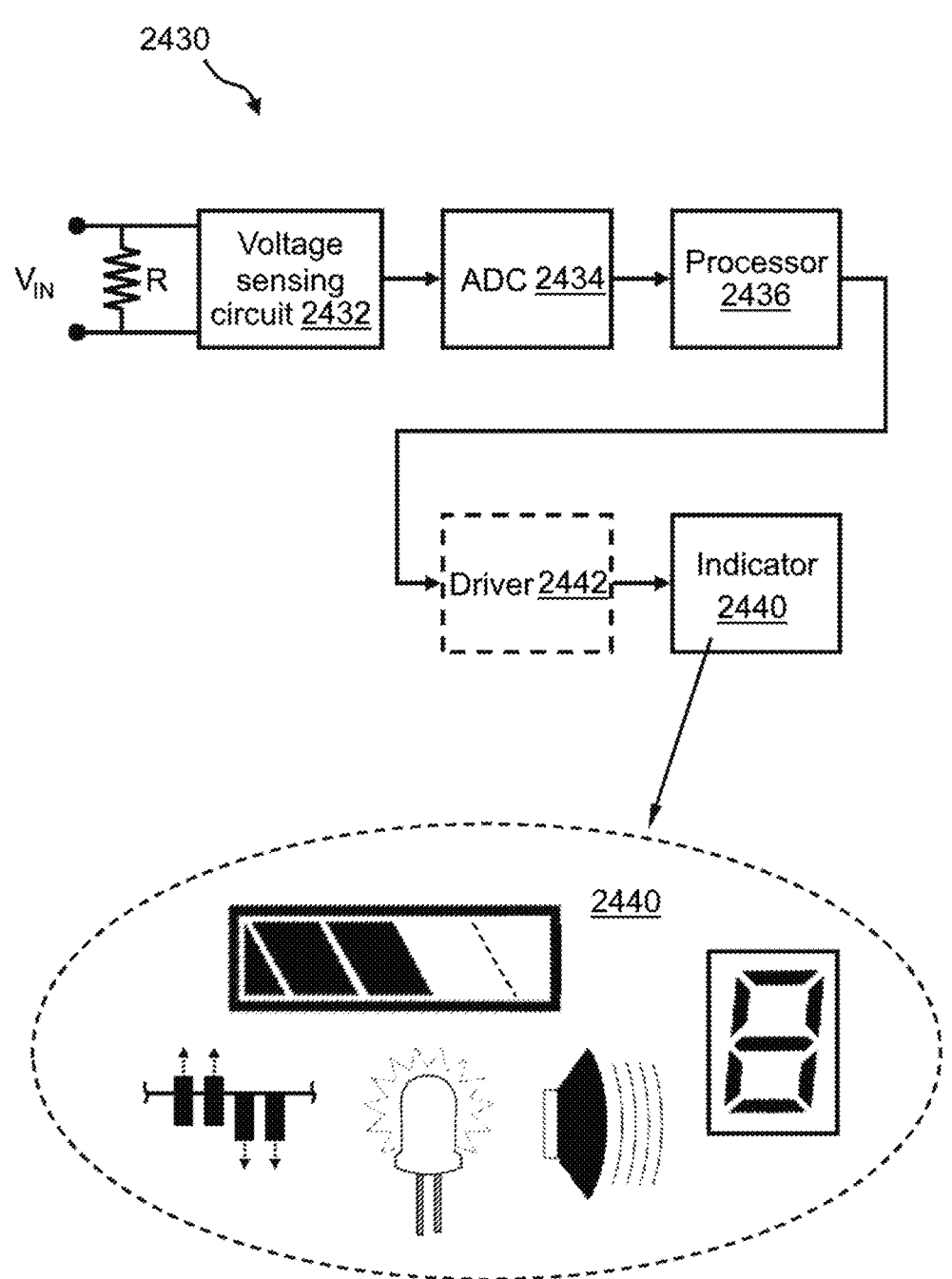
FIG. 21 illustrates a block diagram of one embodiment of the control electronics for a state of charge (SOC) indicator incorporated into the portable battery pack.

FIG. 21 illustrates a block diagram of one embodiment of the control electronics for a state of charge indicator incorporated into the portable battery pack. In this example, the control electronics 2430 includes a voltage sensing circuit 2432, an analog-to-digital converter (ADC) 2434, a processor 2436, the indicator 2440, and optionally a driver 2442.

The voltage sensing circuit 2432 can be any standard voltage sensing circuit, such as those found in volt meters. An input voltage VIN is supplied via the power BUS. In one embodiment, the voltage sensing circuit 2432 is designed to sense any direct current (DC) voltage in the range of from about 0 volts DC to about 50 volts DC. In one embodiment, the voltage sensing circuit 2432 includes standard amplification or de-amplification functions for generating an analog voltage that correlates to the amplitude of the input voltage VIN that is present. The ADC 2434 receives the analog voltage from the voltage sensing circuit 2432 and performs a standard analog-to-digital conversion.

The processor 2436 manages the overall operations of the SOC indicator. The processor 2436 is any controller, microcontroller, or microprocessor that is capable of processing program instructions.

The indicator 2440 is any visual, audible, or tactile mechanism for indicating the state of charge of the portable battery pack. A preferred embodiment of a visual indicator is at least one 5-bar liquid crystal display (LCD), wherein five bars flashing or five bars indicates greatest charge and one bar or one bar flashing indicates least charge. Another example of a visual indicator is at least one seven-segment numeric LCD, wherein the number 5 flashing or the number 5 indicates greatest charge and the number 1 or the number 1 flashing indicates least charge. Alternatively, the at least one LCD displays the voltage of the portable battery pack as measured by the control electronics.

The at least one LCD is preferably covered with a transparent material. In a preferred embodiment, the cover is formed of a clear plastic (e.g., poly(methyl methacrylate)). This provides an extra layer of protection for the at least one LCD, much like a screen protector provides an extra layer of protection for a smartphone. This increases the durability of the at least one LCD. In one embodiment, the at least one LCD is on the housing of the battery. In a preferred embodiment, the housing of the battery includes a waterproof sealant (e.g., silicone) around the cover.

Alternatively, a visual indicator is at least one LED. One preferred embodiment of a visual indicator is a set of light-emitting diodes (LEDs) (e.g., 5 LEDs), wherein five lit LEDs flashing or five lit LEDs indicates greatest charge and one lit LED or one lit LED flashing indicates least charge. In one embodiment, the LEDs are red, yellow, and/or green. In one example, two of the LEDs are green to indicate a mostly full charge on the portable battery pack, two of the LEDs are yellow to indicate that charging will soon be required for the portable battery pack, and one LED is red to indicate that the portable battery pack is almost drained. In a preferred embodiment, at least three bars, lights, or numbers are used to indicate the state of charge.

In one embodiment, the at least one LED is preferably covered with a transparent material. In a preferred embodiment, the cover is formed of a clear plastic (e.g., poly (methyl methacrylate)). This provides an extra layer of protection for the at least one LED and increases the durability of the at least one LED. Alternatively, the at least one LED is on the housing of the battery. In a preferred embodiment, the housing of the battery includes a waterproof sealant (e.g., silicone) around the cover.

One example of an audible indicator is any sounds via an audio speaker or a headset, such as beeping sounds, wherein five beeps indicates greatest charge and one beep indicates least charge. Another example of an audible indicator is vibration sounds via any vibration mechanism (e.g., vibration motor used in mobile phones), wherein five vibration sounds indicates greatest charge and one vibration sound indicates least charge.

One example of a tactile indicator is any vibration mechanism (e.g., vibration motor used in mobile phones), wherein five vibrations indicate greatest charge and one vibration indicate least charge. Another example of a tactile indicator is a set of pins that rise up and down to be felt in Braille-like fashion, wherein five raised pins indicates greatest charge and one raised pin indicates least charge.

In one example, the processor 2436 is able to drive indicator 2440 directly. In one embodiment, the processor 2436 is able to drive directly a 5-bar LCD or a seven-segment numeric LCD. In another example, however, the processor 2436 is not able to drive indicator 2440 directly. In this case, the driver 2442 is provided, wherein the driver 2442 is specific to the type of indicator 2440 used in the control electronics 2430.

Additionally, the processor 2436 includes internal programmable functions for programming the expected range of the input voltage VIN and the correlation of the value the input voltage VIN to what is indicated at the indicator 2440. In other words, the discharge curve of the one or more batteries of the portable battery pack is correlated to what is indicated at indicator 2440. In one embodiment, the processor 2436 is programmed based on a percent discharged or on an absolute value present at the input voltage VIN. In one embodiment, the processor is programmed with the purpose of intentionally giving a lower state of charge than actually available. In this embodiment, the battery will last longer because it will not reach a completely discharged state as frequently. Advantageously, this embodiment encourages the user to recharge the battery before it runs down. Further, this embodiment extends the overall life of the battery and increases performance of the battery.

In another embodiment, the processor is programmed to not take a voltage reading when the load is a maximum load. In one example, the battery is powering a radio, and the processor is programmed to not take a voltage reading when the radio is transmitting or receiving. Alternatively, the processor is programmed to take a voltage reading when the load is minimized.

In one embodiment, the control electronics includes at least one antenna, which allows the portable battery pack to send information (e.g., state of charge information) to at least one remote device (e.g., smartphone, tablet, laptop computer, satellite phone) and/or receive information (e.g., software updates, activation of kill switch) from at least one remote device. The at least one antenna provides wireless communication, standards-based or non-standards-based, by way of example and not limitation, radiofrequency (RF), BLUETOOTH, ZIGBEE, NEAR FIELD COMMUNICATION (NFC), or similar commercially used standards.

Figure 22A:
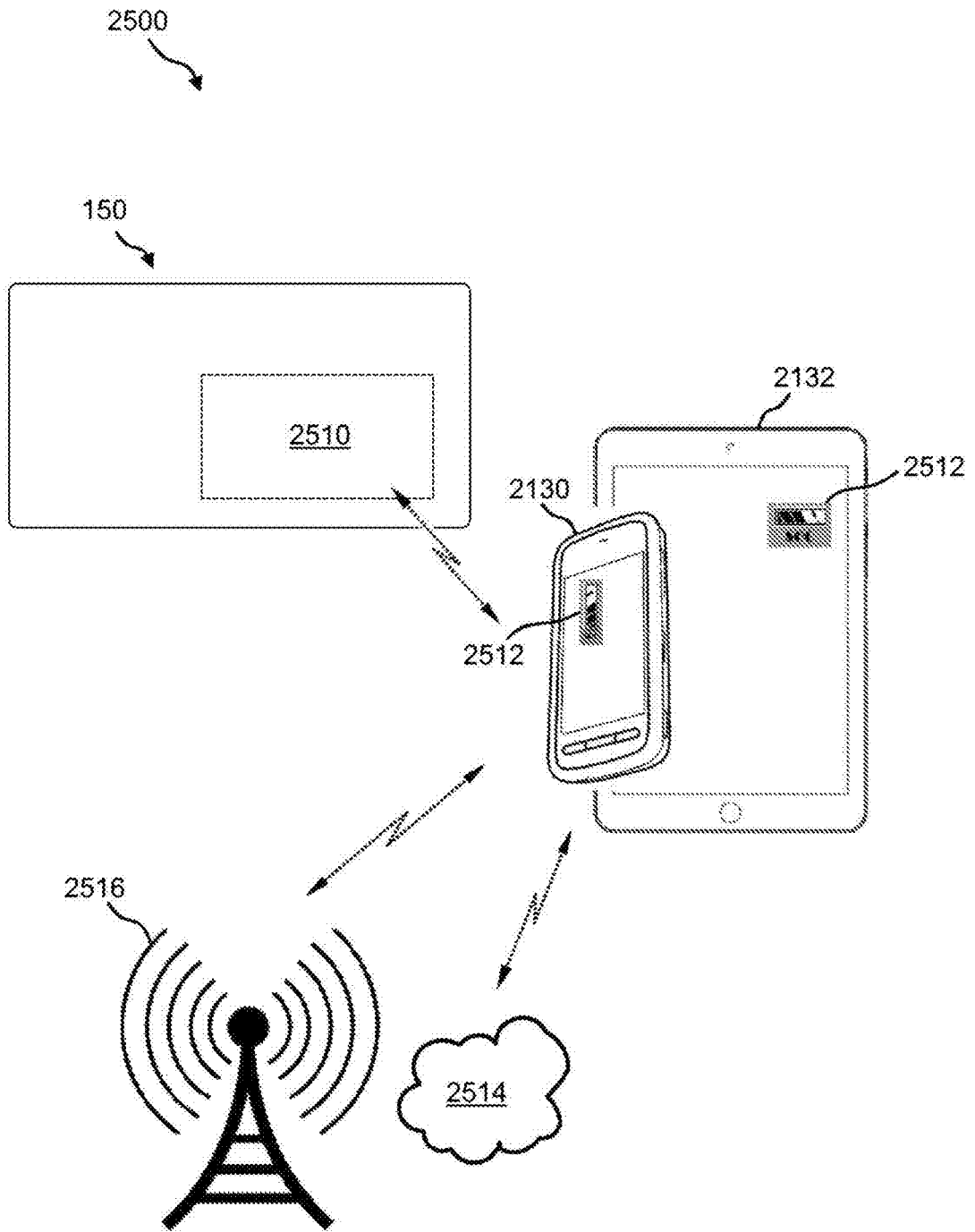
FIG. 22A illustrates a block diagram of an example of an SOC system that includes a mobile application for use with a portable battery pack.

FIG. 22A illustrates a block diagram of an example of an SOC system 2500 that includes a mobile application for use with a portable battery pack. The SOC system 2500 includes a battery 150 having a communications interface 2510.

The communications interface 2510 is any wired and/or wireless communication interface for connecting to a network and by which information is exchanged with other devices connected to the network. Examples of wired communication interfaces include, but are not limited to, System Management Bus (SMBus), USB ports, RS232 connectors, RJ45 connectors, Ethernet, and any combinations thereof. Examples of wireless communication interfaces include, but are not limited to, an Intranet connection, Internet, ISM, BLUETOOTH technology, WI-FI, WI-MAX, IEEE 802.11 technology, radio frequency (RF), NEAR FIELD COMMUNICATION (NFC), ZIGBEE, Infrared Data Association (IrDA) compatible protocols, Local Area Networks (LAN), Wide Area Networks (WAN), Shared Wireless Access Protocol (SWAP), any combinations thereof, and other types of wireless networking protocols.

The communications interface 2510 is used to communicate, preferably wirelessly, with at least one remote device, such as but not limited to, a mobile phone 2130 or a tablet 2132. The mobile phone 2130 is any mobile phone that (1) is capable of running mobile applications and (2) is capable of communicating with the portable battery pack. The mobile phone 2130 can be, for example, an Android™ phone, an Apple® iPhone®, or a Samsung® Galaxy® phone. Likewise, the tablet 2132 is any tablet that (1) is capable of running mobile applications and (2) is capable of communicating with the portable battery pack. The tablet 2132 can be, for example, the 3G or 4G version of the Apple® iPad®.

Further, in the SOC system 2500, the mobile phone 2130 and/or the tablet 2132 is in communication with a cellular network 2516 and/or a network 2514. The network 2514 is any network for providing wired or wireless connection to the Internet, such as a local area network (LAN) or a wide area network (WAN).

An SOC mobile application 2512 is installed and running at the mobile phone 2130 and/or the tablet 2132. The SOC mobile application 2512 is implemented according to the type (i.e., the operating system) of mobile phone 2130 and/or tablet 2132 on which it is running. The SOC mobile application 2512 is designed to receive SOC information from the portable battery pack. The SOC mobile application 2512 indicates graphically, audibly, and/or tactilely, the state of charge to the user (not shown).

Figure 22B:
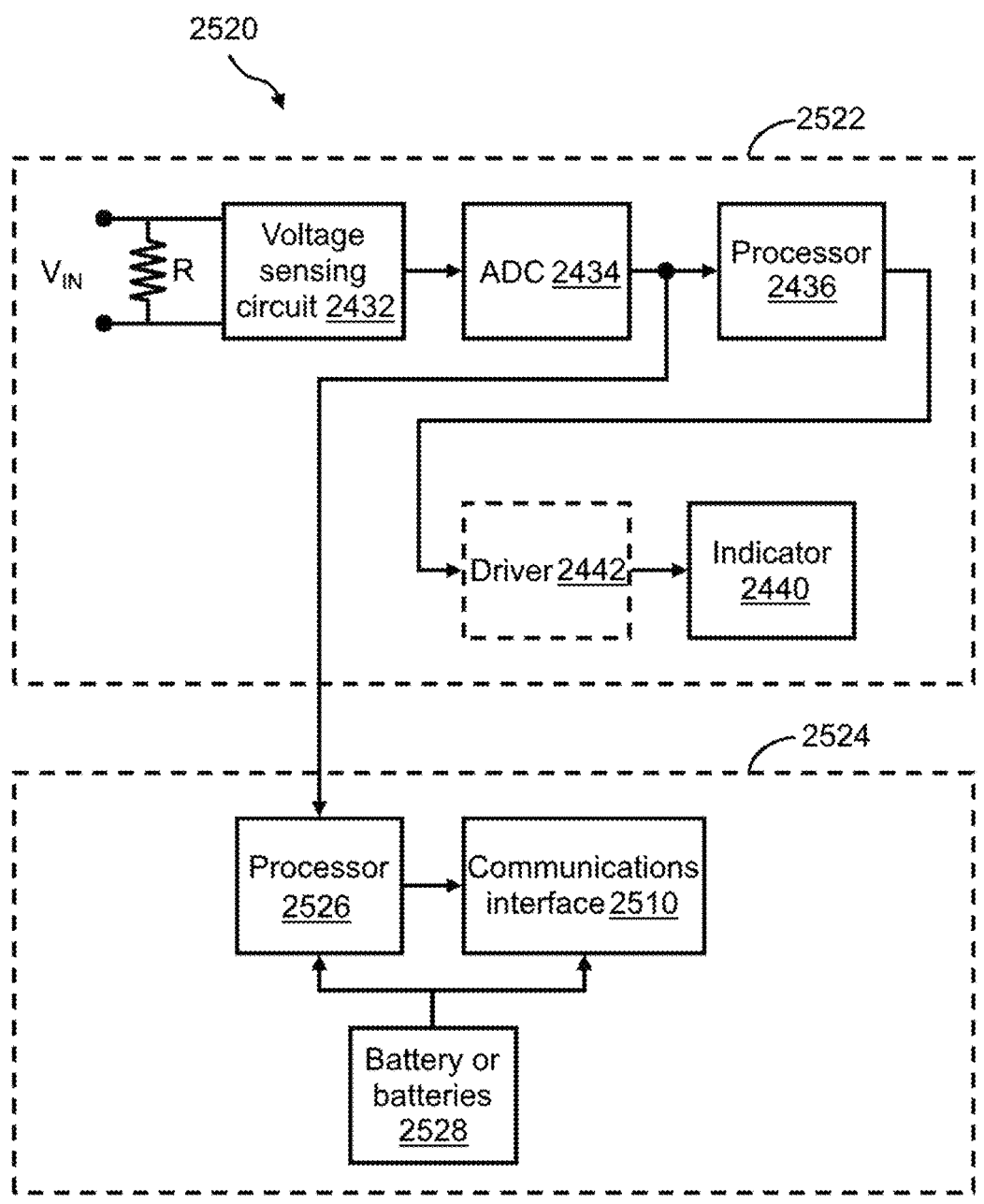
FIG. 22B illustrates a block diagram of an example of control electronics of the portable battery pack that is capable of communicating with the SOC mobile application.

FIG. 22B illustrates a block diagram of an example of a second SOC system 2520 of the portable battery pack that is capable of communicating with the SOC mobile application 2512. In this example, the second SOC system 2520 includes an SOC portion 2522 and a communications portion 2524. The SOC portion 2522 is substantially the same as the control electronics 2430 shown in FIG. 21. The communications portion 2524 handles the communication of the SOC information to the SOC mobile application 2512 at, for example, the mobile phone 2130 and/or the tablet 2132.

The communications portion 2524 includes a processor 2526 that is communicatively connected to the communications interface 2510. The digital output of the ADC 2434 of the SOC portion 2522, which is the SOC information, feeds an input to the processor 2526. The processor 2526 is any controller, microcontroller, or microprocessor that is capable of processing program instructions. One or more batteries 2528 provide power to the processor 2526 and the communications interface 2510. The one or more batteries 2528 can be any standard cylindrical battery, such as quadruple-A, triple-A, or double-A, or a battery from the family of button cell and coin cell batteries. A specific example of a battery 2528 is the CR2032 coin cell 3-volt battery.

In the second SOC system 2520, the SOC portion 2522 and the communications portion 2524 operate substantially independent of one another. Namely, the communications portion 2524 is powered separately from the SOC portion 2522 so that the communications portion 2524 is not dependent on the presence of the input voltage VIN at the SOC portion 2522 for power. Therefore, in this example, the communications portion 2524 is operable to transmit information to the SOC mobile application 2512 at any time. However, in order to conserve battery life, in one embodiment the processor 2526 is programmed to be in sleep mode when no voltage is detected at the input voltage VIN at the SOC portion 2522 and to wake up when an input voltage VIN is detected. Alternatively, the processor 2526 is programmed to periodically measure the SOC and send SOC information to the SOC mobile application 2512 on the at least one remote device periodically, such as every hour, regardless of the state of input voltage VIN.

Figure 22C:
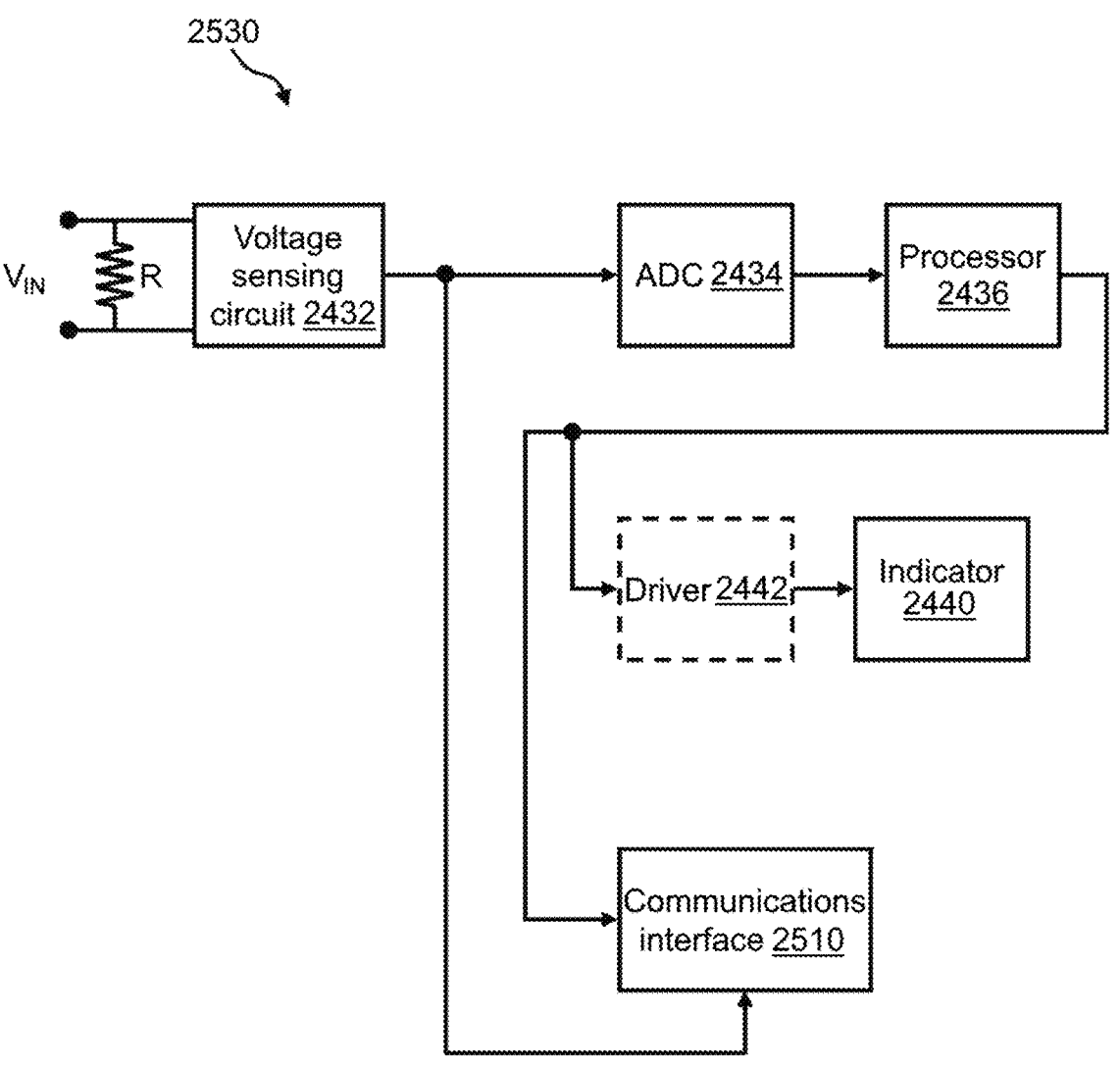
FIG. 22C illustrates a block diagram of another example of control electronics of the portable battery pack that is capable of communicating with the SOC mobile application.

FIG. 22C illustrates a block diagram of another example of control electronics 2530 of the portable battery pack that is capable of communicating with the SOC mobile application 2512. In this example, the operation of the communications interface 2510 is dependent on the presence of a voltage at input voltage VIN. This is because, in control electronics 2530, the communications interface 2510 is powered from the output of voltage sensing circuit 2432. Further, the processor 2436 provides the input (i.e., the SOC information) to the communications interface 2510. A drawback of the control electronics 2530 of FIG. 22C as compared with the SOC system 2520 of FIG. 22B, is that it is operable to transmit SOC information to the SOC mobile application 2512 only when the portable battery pack has a charge.

Alternatively, the SOC of the battery of the portable battery pack is determined by a pluggable state of charge indicator. An example of a pluggable state of charge indicator is disclosed in U.S. Publication Nos. 20170269162 and 20150198670, each of which is incorporated herein by reference in its entirety. Advantageously, intermittently measuring the SOC of the battery extends the run time of the battery.

Figure 23:
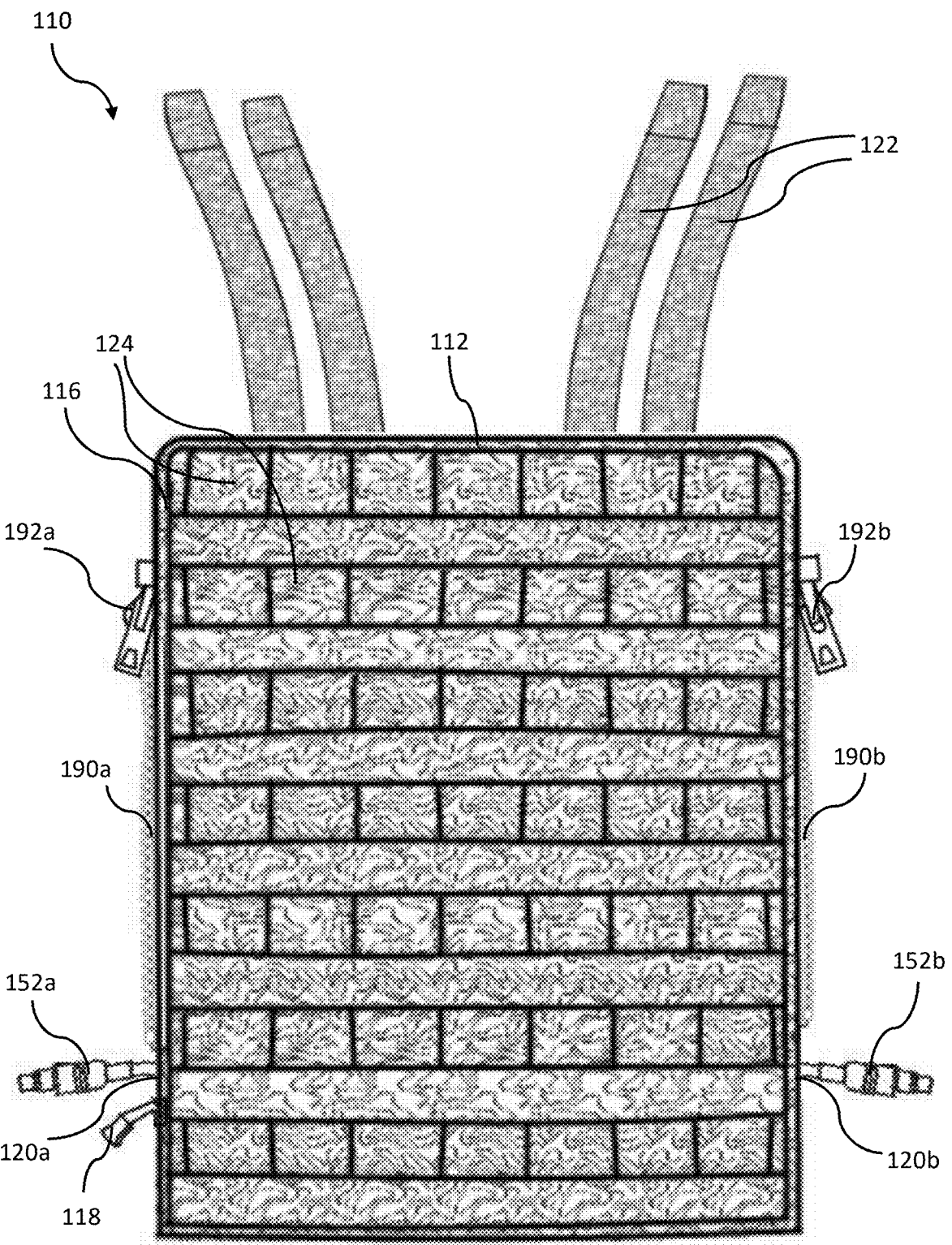
FIG. 23 illustrates a front perspective view of an example of the portable battery pack that comprises a battery enclosed by a wearable pouch or skin sized to hold the battery and additional devices or components.
Figure 24:
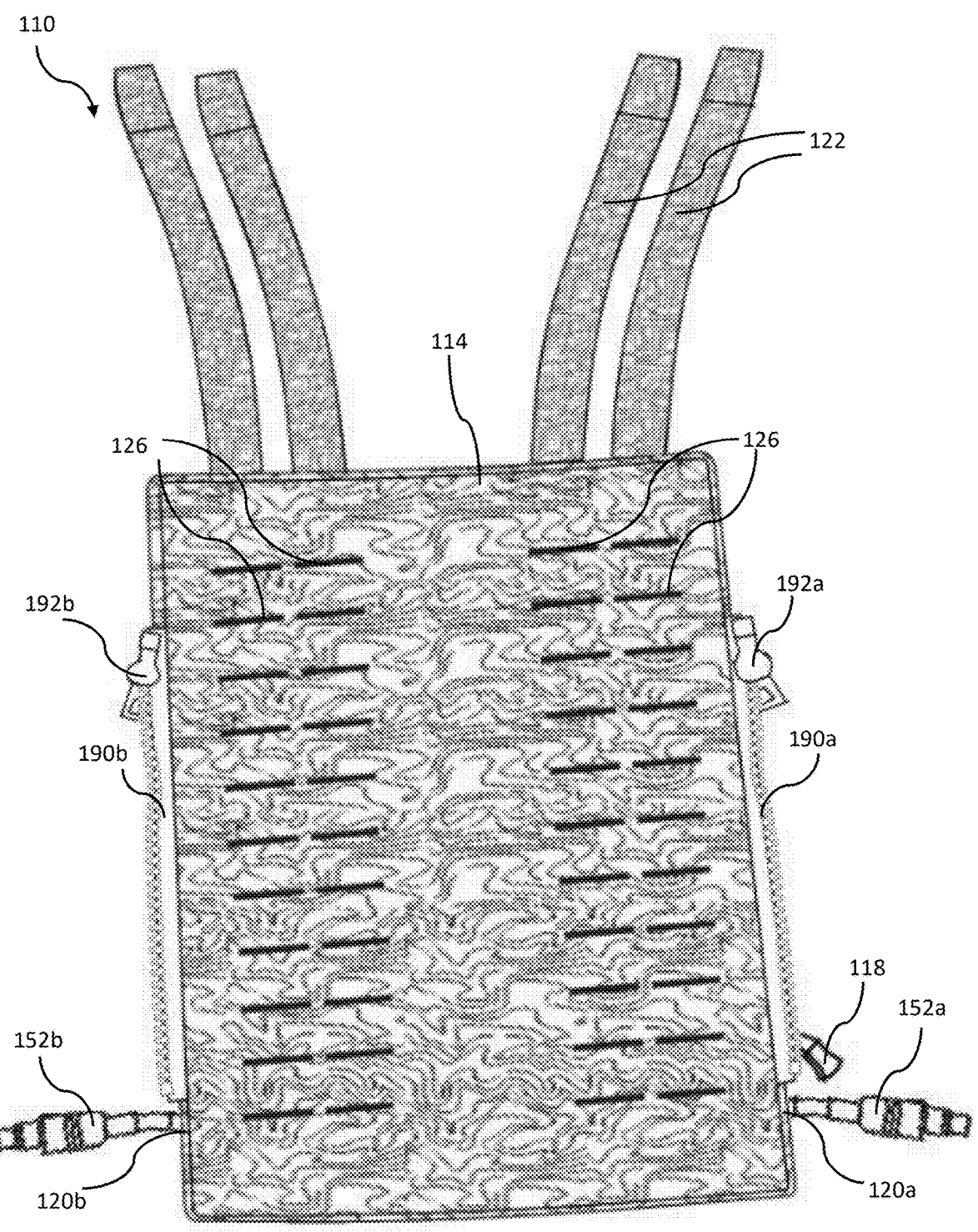
FIG. 24 illustrates a rear perspective view of an example of the portable battery pack that comprises a battery enclosed by a wearable pouch or skin sized to hold the battery and additional devices or components.

In another preferred embodiment, the portable battery pack includes a battery enclosed by a wearable pouch or skin sized to hold the battery and additional devices or components as shown in FIGS. 23-24. In this example, the pouch 110 is a wearable pouch or skin that can be sized in any manner that substantially corresponds to a size of at least one battery, at least one radio, at least one power and/or data hub, at least one GPS system, and/or other gear.

In a preferred embodiment, the pouch 110 is formed of a flexible, durable, and waterproof or at least water-resistant material. For example, the pouch 110 is formed of polyester, polyvinyl chloride (PVC)-coated polyester, vinyl-coated polyester, nylon, canvas, PVC-coated canvas, or polycotton canvas. In one embodiment, the pouch 110 is formed of a material that is laminated to or treated with a waterproofing or water repellant material (e.g., rubber, PVC, polyurethane, silicone elastomer, fluoropolymers, wax, thermoplastic elastomer). Additionally, or alternatively, the pouch 110 is treated with a UV coating to increase UV resistance. The exterior finish of the pouch 110 can be any color, such as white, brown, green, orange (e.g., international orange), yellow, black, or blue, or any pattern, such as camouflage, as provided herein, or any other camouflage in use by the military, law enforcement, or hunters. For example, in FIGS. 23-24, the pouch 110 is shown to have a camouflage pattern. In one embodiment, the exterior of the pouch 110 includes a reflective tape (e.g., infrared reflective tape), fabric, or material. Advantageously, the reflective tape, fabric, or material improves visibility of the user in low-light conditions.

The pouch 110 has a first side 112 and a second side 114. The pouch 110 also includes a pouch opening 116, which is the opening through which a battery is fitted into the pouch 110. In the example shown in FIGS. 23-24, the pouch opening 116 is opened and closed using a zipper, as the pouch 110 includes a zipper tab 118. Other mechanisms, however, can be used for holding the pouch opening 116 of the pouch 110 open or closed, such as, a hook and loop system (e.g., Velcro®), buttons, snaps, hooks, ties, clips, buckles, and the like. In a preferred embodiment, the pouch 110 has at least one opening for a corresponding lead. In the example shown in FIGS. 23-24, the pouch 110 has a first lead opening 120a for a first lead 152a and a second lead opening 120b for a second lead 152b. For example, the first lead opening 120a and/or the second lead opening 120b can be a 0.5-inch long slit or a 0.75-inch long slit in the edge of the pouch 110. In one embodiment, the first lead opening 120a and/or the second lead opening 120b is finished or reinforced with stitching. In another embodiment, the first lead opening 120a and/or the second lead opening 120b is laser cut.

In a preferred embodiment, the pouch 110 of the portable battery pack 100 is MOLLE-compatible. In one embodiment, the pouch 110 incorporates a pouch attachment ladder system (PALS), which is a grid of webbing used to attach smaller equipment onto load-bearing platforms, such as vests and backpacks. For example, the PALS grid consists of horizontal rows of 1-inch (2.5 cm) webbing, spaced about one inch apart, and reattached to the backing at 1.5-inch (3.8 cm) intervals. In one embodiment, the webbing is formed of nylon (e.g., cordura nylon webbing, MIL-W-43668 Type III nylon webbing). Accordingly, a set of straps 122 (e.g., four straps 122) are provided on one edge of the pouch 110 as shown. Further, rows of webbing 124 (e.g., seven rows 124) are provided on the first side 112 of the pouch 110, as shown in FIG. 23. Additionally, rows of slots or slits 126 (e.g., eleven rows of slots or slits 126) are provided on the second side 114 of the pouch 110, as shown in FIG. 24. In a preferred embodiment, the set of straps 122, the rows of webbing 124, and the rows of slots or slits 126 replicate and duplicate the MOLLE underneath the portable battery pack on the load bearing equipment. Advantageously, this allows for minimal disruption to the user because the user can place additional gear pouches or gear (e.g., water bottle, antenna pouch) on the MOLLE of the portable battery pack in an equivalent location.

In the embodiment shown in FIGS. 23-24, the portable battery pack is made to affix to a plate carrier, body armor, or a vest with at least one single width of zipper tape sewn on the front panel or the back panel (e.g., JPC 2.0™ by Crye Precision). FIGS. 23-24 show details of the first side 112 of the pouch 110 including a first single width of zipper tape 190a and a first zipper slider 192a and a second single width of zipper tape 190b and a second zipper slider 192b. The first single width of zipper tape 190a mates with a corresponding single width of zipper tape on the plate carrier, the body armor, or the vest. The second single width of zipper tape 190b also mates with a corresponding single width of zipper tape on the plate carrier, the body armor, or the vest.

Figure 25:
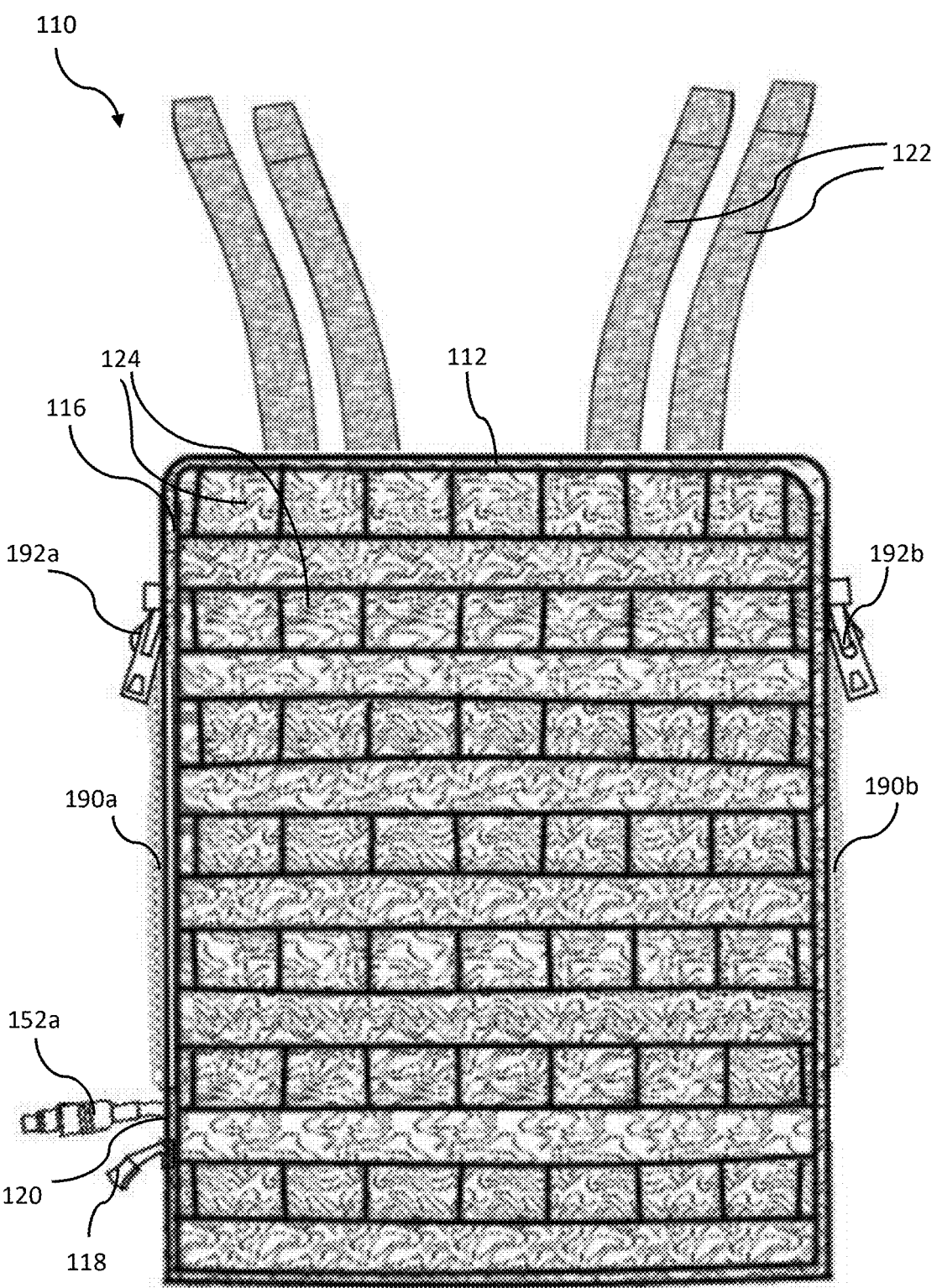
FIG. 25 illustrates a front perspective view of another example of the portable battery pack that comprises a battery enclosed by a wearable pouch or skin sized to hold the battery and additional devices or components.
Figure 26:
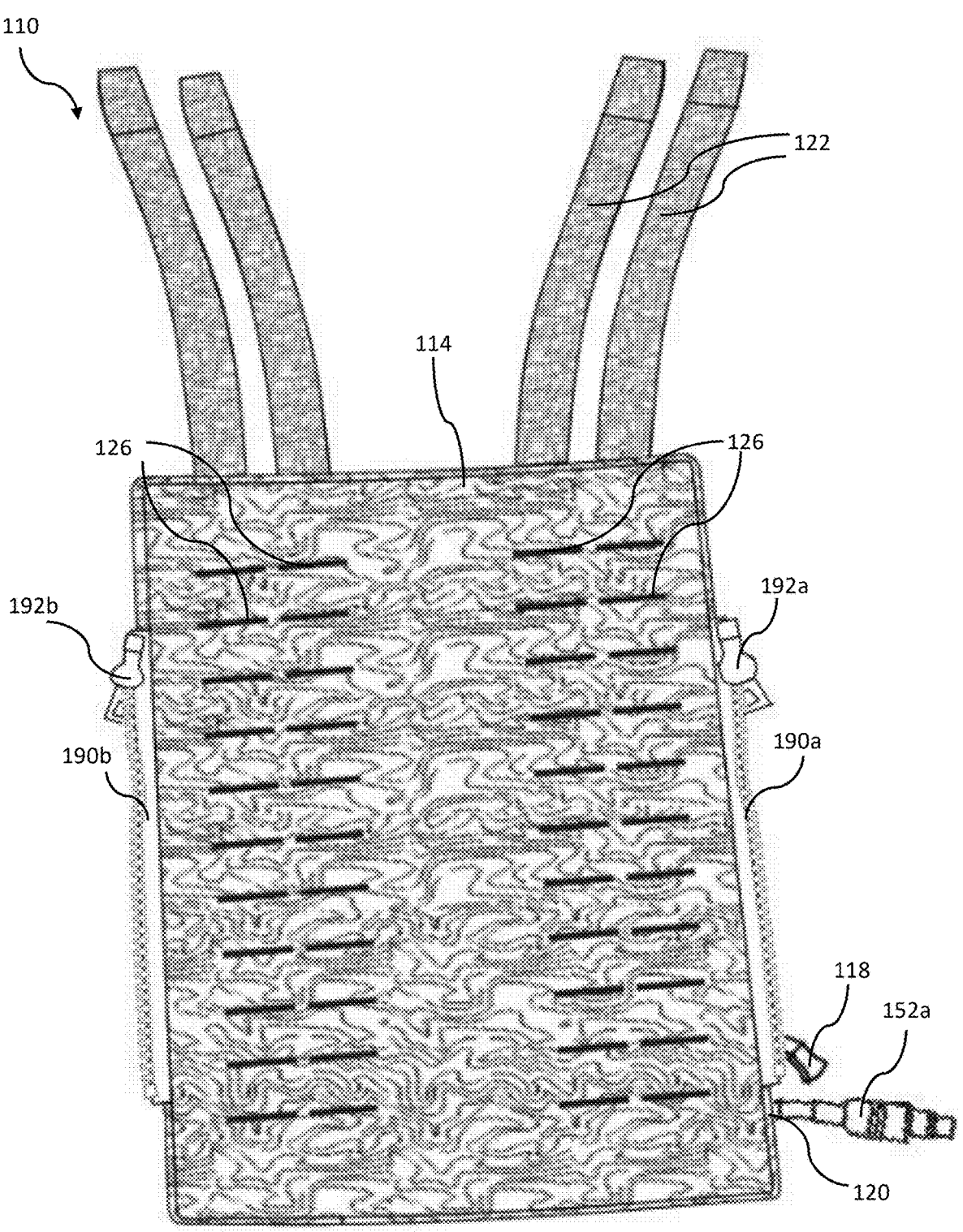
FIG. 26 illustrates a rear perspective view of another example of the portable battery pack that comprises a battery enclosed by a wearable pouch or skin sized to hold the battery and additional devices or components.

In one embodiment, at least one lead of the battery of the portable battery pack is used to power at least one device enclosed in the pouch of the portable battery pack. In the example shown in FIGS. 25-26, the battery of the portable battery pack has a first lead 152a and a second lead (not shown). The first lead 152a exits the pouch 110 through a lead opening 120. The second lead is used to power at least one device enclosed in the pouch 110 of the portable battery pack.

The portable battery pack is operable to supply power to a power distribution and data hub. The power distribution and data hub is operable to supply power to at least one peripheral device (e.g., tablet, smartphone, computer, radio, rangefinder, GPS system). The power distribution and data hub is also operable to transfer data between at least two of the peripheral devices. Additionally, the power distribution and data hub is operable to transfer data between the battery and the at least one peripheral device when the battery includes at least one processor. In a preferred embodiment, the power distribution and data hub is enclosed in the pouch of the portable battery pack. Alternatively, the power distribution and data hub is not enclosed in the pouch of the portable battery pack.

Figure 27:
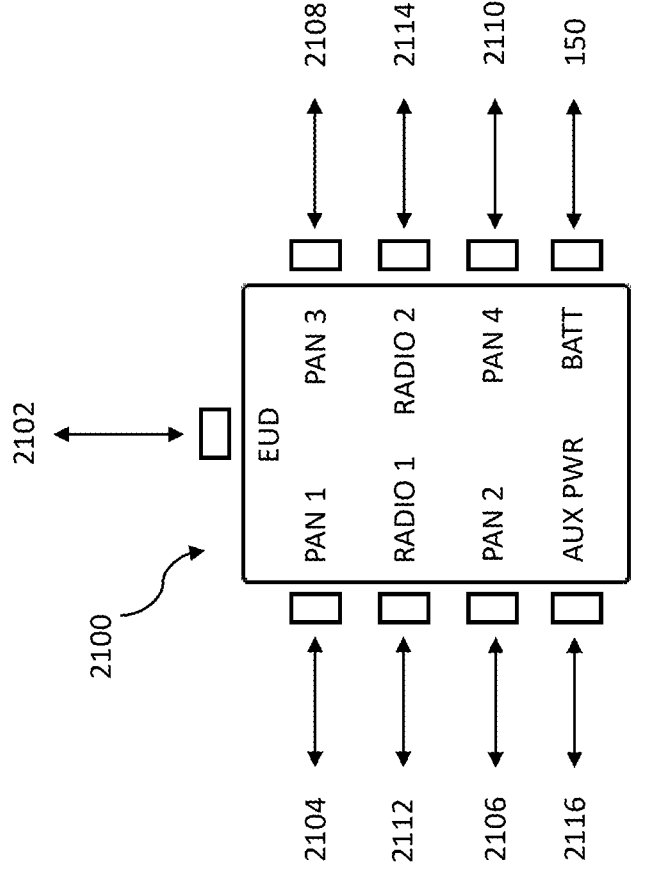
FIG. 27 illustrates a block diagram of one example of a power distribution and data hub.

FIG. 27 illustrates a block diagram of one example of a power distribution and data hub (e.g., STAR-PAN™ by Glenair). The power distribution and data hub 2100 is connected to the battery 150 of the portable battery pack. The battery 150 supplies power to the power distribution and data hub 2100. In the example shown in FIG. 27, the power distribution and data hub 2100 provides power to an end user device (EUD) 2102. The end user device 2102 is a tablet, a smartphone, or a computer (e.g., laptop computer). The power distribution and data hub 2100 is operable to provide power to a first peripheral device 2104, a second peripheral device 2106, a third peripheral device 2108, and a fourth peripheral device 2110 through a personal area network (PAN). In one embodiment, the first peripheral device 2104, the second peripheral device 2106, the third peripheral device 2108, and/or the fourth peripheral device 2110 is a radio, a rangefinder (e.g., Pocket Laser Range Finder (PLRF)), a laser designator (e.g., Special Operations Forces Laser Acquisition Marker (SOFLAM), Type 163 Laser Target Designator), a targeting system (e.g., Firestorm™), a GPS device (e.g., Defense Advanced GPS Receiver (DAGR)), night vision goggles, an electronic jamming system (e.g., AN/PLT-4, AN/PLT-5 (Thor II) by Sierra Nevada Corporation, Thor III), a mine detector, a metal detector, a camera (e.g., body camera), a thermal imaging device (e.g., camera, binoculars), a short wave infrared (SWIR) device, a satellite phone, an antenna, a lighting system (e.g., portable runway lights, infrared strobe lights), an environmental sensor (e.g., radiation, airborne chemicals, pressure, temperature, humidity), an amplifier, and/or a receiver (e.g., Tactical Net ROVER™, Intelligence, Surveillance, and Reconnaissance (ISR), Multi-Band Digital Video Receiver Enhanced (MVR VIE), Multi-Band Video Receiver (MVR IV), Soldier Intelligence Receiver (SIR), StrikeHawk™ Video Downlink Receiver). The power distribution and data hub 2100 is operable to supply power to peripheral devices that require 5V charging via a USB adapter.

The power distribution and data hub 2100 is operable to supply power to a first radio 2112 and a second radio 2114. In a preferred embodiment, the first radio 2112 and/or the second radio 2114 is a PRC-152, a PRC-154, a PRC-117G, a PRC-161, a persistent wave relay, a PRC-148 MBITR, a PRC-148 JEM, a PRC-6809 MBITR Clear, a RT-1922 SADL, a RF-7850M-HH, a ROVER® (e.g., ROVER® 6x Transceiver by L3 Communication Systems), a push-to-talk radio, and/or a PNR-1000. Alternative radios are compatible with the present invention.

In another embodiment, the first peripheral device 2104, the second peripheral device 2106, the third peripheral device 2108, and/or the fourth peripheral device 2110 is a fish finder and/or a chartplotter, an aerator or a live bait well, a camera (e.g., an underwater camera), a temperature and/or a depth sensor, a stereo, a drone, and/or a lighting system. In one embodiment, the lighting system includes at least one LED.

The power distribution and data hub is operable to recharge at least one battery. For example, the power distribution and data hub is operable to recharge a battery for a drone and/or a robot. The power distribution and data hub is also operable to recharge CR123 batteries, which are often used in devices, such as camera and lighting systems. Advantageously, this allows the power distribution and data hub to recharge batteries in remote locations without access to a power grid, a generator, and/or a vehicle battery.

The power distribution and data hub 2100 is operable to transfer data between the end user device 2102, the first peripheral device 2104, the second peripheral device 2106, the third peripheral device 2108, the fourth peripheral device 2110, the first radio 2112, the second radio 2114, and/or the battery 150 when the battery 150 includes at least one processor.

The power distribution and data hub 2100 has a port to obtain power from an auxiliary power source 2116. In one embodiment, the auxiliary power source 2116 is an alternating current (AC) adapter, a solar panel, a generator, a portable power case, a fuel cell, a vehicle battery, a rechargeable battery, and/or a non-rechargeable battery. Alternatively, the auxiliary power source 2116 is an inductive charger. In another embodiment, the auxiliary power source 2116 is operable to supply power to the power distribution and data hub 2100 by harvesting ambient radiofrequency (RF) waves, capturing exothermic body reactions (e.g., heat, sweat), using friction (e.g., triboelectric effect) or kinetic energy, or harvesting energy from running water or wind energy. In yet another embodiment, the auxiliary power source 2116 is a pedal power generator. The auxiliary power source 2116 is preferably operable to recharge the battery 150.

Figure 28:
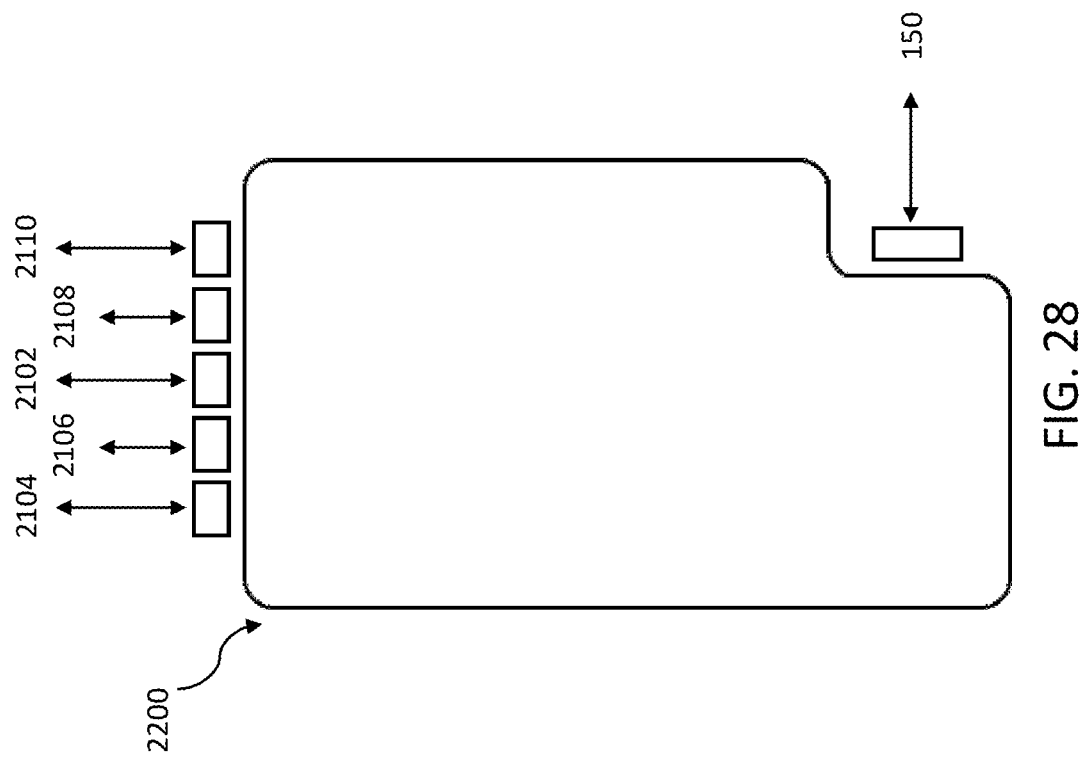
FIG. 28 illustrates a block diagram of another example of a power distribution and data hub.

FIG. 28 illustrates a block diagram of another example of a power distribution and data hub (e.g., APEx™ by Black Diamond Advanced Technology). The power distribution and data hub 2200 is connected to the battery 150 of the portable battery pack. The battery 150 supplies power to the power distribution and data hub 2200. In the example shown in FIG. 28, the power distribution and data hub 2200 provides power to an end user device 2102. The end user device 2102 is a tablet, a smartphone, or a computer (e.g., laptop computer). The power distribution and data hub 2200 is operable to provide power to a first peripheral device 2104, a second peripheral device 2106, a third peripheral device 2108, and a fourth peripheral device 2110. In one embodiment, the first peripheral device 2104, the second peripheral device 2106, the third peripheral device 2108, and/or the fourth peripheral device 2110 is a radio, a rangefinder (e.g., Pocket Laser Range Finder (PLRF)), a laser designator (e.g., Special Operations Forces Laser Acquisition Marker (SOFLAM), Type 163 Laser Target Designator), a targeting system (e.g., Firestorm™), a GPS device (e.g., Defense Advanced GPS Receiver (DAGR)), night vision goggles, an electronic jamming system (e.g., AN/PLT-4, AN/PLT-5 (Thor II) by Sierra Nevada Corporation, Thor III), a mine detector, a metal detector, a camera (e.g., body camera), a thermal imaging device (e.g., camera, binoculars), a short wave infrared (SWIR) device, a satellite phone, an antenna, a lighting system (e.g., portable runway lights, infrared strobe lights), an environmental sensor (e.g., radiation, airborne chemicals, pressure, temperature, humidity), an amplifier, and/or a receiver (e.g., Tactical Net ROVER™, Intelligence, Surveillance, and Reconnaissance (ISR), Multi-Band Digital Video Receiver Enhanced (MVR VIE), Multi-Band Video Receiver (MVR IV), Soldier Intelligence Receiver (SIR), StrikeHawk™ Video Downlink Receiver). In a preferred embodiment, the radio is a PRC-152, a PRC-154, a PRC-117G, a PRC-161, a persistent wave relay, a PRC-148 MBITR, a PRC-148 JEM, a PRC-6809 MBITR Clear, a RT-1922 SADL, a RF-7850M-HH, a ROVER® (e.g., ROVER® 6x Transceiver by L3 Communication Systems), a push-to-talk radio, and/or a PNR-1000. Alternative radios are compatible with the present invention.

The power distribution and data hub 2200 is operable to transfer data between the end user device 2102, the first peripheral device 2104, the second peripheral device 2106, the third peripheral device 2108, the fourth peripheral device 2110, and/or the battery 150 when the battery 150 includes at least one processor.

In one embodiment, the power distribution and data hub includes at least one step up voltage converter and/or at least one step down voltage converter. In one example, the power distribution and data hub is powered by a 16.8V battery and includes a step up voltage converter to 29.4V. In another example, the power distribution and data hub is powered by a 16.8V battery and includes a step down voltage converter to 5V. Advantageously, this allows the portable battery pack to power devices (e.g., smartphones) with a charging voltage of 5V. This also reduces the bulk outside the power distribution and data hub because the step down voltage converter is housed within the power distribution and data hub and a separate external voltage converter is not required.

In another embodiment, the power distribution and data hub is operable to prioritize a supply of power to the at least one peripheral device. In one example, the power distribution and data hub is connected to a first peripheral device and a second peripheral device. The power distribution and data hub will stop supplying power to the second peripheral device when the available power in the battery and/or auxiliary power source is lower than a designated threshold. In another example, the power distribution and data hub is connected to a first peripheral device, a second peripheral device, a third peripheral device, and a fourth peripheral device. The power distribution and data hub will stop supplying power to the fourth peripheral device when the available power in the battery and/or auxiliary power source is lower than a first designated threshold, the power distribution and data hub will stop supplying power to the third peripheral device when the available power in the battery and/or auxiliary power source is lower than a second designated threshold, and the power distribution and data hub will stop supplying power to the second peripheral device when the available power in the battery and/or auxiliary power source is lower than a third designated threshold.

In one embodiment, the power distribution and data hub provides power in an order of priority of the attached peripheral device and automatically cuts out devices of lower mission priority in order to preserve remaining power for higher priority devices. In one example, a radio has a first (i.e., top) priority, a tablet has a second priority, a mobile phone has a third priority, and a laser designator (e.g., Special Operations Forces Laser Acquisition Marker (SO-FLAM)) has a fourth priority.

In one embodiment, the power distribution and data hub prioritizes at least one peripheral device by using at least one smart cable. The at least one smart cable stores information including, but not limited to, a unique identifier (e.g., MAC address) for the at least one peripheral device, power requirements of the at least one peripheral device, a type of device for the at least one peripheral device, and/or a priority ranking for the at least one peripheral device.

Figure 29:
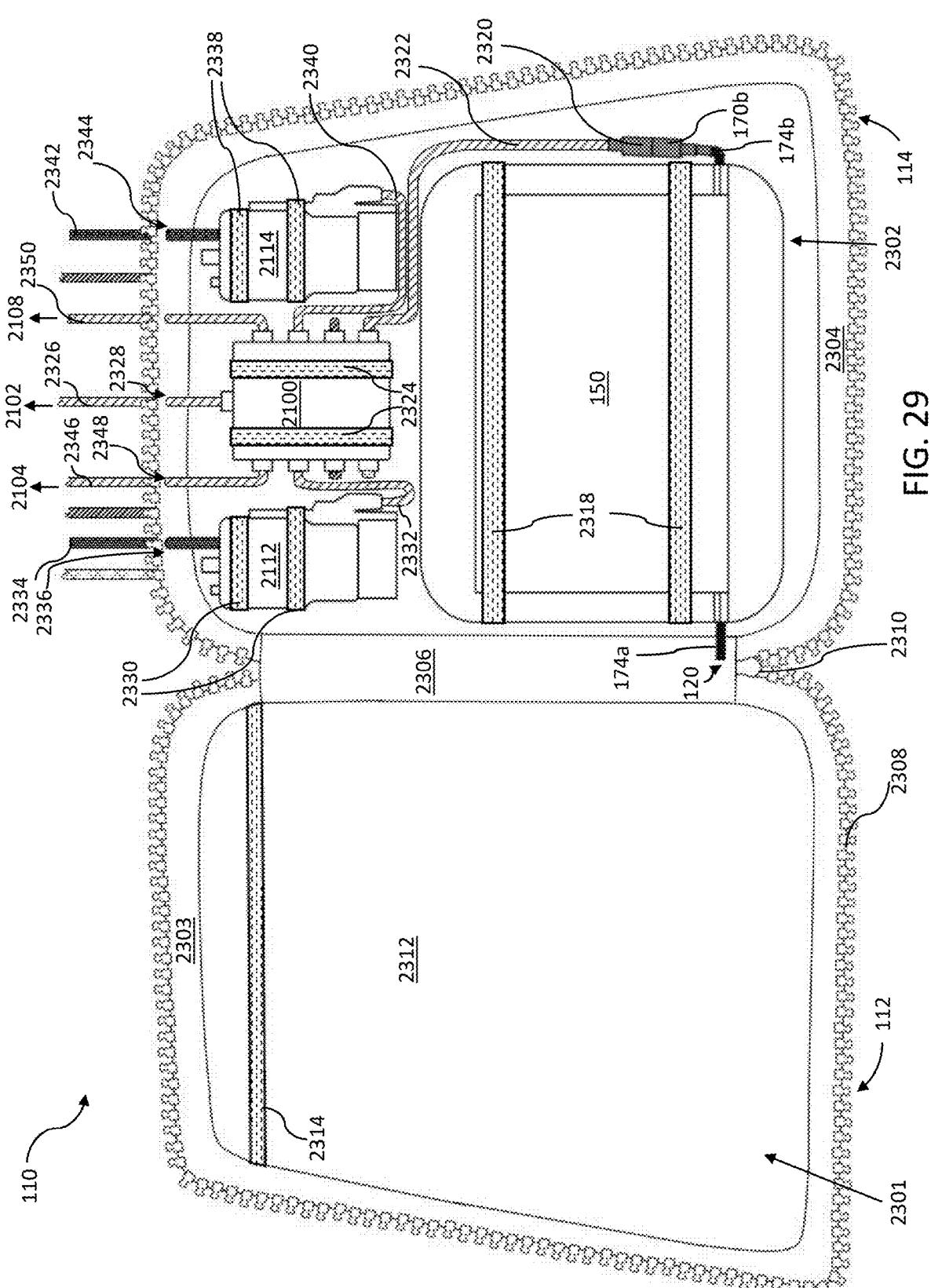
FIG. 29 illustrates an interior perspective view of an example of the portable battery pack that includes a battery and a power distribution and data hub enclosed by a wearable pouch or skin.

FIG. 29 illustrates an interior perspective view of an example of the portable battery pack that includes a battery 150 and a power distribution and data hub 2100 enclosed by a wearable pouch or skin. The first side 112 of the pouch 110 has an interior of the first side 2301. The second side 114 of the pouch 110 has an interior of the second side 2302. The first side 112 has a first side gusset 2303 and the second side 114 has a second side gusset 2304. The first side gusset 2303 and the second side gusset 2304 are attached at a top position of a fabric stop 2306 and a bottom position of the fabric stop 2306. A zipper 2308 with a zipper pull 2310 is attached to the first side gusset 2303 and the second side gusset 2304. Advantageously, this configuration allows the pouch 110 to lie flat when opened.

In a preferred embodiment, an interior of the pouch includes at least one integrated pocket. In the example shown in FIG. 29, the interior of the first side 2301 has an integrated pocket 2312. The integrated pocket 2312 is formed of polyester, polyvinyl chloride (PVC)-coated polyester, vinyl-coated polyester, nylon, canvas, PVC-coated canvas, polycotton canvas, and/or a mesh fabric. In a preferred embodiment, the integrated pocket 2312 is formed of a clear vinyl fabric. Advantageously, this allows a user to see the contents of the integrated pocket 2312. In one example, the user stores a map or instructions in the integrated pocket 2312. The integrated pocket 2312 closes using a piece of elastic 2314. Alternatively, the integrated pocket 2312 closes using a zipper, a hook and loop system, one or more buttons, one or more snaps, one or more ties, one or more buckles, one or more clips, and/or one or more hooks.

The interior of the second side 2302 holds a battery 150, a power distribution and data hub 2100, a first radio 2112, and a second radio 2114. In a preferred embodiment, the battery 150 is held in place by at least one strap 2318. The at least one strap 2318 is preferably made of an elastic material. Alternatively, the at least one strap 2318 is made of a non-elastic material. In other embodiments, the at least one strap 2318 includes hook-and-loop tape. A first spring 174*a* of a first lead (not shown) extends out of the pouch 110 through a lead opening 120. A second spring 174*b* surrounds wiring that is electrically connected to a connector portion 170*b*. The connector 170*b* is electrically connected to a mating connector 2320 that is attached to a battery cable 2322, which connects to the power distribution and data hub 2100.

In a preferred embodiment, the power distribution and data hub 2100 is held in place by at least one strap 2324. The at least one strap 2324 is preferably made of an elastic material. Alternatively, the at least one strap 2324 is made of a non-elastic material. In other embodiments, the at least one strap 2324 includes hook-and-loop tape.

The power distribution and data hub 2100 is connected to an end user device 2102 (e.g., tablet, smartphone, computer) via an end user device cable 2326. The end user device cable 2326 extends out of the pouch 110 through an end user device cable opening 2328.

The power distribution and data hub 2100 is connected to the first radio 2112 via a first radio cable 2332. The first radio 2112 is held in place by at least one strap 2330. The at least one strap 2330 is preferably made of an elastic material. Alternatively, the at least one strap 2330 is made of a non-elastic material. In other embodiments, the at least one strap 2330 includes hook-and-loop tape. In one embodiment, the first radio 2112 has an antenna 2334 that extends out of the pouch 110 through a first radio antenna opening 2336 in the second side gusset 2304. The power distribution and data hub 2100 is connected to the second radio 2114 via a second radio cable 2340. The second radio 2114 is held in place by at least one strap 2338. The at least one strap 2338 is preferably made of an elastic material. Alternatively, the at least one strap 2338 is made of a non-elastic material. In other embodiments, the at least one strap 2338 includes hook-and-loop tape. The second radio 2114 has an antenna 2342 that extends out of the pouch 110 through a second radio antenna opening 2344 in the second side gusset 2304.

Although FIG. 29 illustrates the power distribution and data hub 2100 in an orientation above the battery 150, it is equally possible for the battery 150 to be in an orientation above the power distribution and data hub 2100. In one embodiment, the orientation of the power distribution and data hub 2100 relative to the battery 150 is selected by the user based on multiple factors, including accessibility to equipment and weight distribution.

Figure 30:
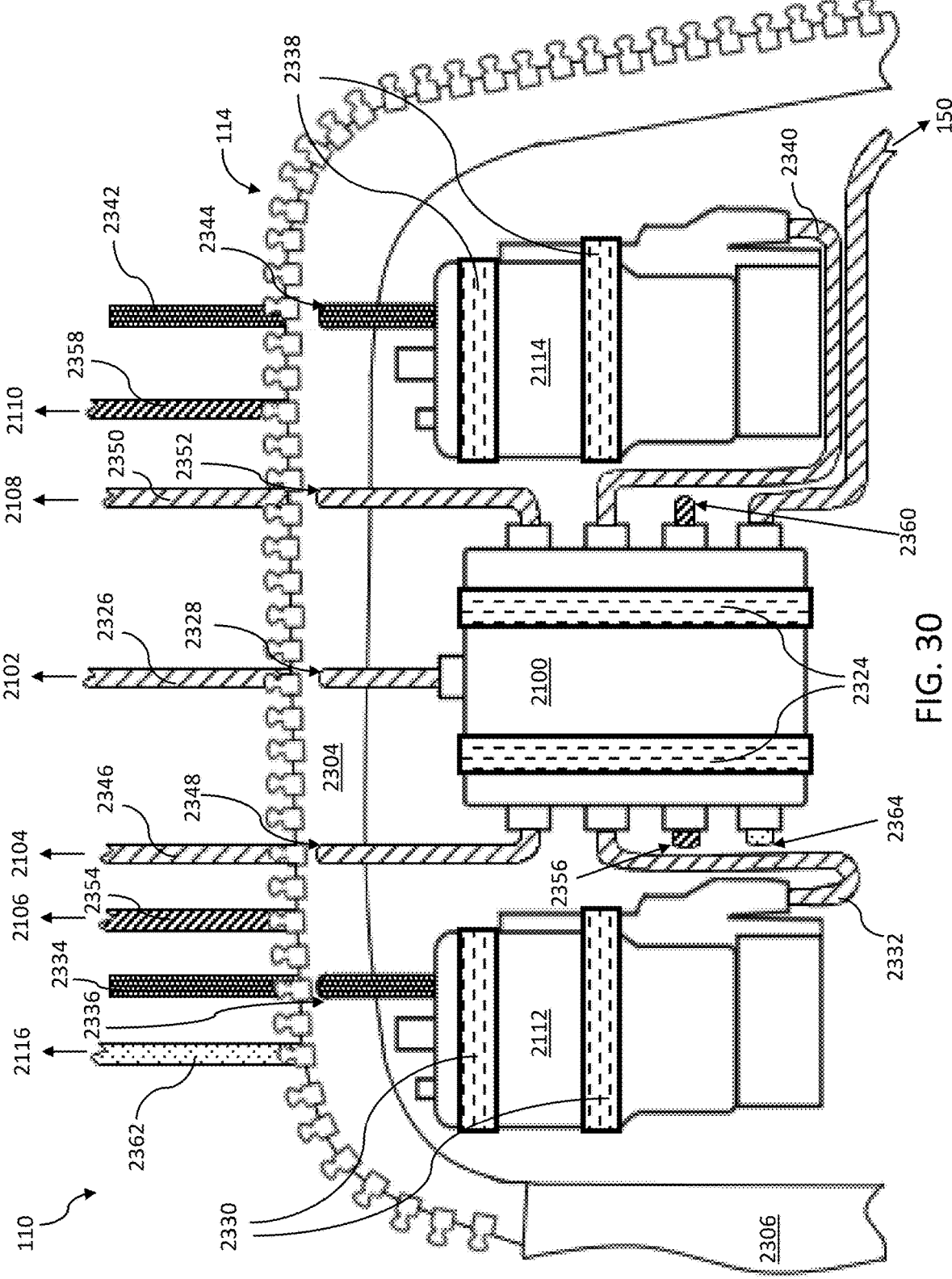
FIG. 30 is a detail view of the interior perspective view of the example of the portable battery pack shown in FIG. 29.

FIG. 30 is a detail view of the interior perspective view of the example of the portable battery pack shown in FIG. 29. The power distribution and data hub 2100 is operable to provide power to a first peripheral device 2104, a second peripheral device 2106, a third peripheral device 2108, and a fourth peripheral device 2110 through a personal area network (PAN). The power distribution and data hub 2100 is connected to the first peripheral device 2104 via a first peripheral device cable 2346. The first peripheral device cable 2346 extends out of the pouch 110 through a first peripheral device cable opening 2348 in the second side gusset 2304. Alternatively, the first peripheral device cable 2346 extends out of the pouch 110 through an opening in the second side 114 of the pouch 110. The power distribution and data hub 2100 is connected to the second peripheral device 2106 via a second peripheral device cable 2354. The second peripheral device cable 2354 extends out of the pouch 110 through a second peripheral device cable opening 2356 in the second side 114 of the pouch 110. Alternatively, the second peripheral device cable 2354 extends out of the pouch 110 through an opening in the second side gusset 2304. The power distribution and data hub 2100 is connected to the third peripheral device 2108 via a third peripheral device cable 2350. The third peripheral device cable 2350 extends out of the pouch 110 through a third peripheral device cable opening 2352 in the second side gusset 2304. Alternatively, the third peripheral device cable 2350 extends out of the pouch 110 through an opening in the second side 114 of the pouch 110. The power distribution and data hub 2100 is connected to the fourth peripheral device 2110 via a fourth peripheral device cable 2358. The fourth peripheral device cable 2358 extends out of the pouch 110 through a fourth peripheral device cable opening 2360 in the second side 114 of the pouch 110. Alternatively, the fourth peripheral device cable 2358 extends out of the pouch 110 through an opening in the second side gusset 2304. In other embodiments, at least one of the first peripheral device 2104, the second peripheral device 2106, the third peripheral device 2108, and/or the fourth peripheral device 2110 is stored in the pouch 110.

The power distribution and data hub 2100 is operable to obtain power from an auxiliary power source 2116. The power distribution and data hub 2100 is connected to the auxiliary power source 2116 via an auxiliary power source cable 2364. The auxiliary power source cable 2364 extends out of the pouch 110 through an auxiliary power source cable opening 2364 in the second side gusset 2304. Alternatively, the auxiliary power source cable 2364 extends out of the pouch 110 through an opening in the second side 114 of the pouch 110. In another embodiment, the auxiliary power source 2116 (e.g., a non-rechargeable battery) is stored in the pouch 110.

In one embodiment, the auxiliary power source 2116 is an alternating current (AC) adapter, a solar panel, a generator, a portable power case, a fuel cell, a vehicle battery, a rechargeable battery, and/or a non-rechargeable battery. Alternatively, the auxiliary power source 2116 is an inductive charger. In another embodiment, the auxiliary power source 2116 is operable to supply power to the power distribution and data hub 2100 by harvesting ambient radiofrequency (RF) waves, capturing exothermic body reactions (e.g., heat, sweat), using friction (e.g., triboelectric effect) or kinetic energy, or harvesting energy from running water or wind energy. In yet another embodiment, the auxiliary power source 2116 is a pedal power generator. The auxiliary power source 2116 is preferably operable to recharge the battery 150.

Figure 31A:
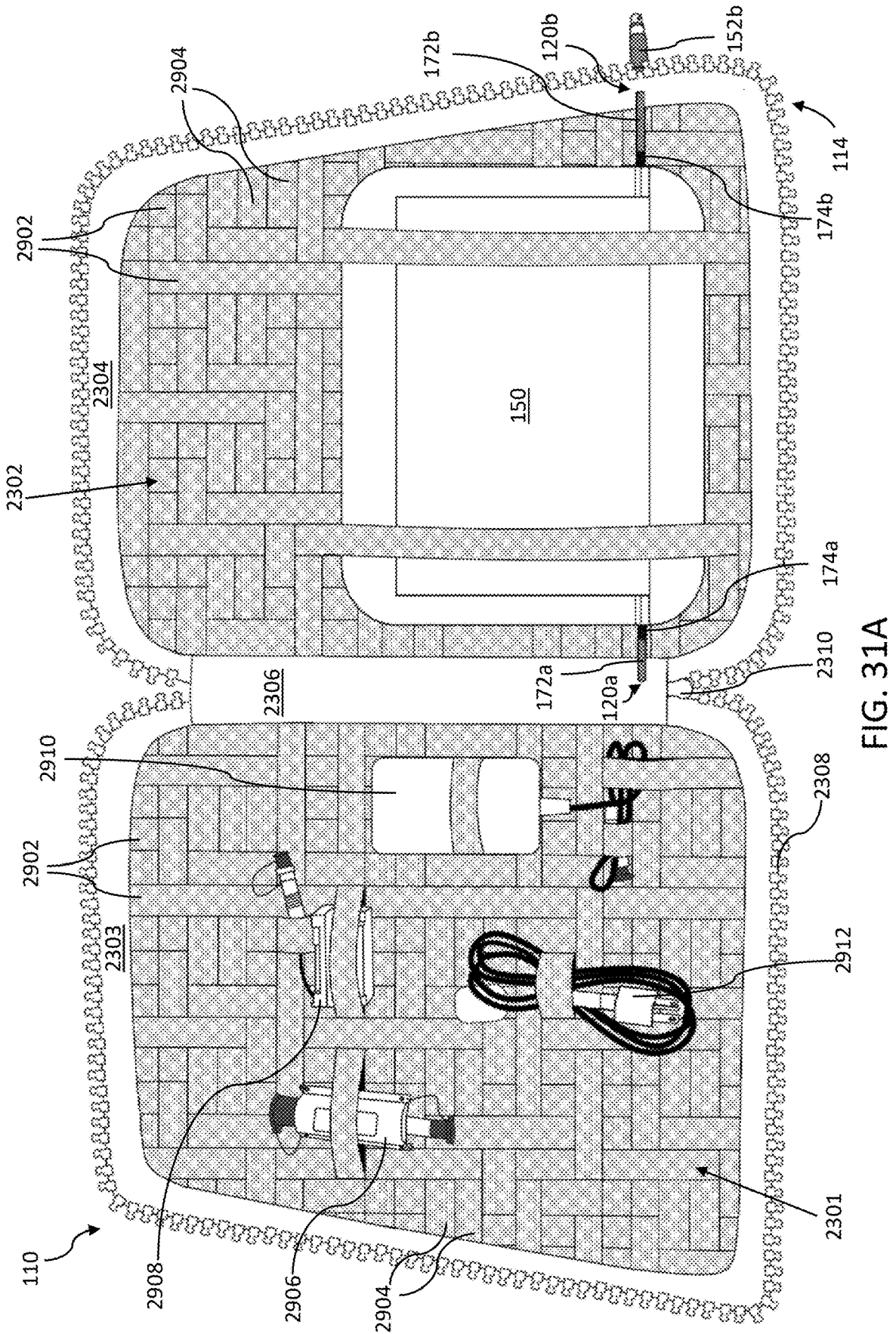
FIG. 31A illustrates an interior perspective view of an example of the portable battery pack that includes an object retention system in the wearable pouch or skin.

FIG. 31A illustrates an interior perspective view of an example of the portable battery pack that includes an object retention system in the wearable pouch or skin. The pouch 110 has an interior of a first side 2301 and an interior of a second side 2302. In a preferred embodiment, the interior of the first side 2301 and/or the interior of the second side 2302 contains an object retention system (e.g., GRID-IT® by Cocoon Innovations) as described in U.S. Publication Nos. 20090039122, 20130214119, and 20130256498, each of which is incorporated herein by reference in its entirety.

The object retention system is formed of a weave of a plurality of rubberized elastic bands. The plurality of rubberized elastic bands is preferably formed of a first set of straps 2902 and a second set of straps 2904. The first set of straps 2902 is preferably oriented substantially perpendicular to the second set of straps 2904. Additionally, each strap in the first set of straps 2902 is preferably oriented substantially parallel to other straps in the first set of straps 2902. Further, each strap in the second set of straps 2904 is preferably oriented substantially parallel to other straps in the second set of straps 2904. In the example shown in FIG. 31A, the first set of straps 2902 is shown in a substantially vertical direction and the second set of straps 2904 is shown in a substantially horizontal direction.

In the example shown in FIG. 31A, the interior of the first side 2301 has an object retention system. The object retention system is shown holding a state of charge indicator 2906. An example of a state of charge indicator 2906 is disclosed in U.S. Publication Nos. 20170269162 and 20150198670, each of which is incorporated herein by reference in its entirety. The object retention system is also shown holding a universal DC power adaptor 2908. An example of a universal DC power adaptor 2908 is disclosed in U.S. Pat. No. 9,240,651, which is incorporated herein by reference in its entirety. The object retention system is shown holding a first half of an AC adapter 2910 and a second half of an AC adapter 2912.

The interior of the second side 2302 holds a battery 150. A first wiring portion 172a of a first lead (not shown) extends out of the pouch 110 through a first lead opening 120*a*. A second wiring portion 172*b* of a second lead 152*b* extends out of the pouch 110 through a second lead opening 120*b*. A first spring 174*a* is provided around the first wiring portion 172*a*, such that a portion of the first spring 174*a* is inside the battery cover and a portion of the first spring 174*a* is outside the battery cover. The presence of the first spring 174*a* around the first wiring portion 172*a* of the first lead (not shown) allows the first lead to be flexed in any direction for convenient connection to equipment from any angle. The presence of the first spring 174*a* around the first wiring portion 172*a* of the first lead also allows the first lead to be flexed repeatedly without breaking or failing. A second spring 174*b* is provided around the second wiring portion 172*b*, such that a portion of the second spring 174*b* is inside the battery cover and a portion of the second spring 174*b* is outside the battery cover. The presence of the second spring 174*b* around the second wiring portion 172*b* of the second lead 152*b* allows the second lead 152*b* to be flexed in any direction for convenient connection to equipment from any angle. The presence of the second spring 174*b* around the second wiring portion 172*b* of the second lead 152*b* also allows the second lead 152*b* to be flexed repeatedly without breaking or failing. In one example, the first spring 174*a* and/or the second spring 174*b* is a steel spring that is from about 0.25 inches to about 1.5 inches long.

Figure 31B:
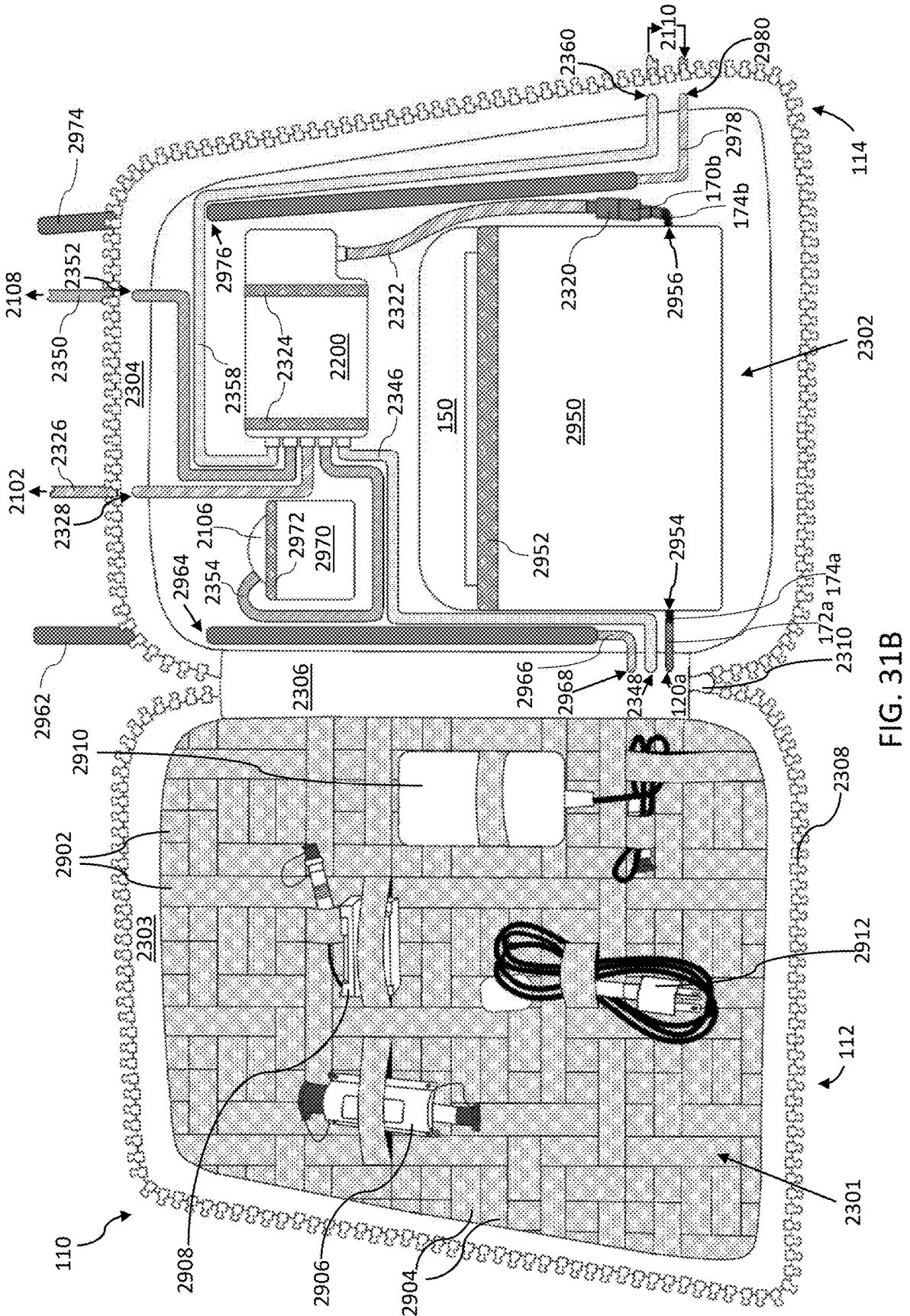
FIG. 31B illustrates an interior perspective view of another example of the portable battery pack that includes an object retention system in the wearable pouch or skin.

FIG. 31B illustrates an interior perspective view of another example of the portable battery pack that includes an object retention system in the wearable pouch or skin. In the example shown in FIG. 31B, the interior of the second side 2302 holds a battery 150 and a power distribution and data hub 2200. In a preferred embodiment, the battery 150 is held in place by a battery pocket 2950. The battery pocket 2950 is formed of polyester, polyvinyl chloride (PVC)-coated polyester, vinyl-coated polyester, nylon, canvas, PVC-coated canvas, polycotton canvas, and/or a mesh fabric. In one embodiment, the battery pocket 2950 closes using a piece of elastic 2952. In another embodiment, the battery pocket 2950 includes at least one layer of a material for dissipating heat. Alternatively, the battery pocket 2950 closes using a zipper, a hook and loop system, one or more buttons, one or more snaps, one or more ties, one or more buckles, one or more clips, and/or one or more hooks. A first spring 174*a* of a first lead (not shown) extends out of the battery pocket 2950 through a first battery pocket opening 2954. A first wiring portion 172*a* of the first lead extends out of the pouch 110 through a first lead opening 120*a*. A second spring 174*b* of a second lead extends out of the battery pocket 2950 through a second battery pocket opening 2956. The second spring 174*b* surrounds wiring that is electrically connected to a connector portion 170*b*. The connector 170*b* is electrically connected to a mating connector 2320 that is attached to a battery cable 2322, which connects to the power distribution and data hub 2200.

In a preferred embodiment, the power distribution and data hub 2200 is held in place by at least one strap 2324. The at least one strap 2324 is preferably made of an elastic material. Alternatively, the at least one strap 2324 is made of a non-elastic material. In other embodiments, the at least one strap 2324 includes hook-and-loop tape. In another embodiment, the power distribution and data hub 2200 is held in place by a hub pocket. The hub pocket is formed of polyester, polyvinyl chloride (PVC)-coated polyester, vinyl-coated polyester, nylon, canvas, PVC-coated canvas, polycotton canvas, and/or a mesh fabric. In one embodiment, the hub pocket closes using a piece of elastic. In another embodiment, the hub pocket includes at least one layer of a material for dissipating heat.

The power distribution and data hub 2200 is connected to an end user device 2102 (e.g., tablet, smartphone, computer) via an end user device cable 2326. The end user device cable 2326 extends out of the pouch 110 through an end user device cable opening 2328.

The power distribution and data hub 2200 is connected to a first peripheral device via a first peripheral device cable 2346. The first peripheral device cable 2346 extends out of the pouch 110 through a first peripheral device cable opening 2348. Alternatively, the first peripheral device cable 2346 extends out of the pouch 110 through an opening in the second side 114 of the pouch 110. In the example shown in FIG. 31B, the first peripheral device is a first radio (not shown). The first radio is connected to a first antenna relocator 2962. The first antenna relocator 2962 extends out of the pouch 110 through a first antenna relocator opening 2964 in the second side 114 of the pouch 110. The first antenna relocator 2962 is connected to the first radio via a first antenna relocator cable 2966 that extends out of the pouch 110 through a first antenna relocator cable opening 2968.

The power distribution and data hub 2200 is connected to the second peripheral device 2106 via a second peripheral device cable 2354. In the example shown in FIG. 31B, the second peripheral device 2106 is a GPS device (e.g., GPS puck). The second peripheral device 2106 is held in place by a GPS device pocket 2970. The GPS device pocket 2970 is formed of polyester, polyvinyl chloride (PVC)-coated polyester, vinyl-coated polyester, nylon, canvas, PVC-coated canvas, polycotton canvas, and/or a mesh fabric. In one embodiment, the GPS device pocket 2970 closes using a piece of elastic 2972. Alternatively, the GPS device pocket 2970 closes using a zipper, a hook and loop system, one or more buttons, one or more snaps, one or more ties, one or more buckles, one or more clips, and/or one or more hooks. In another embodiment, the GPS device pocket 2970 includes at least one layer of a material for dissipating heat.

The power distribution and data hub 2200 is connected to the third peripheral device 2108 via a third peripheral device cable 2350. The third peripheral device cable 2350 extends out of the pouch 110 through a third peripheral device cable opening 2352 in the second side gusset 2304. Alternatively, the third peripheral device cable 2350 extends out of the pouch 110 through an opening in the second side 114 of the pouch 110.

The power distribution and data hub 2200 is connected to the fourth peripheral device 2110 via a fourth peripheral device cable 2358. The fourth peripheral device cable 2358 extends out of the pouch 110 through a fourth peripheral device cable opening 2360. Alternatively, the fourth peripheral device cable 2358 extends out of the pouch 110 through an opening in the second side 114 of the pouch 110. In the example shown in FIG. 31B, the fourth peripheral device 2110 is a second radio. The second radio is connected to a second antenna relocator 2974. The second antenna relocator 2974 extends out of the pouch 110 through a second antenna relocator opening 2976 in the second side 114 of the pouch 110. The second antenna relocator 2974 is connected to the second radio via a second antenna relocator cable 2978 that extends out of the pouch 110 through a second antenna relocator cable opening 2980.

Figure 32:
FIG. 32 is an exploded view of an example of a battery and a power distribution and data hub housed in the same enclosure.

FIG. 32 is an exploded view of an example of a battery and a power distribution and data hub housed in the same enclosure 3000. The enclosure 3000 includes a battery element 164 and a power distribution and data hub 3002 that is housed between a cover 3054 and a back plate 3062. The battery element 164 supplies the first lead 152*a* and the second lead 152*b*. The battery element 164 is formed of a plurality of sealed battery cells or individually contained battery cells, i.e. batteries with their own cases, removably disposed therein.

The power distribution and data hub 3002 is connected to the battery element 164 via a cable 3070. The power distribution and data hub 3002 includes at least one connector 3072. The at least one connector 3072 is panel mounted or an omnidirectional flexible lead (e.g., FIG. 18). In one embodiment, the at least one connector 3072 includes a dust cap (not shown) to cover a corresponding lead. Advantageously, the dust cap protects the at least one connector from dust and other environmental contaminants that may cause battery failure in the field.

The cover 3054 includes a battery compartment 3056 that is sized to receive at least one battery element 164. The cover 3054 includes a hub compartment 3064 that is sized to receive the power distribution and data hub 3002. In a preferred embodiment, the battery compartment 3056 is substantially rectangular in shape. In one embodiment, the hub compartment 3064 is substantially rectangular in shape. The battery compartment 3056 is connected to the hub compartment 3064 via a channel 3066 sized to receive the cable 3070. A top hat style rim 3058 is provided around a perimeter of the battery compartment 3056 and the hub compartment 3064. The cover 3054 incudes at least one channel formed in the cover 3054 to accommodate a wire of a corresponding lead. The example in FIG. 32 shows two channels 3060 (e.g., channels 3060*a*, 3060*b*) formed in the cover 3054 (one on each side) to accommodate the wires of the first lead 152*a* and the second lead 152*b* passing therethrough. The cover 3054 includes at least one channel formed in the cover 3054 to accommodate the at least one connector 3072.

The cover 3054 and the back plate 3062 are formed of plastic using, for example, a thermoform process or an injection molding. The back plate 3062 can be mechanically attached to the rim 3058 of the cover 3054 via, for example, an ultrasonic spot welding process or an adhesive. Advantageously, the top hat style rim 3058 provides a footprint for the ultrasonic spot welding process and provides structural integrity for the battery and the power distribution and data hub housed in the same enclosure. In one embodiment, a water barrier material (e.g., silicone) is applied to the mating surfaces of the rim 3058 and the back plate 3062. In another embodiment, the cover 3054, the back plate 3062, the power distribution and data hub 3002, and/or the battery element 164 has a slight curvature or contour for conforming to, for example, the user's vest, backpack, or body armor. In one example, the curvature of the portable battery pack is engineered to match the outward curve of body armor. Advantageously, this means that the portable battery pack does not jostle as the operator moves, which results in less caloric energy expenditure when the operator moves. Alternatively, the cover 3054, the back plate 3062, the power distribution and data hub 3002, and/or the battery element 164 can have a slight outward curvature or contour for conforming to a user's body (e.g., back region, chest region, abdominal region, arm, leg). In yet another embodiment, the cover 3054, the back plate 3062, the power distribution and data hub 3002, and/or the battery element 164 can have a slight outward curvature or contour for conforming to a user's helmet or hat.

Figure 33:
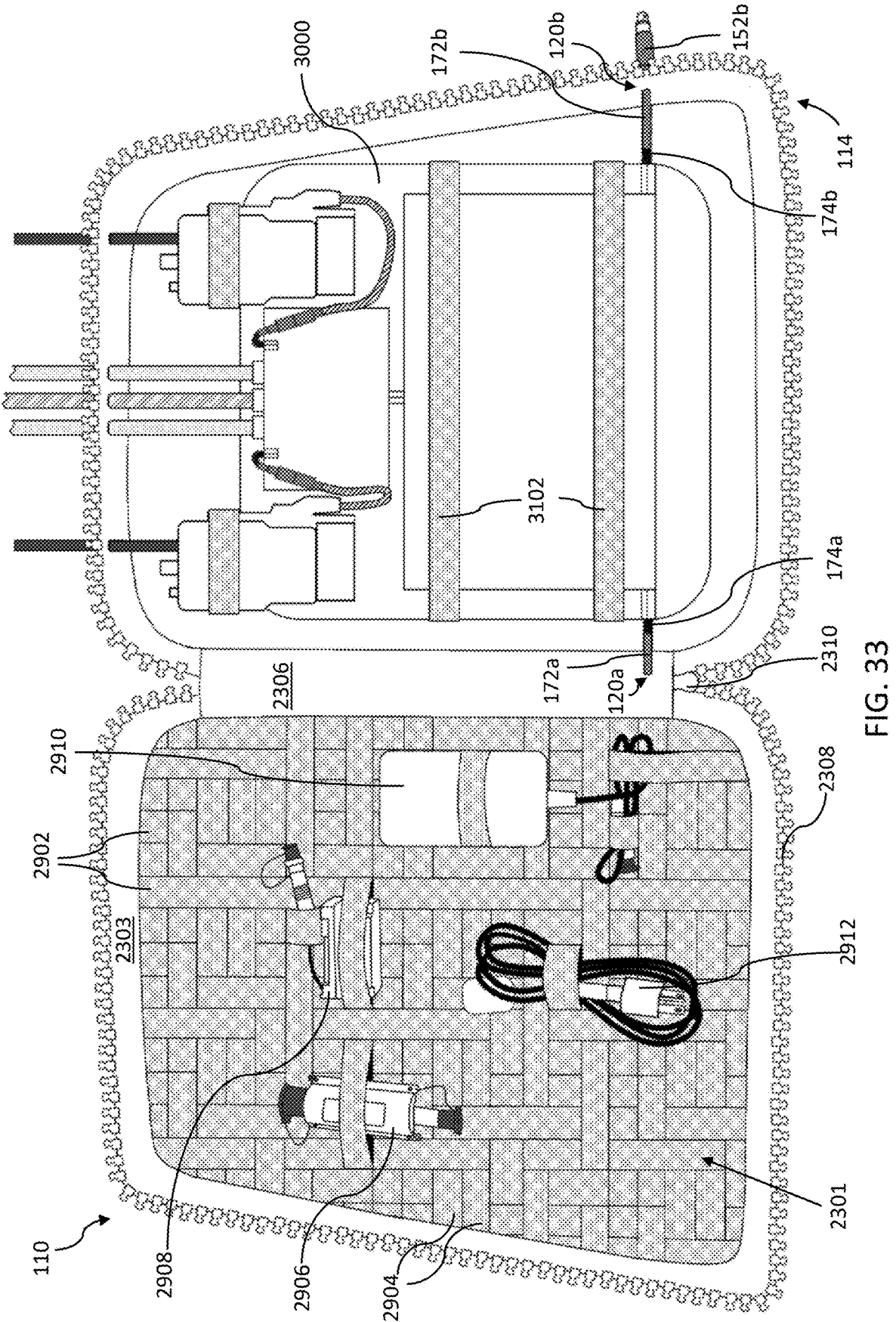
FIG. 33 illustrates an interior perspective view of an example of the portable battery pack that includes a battery and a power distribution and data hub housed in the same enclosure.

FIG. 33 illustrates an interior perspective view of an example of the portable battery pack that includes a battery and a power distribution and data hub housed in the same enclosure 3000. The first side 112 of the pouch 110 has an interior of the first side 2301. The second side 114 of the pouch 110 has an interior of the second side 2302. The first side 112 has a first side gusset 2303 and the second side 114 has a second side gusset 2304. The first side gusset 2303 and the second side gusset 2304 are attached at a top position of a fabric stop 2306 and a bottom position of the fabric stop 2306. A zipper 2308 with a zipper pull 2310 is attached to the first side gusset 2303 and the second side gusset 2304. Advantageously, this configuration allows the pouch 110 to lie flat when opened.

In the example shown in FIG. 33, the interior of the first side 2301 has an object retention system. The object retention system is shown holding a state of charge indicator 2906.

An example of a state of charge indicator 2906 is disclosed in U.S. Publication Nos. 20170269162 and 20150198670, each of which is incorporated herein by reference in its entirety. The object retention system is also shown holding a universal DC power adaptor 2908. An example of a universal DC power adaptor 2908 is disclosed in U.S. Pat. No. 9,240,651, which is incorporated herein by reference in its entirety. The object retention system is shown holding a first half of an AC adapter 2910 and a second half of an AC adapter 2912.

The interior of the second side 2302 holds a battery and a power distribution and data hub housed in the same enclosure 3000. In a preferred embodiment, the battery and the power distribution and data hub housed in the same enclosure 3000 is held in place by at least one strap 3102. The at least one strap 3102 is preferably made of an elastic material. Alternatively, the at least one strap 3102 is made of a non-elastic material. In other embodiments, the at least one strap 3102 includes hook-and-loop tape.

A first wiring portion 172*a* of a first lead (not shown) extends out of the pouch 110 through a first lead opening 120*a*. A second wiring portion 172*b* of a second lead 152*b* extends out of the pouch 110 through a second lead opening 120*b*. A first spring 174*a* is provided around the first wiring portion 172*a*, such that a portion of the first spring 174*a* is inside the battery cover and a portion of the first spring 174*a* is outside the battery cover. The presence of the first spring 174*a* around the first wiring portion 172*a* of the first lead (not shown) allows the first lead to be flexed in any direction for convenient connection to equipment from any angle. The presence of the first spring 174*a* around the first wiring portion 172*a* of the first lead also allows the first lead to be flexed repeatedly without breaking or failing. A second spring 174*b* is provided around the second wiring portion 172*b*, such that a portion of the second spring 174*b* is inside the battery cover and a portion of the second spring 174*b* is outside the battery cover. The presence of the second spring 174*b* around the second wiring portion 172*b* of the second lead 152*b* allows the second lead 152*b* to be flexed in any direction for convenient connection to equipment from any angle. The presence of the second spring 174*b* around the second wiring portion 172*b* of the second lead 152*b* also allows the second lead 152*b* to be flexed repeatedly without breaking or failing. In one example, the first spring 174*a* and/or the second spring 174*b* is a steel spring that is from about 0.25 inches to about 1.5 inches long.

Figure 34:
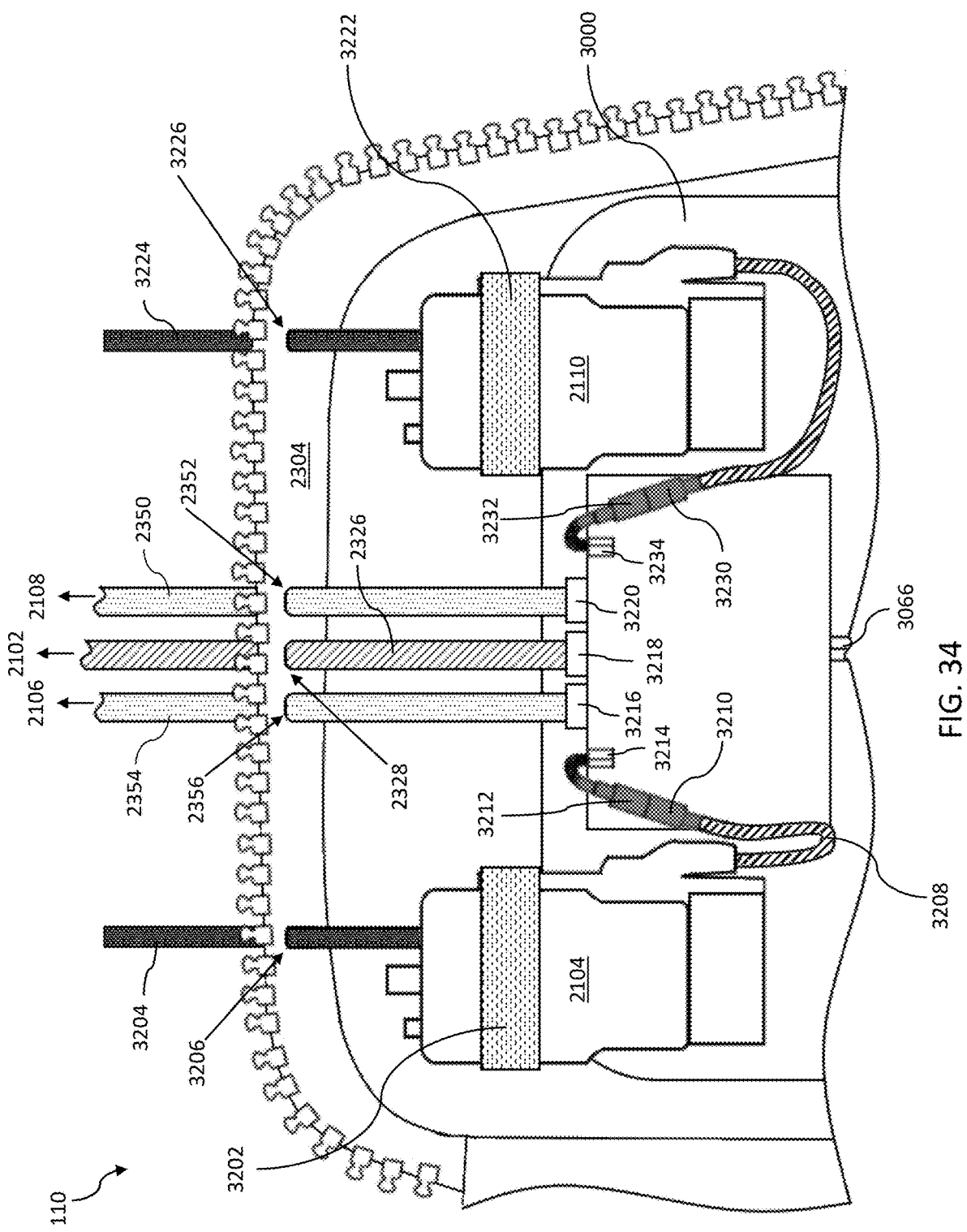
FIG. 34 is a detail view of the interior perspective view of the example of the portable battery pack shown in FIG. 33.

FIG. 34 is a detail view of the interior perspective view of the example of the portable battery pack shown in FIG. 33. As previously mentioned, the cover of the battery and the power distribution and data hub housed in the same enclosure 3000 includes a channel 3066 sized to receive a cable to connect the battery element and the power distribution and data hub. The power distribution and data hub of the battery and the power distribution and data hub housed in the same enclosure 3000 is connected to an end user device 2102 (e.g., tablet, smartphone, computer) via an end user device cable 2326 connected to a second panel mount connector 3218. The end user device cable 2326 extends out of the pouch 110 through an end user device cable opening 2328.

The power distribution and data hub of the battery and the power distribution and data hub housed in the same enclosure 3000 is operable to provide power to a first peripheral device 2104, a second peripheral device 2106, a third peripheral device 2108, and a fourth peripheral device 2110 through a personal area network (PAN). In the example shown in FIG. 34, the first peripheral device 2104 is a first radio. The first peripheral device 2104 is held in place by at least one strap 3202. The at least one strap 3202 is preferably made of an elastic material. Alternatively, the at least one strap 3202 is made of a non-elastic material. In other embodiments, the at least one strap 3202 includes hook-and-loop tape. In one embodiment, the first peripheral device 2104 has an antenna 3204 that extends out of the pouch 110 through a first antenna opening 3206 in the second side gusset 2304. The power distribution and data hub is connected to the first peripheral device 2104 via a first peripheral device cable 3208 with a connector 3210 that mates to a first flexible omnidirectional lead 3212 of the power distribution and data hub. The first flexible omnidirectional lead 3212 of the power distribution and data hub extends out of the cover of the battery and the power distribution and data hub housed in the same enclosure 3000 via a first channel 3214 in the cover.

A first spring 3215 is provided around the wiring portion of the first flexible omnidirectional lead 3212, such that a portion of the first spring 3215 is inside the cover of the battery and the power distribution and data hub housed in the same enclosure 3000 and a portion of the first spring 3215 is outside the cover of the battery and the power distribution and data hub housed in the same enclosure 3000. In one example, the first spring 3215 is a steel spring that is from about 0.25 inches to about 1.5 inches long. In another example, the first spring 3215 is a steel spring that is from about 0.25 inches to about 8 inches long. The wiring portion of the first flexible omnidirectional lead 3212 and the first spring 3215 are held securely in the first channel 3214 via a clamping mechanism. Alternatively, the wiring portion of the lead and the spring are held securely in the first channel using an adhesive, a retention pin, a hex nut, a hook anchor, and/or a zip tie. The presence of the first spring 3215 around the wiring portion of the first flexible omnidirectional lead 3212 allows the first flexible omnidirectional lead 3212 to be flexed in any direction for convenient connection to equipment from any angle. The presence of the first spring 3215 around the wiring portion of the first flexible omnidirectional lead 3212 also allows the first flexible omnidirectional lead 3212 to be flexed repeatedly without breaking or failing.

The power distribution and data hub is connected to the second peripheral device 2106 via a second peripheral device cable 2354 connected to a first panel mount connector 3216. The second peripheral device cable 2354 extends out of the pouch 110 through a second peripheral device cable opening 2356 in the second side gusset 2304. Alternatively, the second peripheral device cable 2354 extends out of the pouch 110 through an opening in the second side 114 of the pouch 110. The power distribution and data hub is connected to the third peripheral device 2108 via a third peripheral device cable 2350 connected to a third panel mount connector 3220. The third peripheral device cable 2350 extends out of the pouch 110 through a third peripheral device cable opening 2352 in the second side gusset 2304. Alternatively, the third peripheral device cable 2350 extends out of the pouch 110 through an opening in the second side 114 of the pouch 110.

In the example shown in FIG. 34, the fourth peripheral device 2110 is a second radio. The first peripheral device 2104 is held in place by at least one strap 3222. The at least one strap 3222 is preferably made of an elastic material. Alternatively, the at least one strap 3222 is made of a non-elastic material. In other embodiments, the at least one strap 3222 includes hook-and-loop tape. In one embodiment, the fourth peripheral device 2110 has an antenna 3224 that extends out of the pouch 110 through a second antenna opening 3226 in the second side gusset 2304. The power distribution and data hub is connected to the fourth peripheral device 2110 via a fourth peripheral device cable 3228 with a connector 3230 that mates to a second flexible omnidirectional lead 3232 of the power distribution and data hub. The second flexible omnidirectional lead 3232 of the power distribution and data hub extends out of the cover of the battery and the power distribution and data hub housed in the same enclosure 3000 via a second channel 3234 in the cover.

A second spring 3235 is provided around the wiring portion of the second flexible omnidirectional lead 3232, such that a portion of the second spring 3235 is inside the cover of the battery and the power distribution and data hub housed in the same enclosure 3000 and a portion of the second spring 3235 is outside the cover of the battery and the power distribution and data hub housed in the same enclosure 3000. In one example, the second spring 3235 is a steel spring that is from about 0.25 inches to about 1.5 inches long. In another example, the second spring 3235 is a steel spring that is from about 0.25 inches to about 8 inches long. The wiring portion of the second flexible omnidirectional lead 3232 and the second spring 3235 are held securely in the second channel 3234 via a clamping mechanism. Alternatively, the wiring portion of the lead and the spring are held securely in the first channel using an adhesive, a retention pin, a hex nut, a hook anchor, and/or a zip tie. The presence of the second spring 3235 around the wiring portion of the second flexible omnidirectional lead 3232 allows the second flexible omnidirectional lead 3232 to be flexed in any direction for convenient connection to equipment from any angle. The presence of the second spring 3235 around the wiring portion of the second flexible omnidirectional lead 3232 also allows the second flexible omnidirectional lead 3232 to be flexed repeatedly without breaking or failing.

As previously described, the power distribution and data hub includes at least one flexible omnidirectional lead in one embodiment. The flexible omnidirectional lead of the power distribution and data hub is preferably formed using a spring that is about 0.25 inches to about 8 inches long. In one embodiment, the spring of the power distribution and data hub extends out of the pouch through an opening in the second side gusset. In one embodiment, the opening includes a grommet. In another embodiment, the pouch has a seal around an opening for a corresponding lead of the power distribution and data hub. The seal is tight around the lead, which prevents water from entering the pouch through the opening. In one embodiment, the seal is formed of a rubber (e.g., neoprene).

In one embodiment, the power distribution and data hub includes at least one processor and at least one memory.

Advantageously, this allows the power distribution and data hub to run software. In one embodiment, the end user device is a screen (e.g., touch screen). An additional advantage of running software off of the power distribution and data hub is that if the screen breaks, a user can leave the screen behind without a risk of confidential information being exposed. In another embodiment, the power distribution and data hub includes at least one data port. Advantageously, this allows the power distribution and data hub to receive information from another computing device (e.g., laptop, desktop computer).

In another embodiment, the power distribution and data hub includes at least one layer of a material to dissipate heat. In one embodiment, the at least one layer of a material to dissipate heat is housed within the power distribution and data hub. In one embodiment, at least one layer of a material to dissipate heat is housed within the power distribution and data hub on an external facing side. Advantageously, this protects the power distribution and data hub from external heat sources (e.g., a hot vehicle). In another embodiment, at least one layer of a material to dissipate heat is housed within the power distribution and data hub on a side of the power distribution and data hub facing the wearer. Advantageously, this protects the wearer from heat given off by the power distribution and data hub.

In yet another embodiment, the at least one layer of a material to dissipate heat is between the cover and the power distribution and data hub of the battery and the power distribution and data hub housed in the same enclosure. Advantageously, this protects the power distribution and data hub from external heat sources (e.g., a hot vehicle). In another embodiment, the at least one layer of a material to dissipate heat is between the back plate and the power distribution and data hub of the battery and the power distribution and data hub housed in the same enclosure. Advantageously, this protects the wearer from heat given off by the power distribution and data hub.

In one embodiment, the battery management system of the battery of the portable battery pack is housed in the power distribution and data hub. Advantageously, this separates heat generated by the battery management system from the plurality of electrochemical cells. In this embodiment, the power distribution and data hub preferably includes at least one layer of a material to dissipate heat. This embodiment may also provide additional benefits for distributing weight within the pouch.

In another embodiment, the power distribution and data hub includes a material to provide resistance to bullets, knives, shrapnel, and/or other projectiles. In one embodiment, the material to provide resistant to bullets, knives, shrapnel, and/or other projectiles is incorporated into a housing of the power distribution and data hub. In an alternative embodiment, the material to provide resistance to bullets, knives, shrapnel, and/or other projectiles is housed within the power distribution and data hub on an external facing side. Advantageously, this layer protects the electronics housed in the power distribution and data hub as well as the user. Additionally, or alternatively, the material to provide resistance to bullets, knives, shrapnel, and/or other projectiles is housed within the power distribution and data hub on a side of the power distribution and data hub facing the wearer. Advantageously, this layer provides additional protection to the user. In another embodiment, the material to provide resistance to bullets, knives, shrapnel, and/or other projectiles is incorporated into the cover and/or back plate of the battery and the power distribution and data hub housed in the same enclosure.

Figure 35:
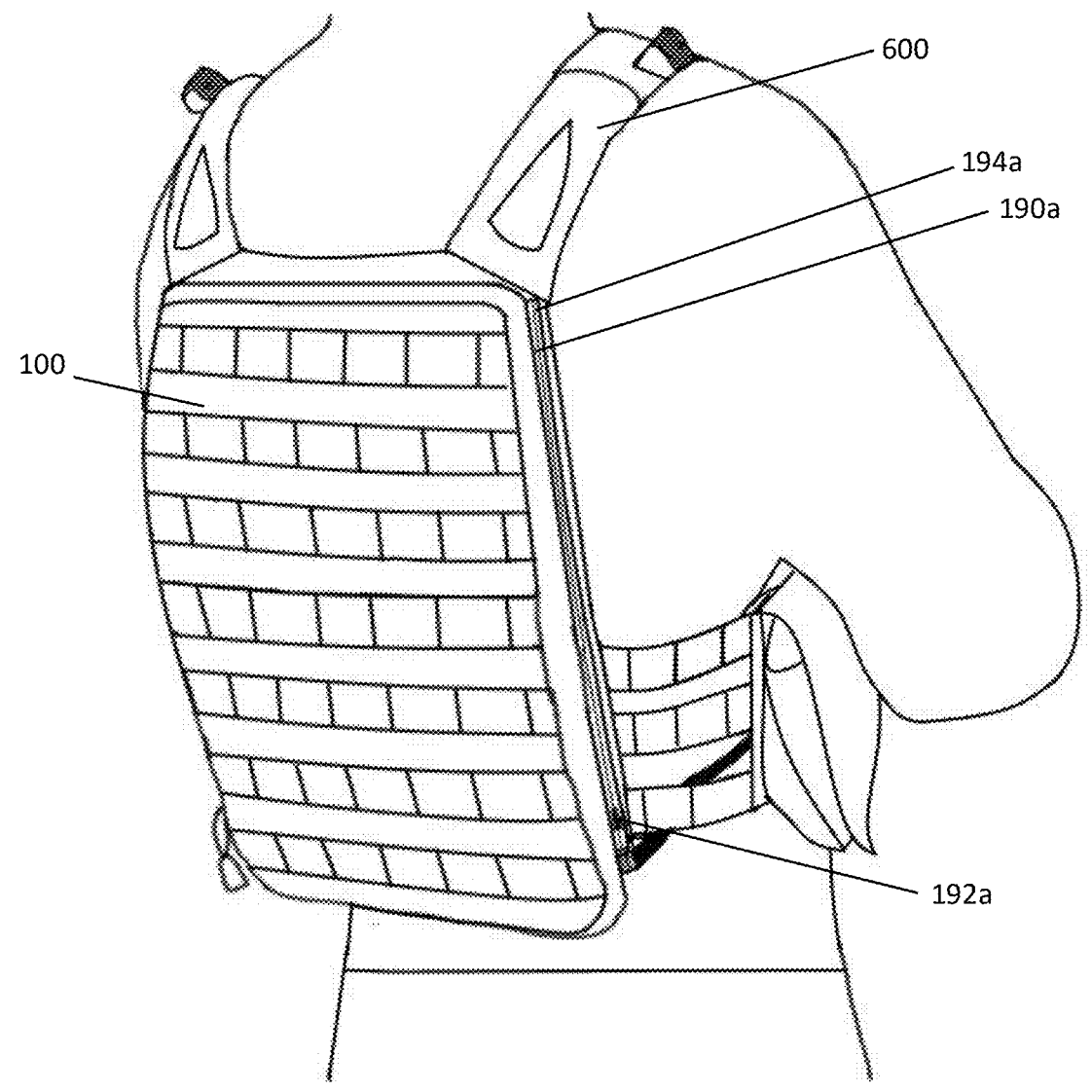
FIG. 35 illustrates a side perspective view of another example of a portable battery pack affixed to a vest using zippers.

FIG. 35 illustrates a side perspective view of another example of a portable battery pack 100 affixed to a vest 600 using zippers. In the example shown in FIG. 35, the pouch of the portable battery pack 100 is sized to hold the battery and additional devices or components. A first single width of zipper tape 190a is shown mated with a corresponding first single width of zipper tape 194a on a right side of the vest 600 using a first zipper slider 192a, thereby attaching the portable battery pack 100 to the vest 600. Similarly, a second single width of zipper tape (not shown) is mated with a corresponding second single width of zipper tape (not shown) on a left side of the vest 600 using a second zipper slider (not shown).

In summary and referring now to FIG. 3 through FIG. 35, the present invention provides a system for supplying power to at least one power distribution and data hub using a portable battery pack including one or more batteries enclosed in a wearable pouch, wherein the one or more batteries include at least one battery element, a battery cover, a battery back plate, and one or more flexible omnidirectional leads that include a connector portion and a wiring portion, wherein a flexible spring is provided around the wiring portion such that a portion of the flexible spring is positioned inside the battery cover and a portion of the flexible spring is positioned outside the battery cover.

In other embodiments, the present invention provides a portable battery pack including a wearable pouch and one or more batteries enclosed in the wearable pouch, wherein the pouch has a first side and an opposite second side, a closable opening through which the one or more batteries can be fitted into the pouch, one or more openings through which one or more leads from the one or more batteries can be accessed, and wherein the pouch includes a pouch attachment ladder system (PALS) adapted to attach the pouch to a load-bearing platform.

In some embodiments, the pouch is formed of a flexible, durable, and waterproof and/or water-resistant material. In particular embodiments, the material forming the pouch is selected from the group consisting of polyester, polyvinyl chloride (PVC)-coated polyester, vinyl-coated polyester, nylon, canvas, PVC-coated canvas, and polycotton canvas.

In yet more particular embodiments, the pouch has an exterior finish with a camouflage pattern. In representative embodiments, the camouflage pattern is selected from the group consisting of Universal Camouflage Pattern (UCP), MultiCam®, Universal Camouflage Pattern-Delta (UCP-Delta), Airman Battle Uniform (ABU), Navy Working Uniform (NWU), MARPAT, Disruptive Overwhite Snow Digital Camouflage, Urban Digital Camouflage, and Tactical Assault Camouflage (TACAM).

In some embodiments, the closable opening can be closed by a mechanism selected from the group consisting of a zipper, a hook and loop system, one or more buttons, one or more snaps, one or more ties, one or more buckles, one or more clips, and one or more hooks.

In particular embodiments, the load-bearing platform is selected from the group consisting of a vest (e.g., bulletproof vest, Rhodesian vest), a backpack, body armor, a belt (e.g., tactical belt), a chair, a seat, a boat, a kayak, a canoe, a body of a user (e.g., back region, chest region, abdominal region, arm, leg), a vehicle (e.g., truck, high mobility multipurpose wheeled vehicle (Humvee), all-terrain vehicle (ATV), sport utility vehicle (SUV)), a cargo rack, a helmet, or a hat. In certain embodiments, the portable battery pack is Modular Lightweight Load-carrying Equipment (MOLLE)-compatible. In yet more certain embodiments, the pouch attachment ladder system is formed of a plurality of straps, a plurality of horizontal rows of webbing, a plurality of slits, and combinations thereof.

In some embodiments, the one or more batteries include a battery element, a battery cover, and a battery back plate. In particular embodiments, one or more of the battery element, battery cover, and battery back plate have a curvature or contour adapted to conform to a curvature or contour of the load-bearing platform.

In further embodiments, the one or more batteries includes one or more flexible omnidirectional leads, wherein each lead includes a connector portion and a wiring portion, and wherein at least a portion of the wiring portion is encompassed by a flexible spring.

In certain embodiments, the battery has a length having a range from about 12 inches to about 8 inches, a width having a range from about 10 inches to about 7 inches, and a thickness having a range from about 2 inches to about 0.5 inches.

Camera

The personal tactical system according to the present invention includes at least one body-worn means for recording audio, video, and/or still images (e.g., body cameras 20, 21, 22, 23, FIGS. 1 and 2). The at least one body-worn means for recording audio, video, and/or still images preferably includes at least one camera (e.g., video camera). In another embodiment, the at least one body-worn means for recording audio, video, and/or still images includes at least one audio recording device. In one embodiment, the at least one audio recording device includes level dependent function for ambient listening. In yet another embodiment, the at least one audio recording device is operable to filter ambient noise from desired sounds (i.e., noise canceling). The at least one camera is incorporated into the load-bearing garment 15 or removably attachable to the load-bearing garment (not shown). One or more of the at least one camera is preferably in electrical connection with the one or more batteries of the portable battery pack.

Figure 36:
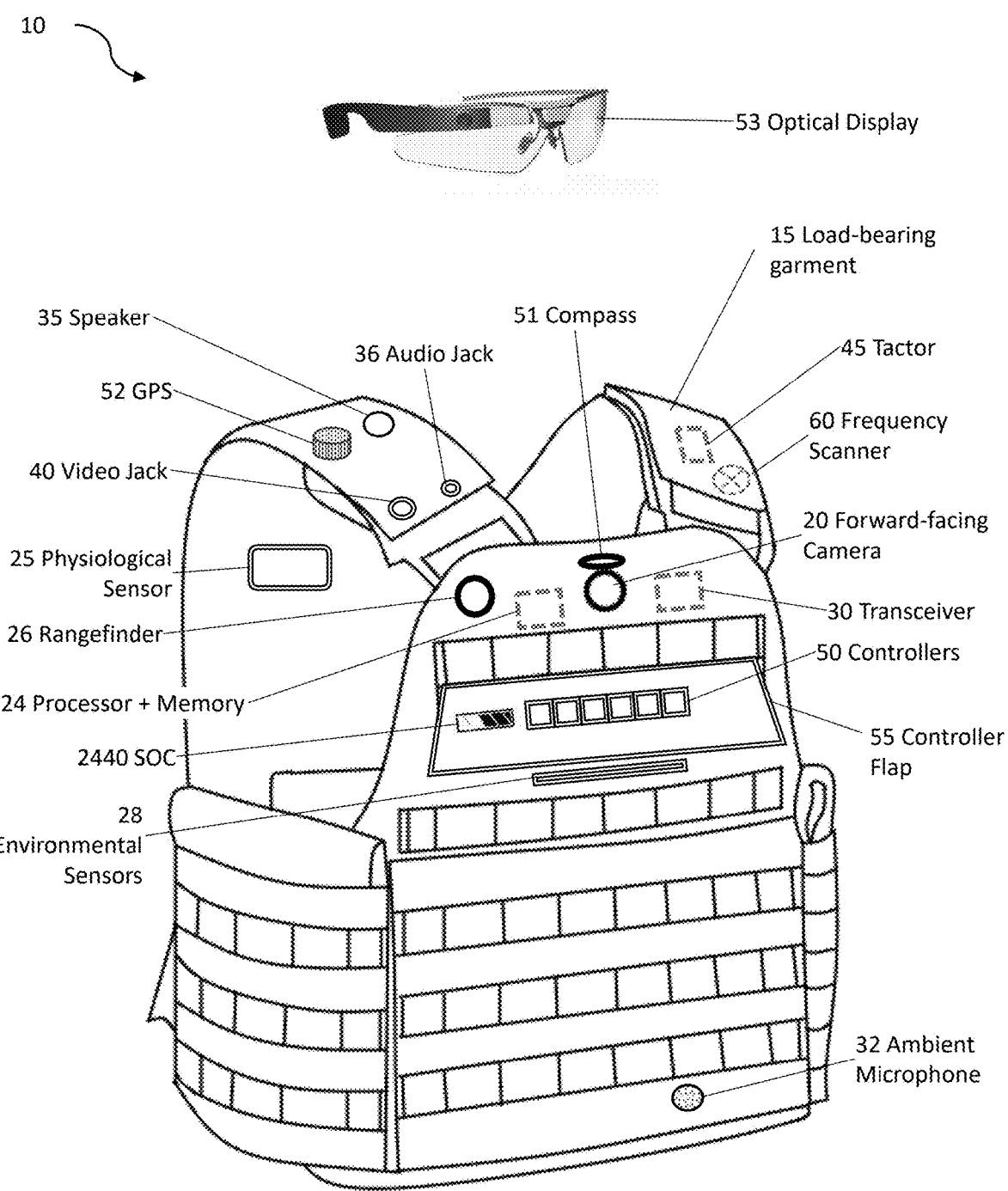
FIG. 36 illustrates a front perspective view of another example of the tactical system according to the present invention.
Figure 37:
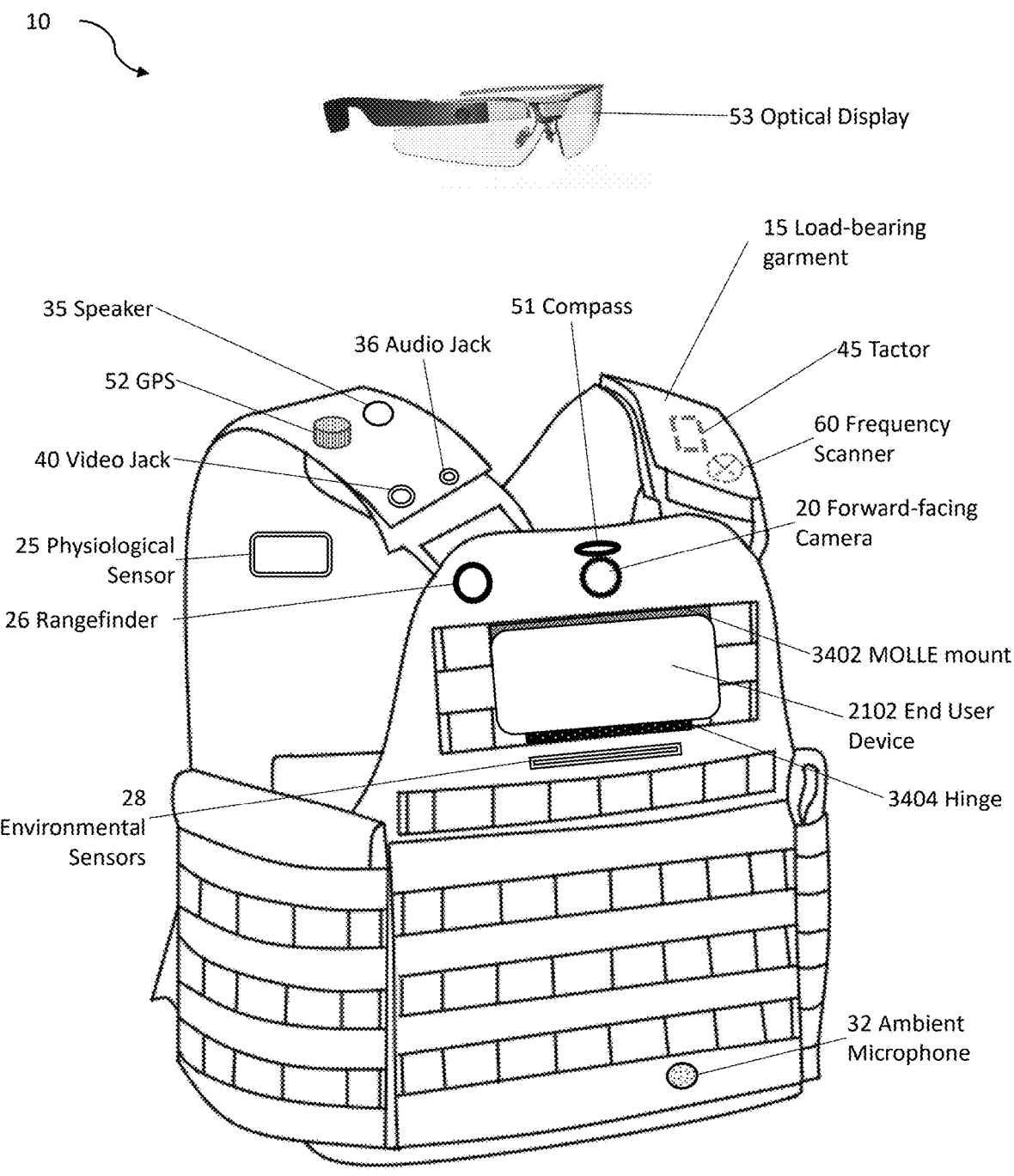
FIG. 37 illustrates a front perspective view of yet another example of the tactical system according to the present invention.

FIGS. 36-37 illustrate a front perspective view of other examples of the tactical system according to the present invention. Additionally, or alternatively, the at least one camera is attached or incorporated into eyeglasses (FIG. 36) and/or a helmet (not shown) that is connected to the personal tactical system. In one embodiment, the eyeglasses and/or the helmet are connected to the personal tactical system via at least one video jack 40 and/or at least one audio jack 36. In another embodiment, the eyeglasses or the helmet are powered by at least one internal battery in the eyeglasses and/or the helmet. The at least one internal battery in the eyeglasses and/or the helmet is preferably operable to be recharged using the one or more batteries of the portable battery pack. In one embodiment, the eyeglasses and/or the helmet are operable to wirelessly transmit data (e.g., BLUETOOTH) to at least one processor of the tactical vest and/or an end user device (e.g., smartphone, tablet).

The at least one camera preferably includes a forward-facing camera 20, as shown in FIG. 1. Another embodiment includes at least one additional camera. The at least one additional camera is a side-facing camera 21, an upward-facing camera 22, and/or a rear-facing camera 23 as shown in FIG. 2. Advantageously, multiple cameras are useful for detecting approaching drones and similar stealth devices, as well as approaching ground threats. In one embodiment, one or more of the at least one camera is on a retractable tether. Advantageously, this allows an operator to obtain situational awareness by looking around corners or in spaces where the operator wants to stay concealed.

In a preferred embodiment, the at least one camera is a 1080p HD video camera. Alternatively, the at least one camera is a 720p HD video camera. In another preferred embodiment, the at least one camera has a 10°-90° field-of-view. In yet another embodiment, the at least one camera includes an infrared sensor, operable to detect objects emitting or reflecting infrared radiation, especially near-infrared radiation (0.7 to 1.0 μm). The at least one camera preferably includes an integrated vector magnetometer (i.e., a compass) 51, such as a microelectromechanical systems (MEMS) magnetic field sensor, to determine a direction-of-view of the camera. Alternatively, the compass is separate from the camera, but integrated electronically with at least one processor of the tactical vest and/or an end user device (e.g., smartphone, tablet) to provide an azimuth of the tactical system at the time an image is captured. The tactical system is operable to determine a direction of objects in the image using the azimuth for the image.

In one embodiment, the end user device is operable to use the azimuth provided from the at least one camera and/or the compass to determine the azimuth of any object moving towards the camera. In another embodiment, the compass is operable to provide data to a processor, which allows an operator to continuously have a latitude and a longitude of their current location. The latitude and the longitude are preferably provided within a 5-meter accuracy using resection. In conjunction with the rangefinder, this allows the operator to determine a position without relying on GPS in situations where satellites are permanently or temporarily disabled for GPS readings.

The tactical system is preferably operable to identify a person through facial recognition software. The facial recognition software is stored in the tactical vest (e.g., using at least one processor with memory), an end user device (e.g., smartphone, tablet), and/or at least one remote server. The at least one remote server is preferably operable to relay a positive identification of the person to the wearer (e.g., tactical vest, end user device) in real time or near-real time. Advantageously, this allows for positive identification of threats (e.g., military high value targets, criminals with outstanding warrants) while maintaining operator safety. In one embodiment, the facial recognition software is operable to detect pupil dilation of individuals (e.g., suspects, witnesses) to detect lying and/or drug usage (e.g., anticholinergic drugs). Advantageously, this embodiment provides additional situational awareness to the operator.

The tactical system is also preferably operable to identify objects using object recognition software. The object recognition software is stored in the tactical vest (e.g., using at least one processor with memory), an end user device (e.g., smartphone, tablet), and/or at least one remote server. The at least one remote server is preferably operable to relay a positive identification of an object to the wearer (e.g., tactical vest, end user device) in real time or near-real time. Advantageously, this allows for positive identification of objects (e.g., weapons, drug paraphernalia, motionless body) while maintaining operator safety.

In another preferred embodiment, the at least one camera includes a plurality of cameras that are positioned in order to provide data needed to stitch together a 360° view of surroundings proximal to the tactical vest and/or a 3-D image of the surroundings in real time or near-real time. In one embodiment, images from the at least one camera are transmitted to at least one remote server for processing and/or storage. In one example, the tactical system includes four cameras that each have a 90° field-of-view positioned to provide a 360° view of surrounding proximal to the tactical vest. The at least one remote server processes the images to create a 3-D image of the surroundings and transmits the 3-D image to at least one command and control center, the tactical vest, and/or an end user device (e.g., smartphone, tablet) in near-real time. The tactical system is preferably operable to obtain data from external sources (e.g., traffic cameras, building cameras) to stitch together the 360° view of surroundings proximal to the tactical vest and/or the 3-D image of the surroundings. In another preferred embodiment, the tactical system is operable to obtain data from unmanned aerial systems (e.g., drones), unmanned ground vehicles (e.g., Dragon Runner®), and K9-mounted devices (e.g., camera, radiation sensor, chemical sensor) in real time or near-real time.

Controls

The tactical system includes at least one controller 50 to control the at least one camera and/or other devices (FIG. 36). In one embodiment, the at least one controller is embedded in the load-bearing garment. In a preferred embodiment, the at least one controller is embedded in a controller flap 55 that can be flipped out so that it is readily visible by the wearer. The controller flap 55 is preferably operable to secure to the load bearing garment 15 when not in use. In a preferred embodiment, the at least one controller is in electrical connection with and powered by the one or more batteries of the portable battery pack.

In another preferred embodiment, the at least one controller is an end user device (e.g., smartphone, tablet) as shown in FIG. 37. In a preferred embodiment, the end user device is removably attachable to the load-bearing garment. In one embodiment, the end user device is removably attachable to the load-bearing garment via a MOLLE mount 3402 (e.g., Galaxy S7® Kit by Kägwerks™, Galaxy S5® Kit by Kägwerks™, Galaxy Note® 2 Kit by Kägwerks™). The MOLLE mount 3402 preferably includes a hinge 3404 that is operable to flip the end user device out such that the screen is visible when in use and allows the screen of the end user device to rest against the load-bearing garment 15 when not in use. The end user device includes at least one processor with memory, at least one transceiver, and/or software operable to control devices on the load-bearing garment. In a preferred embodiment, the end user device is in electrical connection with and powered by the one or more batteries of the portable battery pack.

Other Devices

As shown in the example in FIG. 36, the present invention further includes at least one processor with memory 24, at least one physiological sensor 25, a rangefinder 26, at least one environmental sensor 28, at least one communication device 30, at least one microphone 32 (also shown in FIG. 2) for detecting audible sound (e.g., 20 Hz-20,000 Hz) and/or inaudible sound (e.g., ultrasound), at least one audio loudspeaker device 35, at least one audio jack 36, at least one video (e.g., audiovisual) jack 40, at least one tactor (tactile sensor) 45, at least one controller 50, a global positioning system (GPS) component 52, at least one frequency scanner 60 (e.g., to detect signals in the 2.4 GHz ISM band and/or 5 GHz ISM band), and at least one State-of-Charge (SOC) indicator 2440. The devices are preferably in electrical connection with and powered by the one or more batteries of the portable battery pack. In one embodiment, the devices are in electrical connection with the one or more batteries of the portable battery pack via a power distribution and data hub. The electrical connection is any type or style of connector needed to mate to the equipment to be used with the one or more batteries of the portable battery pack and/or the power distribution and data hub. In a preferred embodiment, the connector portion is a male circular type of connector (e.g., Tajimi™ part number R04-P5m). In an alternative embodiment, at least one connector portion is a universal serial bus (USB), micro USB, lightning, and/or Firewire connector. The devices are preferably in wired and/or wireless communication with the at least one processor with memory 24, for example, using Bluetooth protocols.

The tactical system provides at least one processor with memory 24 as shown in FIG. 36. The at least one processor with memory 24 preferably stores and runs image recognition software operable to identify objects in images captured by the at least one camera. The software is also operable to determine a general direction of objects using the compass 51 of the tactical system and/or known landmark objects in the image. The software is further operable to tell the user to shift position in order to center an object in the field of view of at least one of the cameras. For example, if an object is on a right edge of the field-of-view of a camera with a 90-degree field-of-view, the system instructs the user to rotate clockwise 45 degrees. In one embodiment, the at least one processor with memory and/or the software is in an end user device 2102 (FIG. 37).

The at least one microphone 32 is preferably an ambient microphone, positioned away from the speaker's mouth. The at least one microphone is preferably operable to detect sound frequencies for objects likely to be approaching, such as drones, planes, helicopters, and the like. In one embodiment, the at least one microphone detects sounds between about 0-96 kHz. In one embodiment, the at least one microphone includes level dependent function for ambient listening. In yet another embodiment, the at least one microphone is operable to filter ambient noise from desired sounds (i.e., noise canceling). In a preferred embodiment, the at least one microphone is at least two microphones. In one example, a first microphone is positioned on a front side of the load-bearing garment and a second microphone is positioned on a rear side of the load-bearing garment.

The present invention further provides for an optical head-mounted display 53, such as smart eyeglasses, in wired or wireless electronic communication with the at least one processor. An example of an optical head-mounted display is GOOGLE GLASS. Another example is described in U.S. Publication No. 20170045337 for smart wearable mine detector by inventor Chiwook Kim, which is incorporated herein by reference in its entirety. The smart eyeglasses are operable to display a direction and/or known characteristics of an object. In a preferred embodiment, the eyeglasses include a MEMS magnetometer to determine a direction of view. In another preferred embodiment, the tactical system is operable to direct a user how to turn to view an object. In one embodiment, the tactical system is operable to outline the approximate location of the object in the eyeglass lenses when the object is within the field of view. In another embodiment, the eyeglasses are operable to estimate pupil size of the operator.

The forward-facing camera 20 works in conjunction with a rangefinder 26 to determine a range of a detected object. In one embodiment, the rangefinder 26 is a laser rangefinder. In another embodiment, the forward-facing camera and rangefinder operate via coincidence or parallax rangefinding to determine the distance of an object, as described in U.S. Pat. No. 8,482,658, issued Jul. 9, 2013, which is incorporated herein by reference in its entirety. In one embodiment, the rangefinder has a fixed distance and orientation with respect to the forward-facing camera 20 via a rigid support, such as a steel or plastic plate (not shown). In one embodiment, the range of the detected object is determined by the user pointing the rangefinder such that the object is in the center of view shown in the head-mounted display 53. In a preferred embodiment, the rangefinder is operable to transmit data to the end user device via wireless or wireless methods. The data is preferably operable to be incorporated into software or a mobile application running on the end user device. Examples of software or a mobile application running on the end user device include, but are not limited to, Digitally Aided Close Air Support (DACAS), Android Tactical Assault Kit (ATAK), Safe Strike, and other situational awareness software or applications for military, law enforcement, and first responders.

The at least one processor and software are operable to generate alerts when an object meets certain criteria, such as displaying hostile or anomalous behavior and/or fitting a predetermined profile, such as operating sound frequencies, silhouette, infrared (IR) signature, WI-FI signature, and the like. The alerts preferably include an identity of the object, a direction of the object, a relative location of the object, an absolute location of the object, a relative motion of the object, an absolute motion of the object, a type of motion of the object (e.g., ballistic or stochastic motion), and the like.

Herein, the direction of the object means the general orientation of the object relative to the user, such as North East or 45 degrees; the relative location of the object means distance and direction of the object relative to the user; the absolute location of the object means the location of the object with respect to the Earth, such as latitude/longitude, as determined by GPS; the relative motion of the object means the velocity and direction of motion of the object relative to the user; the absolute motion of the object means the velocity and direction of motion of the object with respect to the Earth as determined by GPS. In one embodiment, the GPS component, the at least one camera, the rangefinder, and the at least one processor are operable to determine the absolute location of the object.

The tactical system includes at least one sound generator (e.g., speaker) 35, tactors 45 (tactile sensors), and/or a video jack 40 incorporated into the load-bearing garment to provide for auditory, tactile, and/or visual alerts. Additionally, or alternatively, the tactical system includes a pluggable outlet for the auditory alerts 36. In an alternative embodiment, the auditory, tactile, and/or visual alerts are provided by an end user device (e.g., smartphone or tablet, FIG. 37). In one embodiment, the tactical system includes at least one vibration device in the device to provide non-audible alerts. In one example, the tactical system includes four vibration devices on a front side, a left side, a right side, and a back side. Advantageously, this allows for non-audible direction alerts (e.g., move left, move right).

The tactical system further includes at least one physiological sensor 25 and/or at least one environmental sensor 28. The at least one physiological sensor 25 includes a heart rate sensor, a blood pressure sensor, a skin temperature sensor, a galvanic skin response sensor, a sweat sensor, an analyte sensor, a respiration sensor (e.g., Piezo-Electric Respiratory Effort Belt, Respiratory Inductance Plesthysmography band), a pulse oximeter, and the like. The at least one environmental sensor 28 includes a radiation sensor, a chemical sensor (e.g., airborne chemicals), a pressure sensor, a temperature sensor, a humidity sensor, an odor sensor (e.g., blood, urine, feces, body odor), and the like. In one embodiment, the odor sensor utilizes body odor as a biometric identifier to identify at least one person.

In another embodiment, the tactical system further includes a firearm status sensor. In one embodiment, the firearm status sensor includes 3-axis telemetry and/or a holster sensor. In another embodiment, the firearm status sensor is operable to identify an individual who discharged a firearm. Examples of firearm status sensors are disclosed in U.S. Pat. Nos. 9,400,150, 9,404,698, and 9,395,132 and U.S. Publication Nos. 20160169603, 20160173832, 20170074617, and 20170160041, each of which is incorporated herein by reference in its entirety.

Figure 38:
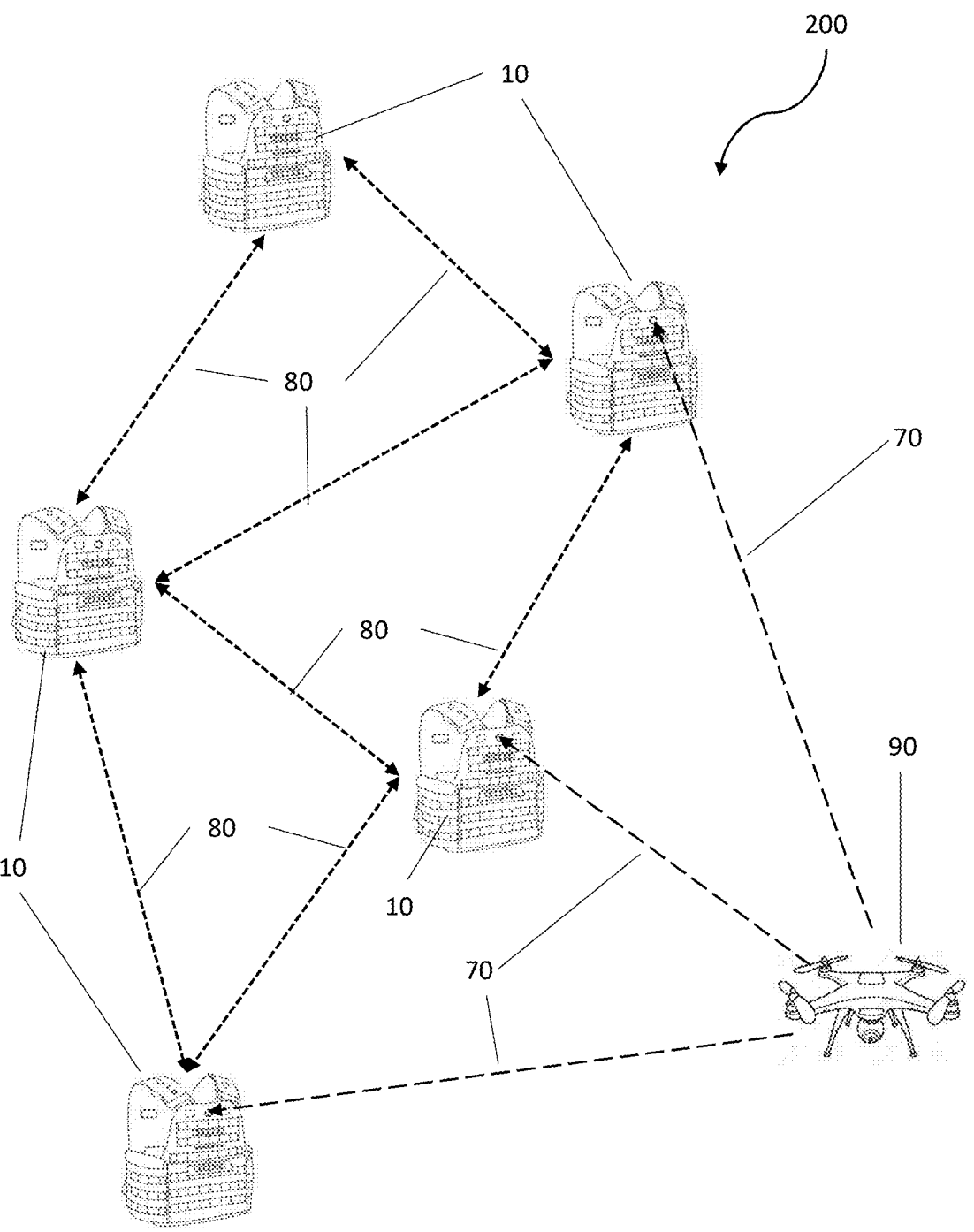
FIG. 38 illustrates the personal tactical system according to the present invention employed in a mobile ad hoc network.

A tactical system according to the present invention further includes a communication device (e.g., transceiver) 30 operable to communicate with (i.e., transmit information to and/or receive information from) other tactical systems in the vicinity and/or at least one remote device (e.g., server, computer, drone, aircraft, unmanned ground robot, remote control vehicle). Alternatively, the communication device (e.g., transceiver) 30 is an end user device 2102 (FIG. 37). In a preferred embodiment, the communication device is operable to form a mobile/wireless ad hoc network 200 (MANET or WANET) or mesh network with other communication devices (FIG. 38). The tactical system is operable to transmit alerts and other messages generated by the tactical system or by the user through the communication device to other tactical systems in the vicinity.

When operating as a MANET system, the MANET system provides for calculating trajectories and arrival times of approaching objects using triangulation/multilateration methods. Thus, the MANET system can determine and communicate to the users a direction of approaching objects, an order in which the approaching objects will arrive, a time offset between a first approaching object arrival and a second approaching object arrival, a time when the approaching objects are within a range of fire of the MANET system users' weapons, and the like.

In one embodiment, the MANET system uses parallel computing and/or distributed computing to more quickly determine the location and motion of objects. The computational tasks are distributed among the personal tactical systems 10.

In another embodiment, the MANET system uses computer vision triangulation to determine the location of objects, as described in Multiple View Geometry in Computer Vision by Richard Hartley and Andrew Zisserman (2003) published by Cambridge University Press, which is incorporated herein by reference in its entirety. Computer vision triangulation is the process of determining a point in 3D space given its projections onto two, or more, images. Computer vision triangulation uses a camera projection matrix, a 3×4 matrix which describes the mapping of a pinhole camera from 3D points in the world to 2D points in an image. As shown in the example in FIG. 38, personal tactical system 10 receives images 70 of an object from a drone 90, and uses them to calculate a direction, a location, and movement of the object.

Alternatively, or additionally, the MANET system uses a type of triangulation that uses three tactical systems as a group antenna configuration to perform direction finding by using multilateration of radiofrequencies. Commonly used in civil and military surveillance applications, multilateration is able to accurately locate an aircraft, vehicle, or stationary RF emitter by measuring a "Time Difference of Arrival" (TDOA) of a signal from the emitter at three or more receiver sites. If a pulse is emitted from a platform, it will arrive at slightly different times at two spatially separated receiver sites, the TDOA being due to the different distances of each receiver from the platform. This location information is then supplied to a mapping process that utilizes a database of mapping images that are extracted from the database based on a latitude and a longitude provided by the geo-location or direction-finding device. The mapping images is scanned in to show the points of interest where a signal is either expected to be emanating from based on the database information or from an average taken from the database information and the geo-location calculation performed prior to the mapping software being called. The user can control the map to maximize or minimize the mapping screen to get a better view which is more fit to provide information of the signal transmissions (i.e., zoom in, zoom out, re-center the map). In one embodiment, the mapping process does not rely on outside mapping software. The mapping capability has the ability to generate the map image and to populate a mapping database that preferably includes information from third party maps to meet specific user requirements.

In an embodiment, triangulation and multilateration utilize a Bayesian type filter that predicts possible movement and future location and operation of devices based on input collected from the TDOA and geolocation processes and the variables from the static database pertaining to the specified signal of interest. The Bayesian filter takes the input changes in time difference and its inverse function (i.e., frequency difference) and takes average changes in signal variation to detect and predict the movement of the signals. The signal changes are measured within 1 ns time difference and the filter preferably also adapts its gradient error calculation to remove unwanted signals that may cause errors due to signal multipath, inter-symbol interference, and other signal noise.

In one embodiment, the changes within a 1 ns time difference for each sample for each unique signal is recorded. The spectrum management device then performs the inverse and computes and records the frequency difference and phase difference between each sample for each unique signal. The spectrum management device takes the same signal and calculates an error based on other input signals coming in within the 1 ns time and averages and filters out the computed error to equalize the signal. The spectrum management device determines the time difference and frequency difference of arrival for that signal and computes the odds of where the signal is emanating from based on the frequency band parameters presented from the spectral analysis and processor computations, and determines the best position from which the signal is transmitted (i.e., origin of the signal).

In a preferred embodiment, the MANET system uses radiofrequency triangulation/multilateration to determine the location of the personal tactical systems in the network. Thus, in one embodiment, each personal tactical system emits a unique pulse 80 (FIG. 38), which is used by the MANET system to determine the location of the individual systems with respect to one another. With the relative locations of the personal tactical systems known, the MANET system uses this location information to more precisely calculate with computer vision triangulation or radiofrequency triangulation the location, relative to the MANET system and each personal tactical system, of objects spotted by the personal tactical system cameras.

With the addition of a compass to each personal tactical system, the MANET system can calculate the object location without having to use landmarks. The MANET system uses the azimuths of the cameras to more precisely determine the direction of the objects, which are then used by the MANET system to calculate the location.

With the addition of a compass and a GPS component to each personal tactical system, the MANET system can determine the absolute location of objects with respect to the Earth.

Figure 39:
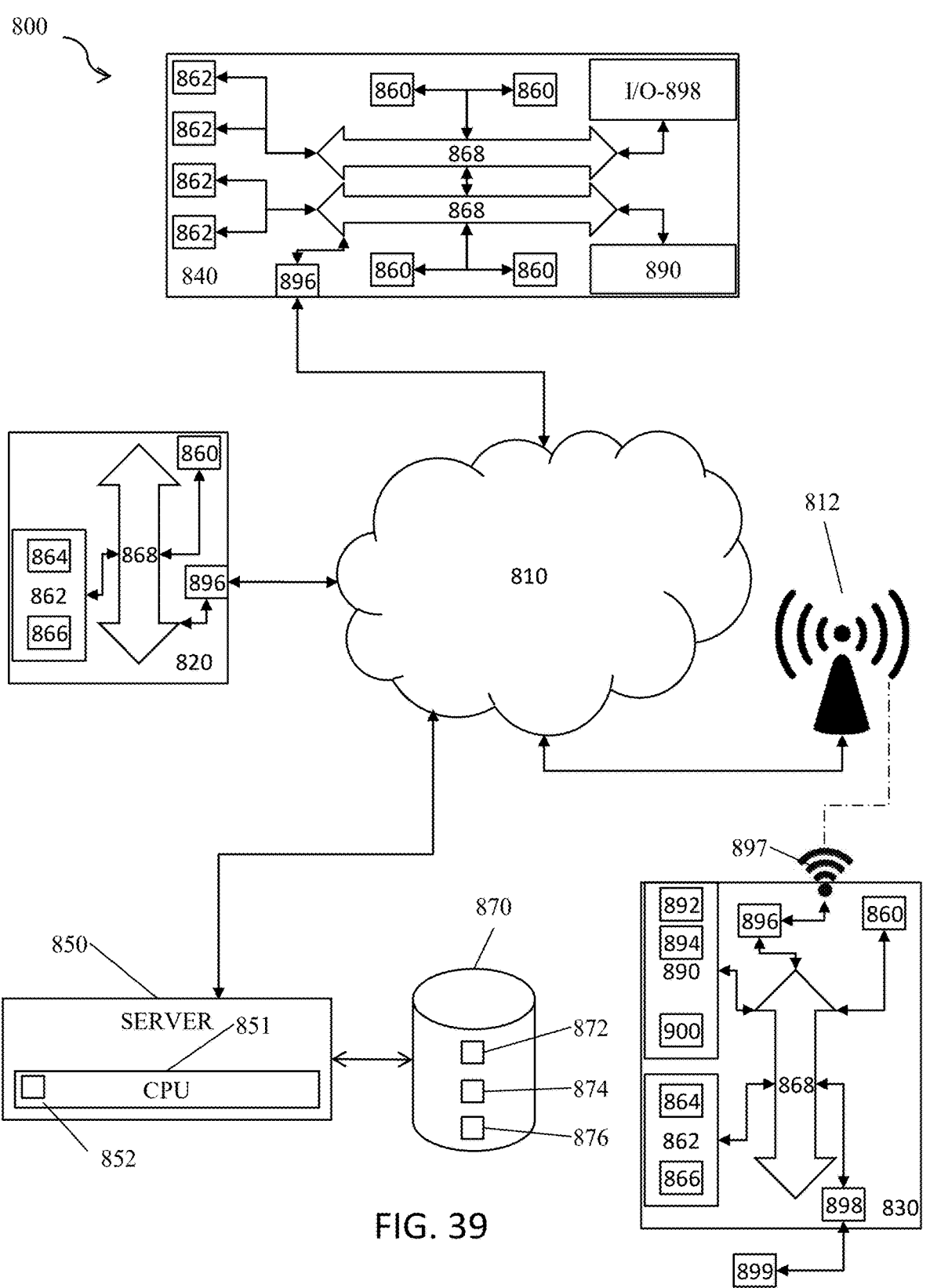
FIG. 39 illustrates a schematic diagram of an embodiment of the invention illustrating a computer system having a network, a plurality of computing devices, a server, and a database.

The personal tactical system and the MANET system are also configured to transmit data to a server for processing and/or storage. FIG. 39 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 39, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal. Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 39, may include other components that are not explicitly shown in FIG. 39, or may utilize an architecture completely different than that shown in FIG. 39. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By way of example, the battery includes more than two flexible omnidirectional leads. Also by way of example, the pouch has different dimensions than those listed. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A tactical system comprising:
   a garment; and
   at least one power distribution and data hub;
   wherein the at least one power distribution and data hub is operable to supply power to at least one device; and
   wherein the at least one power distribution and data hub is operable to transfer data between at least two devices.

2. The tactical system of claim 1, wherein the garment includes one or more batteries.

3. The tactical system of claim 1, wherein the garment is a vest, body armor, or a plate carrier.

4. The tactical system of claim 1, wherein the at least one power distribution and data hub is operable to be connected to a battery.

5. The tactical system of claim 1, wherein the at least one power distribution and data hub is operable to supply power to a device that requires 5V charging via a USB adapter.

6. The tactical system of claim 1, wherein the at least one power distribution and data hub is operable to recharge at least one battery.

7. The tactical system of claim 1, further comprising at least one camera, wherein the at least one camera is incorporated in and/or removably attachable to the garment, and wherein the at least one camera is on a retractable tether.

\* \* \* \* \*